US008736544B2

(12) United States Patent
Shimoshikiryoh et al.

(10) Patent No.: US 8,736,544 B2
(45) **Date of Patent: *May 27, 2014**

(54) LIQUID CRYSTAL DISPLAY DEVICE, LIQUID CRYSTAL DISPLAY DEVICE DRIVE METHOD, AND TELEVISION RECEIVER

(75) Inventors: Fumikazu Shimoshikiryoh, Osaka (JP); Masae Kawabata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 180 days.

This patent is subject to a terminal disclaimer.

(21) Appl. No.: 12/998,725

(22) PCT Filed: Oct. 5, 2009

(86) PCT No.: PCT/JP2009/067357

§ 371 (c)(1),
(2), (4) Date: May 25, 2011

(87) PCT Pub. No.: WO2010/061685

PCT Pub. Date: Jun. 3, 2010

(65) Prior Publication Data

US 2011/0221971 A1 Sep. 15, 2011

(30) Foreign Application Priority Data

Nov. 26, 2008 (JP) ................................ 2008-301289

(51) Int. Cl.

| | |
|---|---|
| ***G09G 3/36*** | (2006.01) |
| ***G09G 5/00*** | (2006.01) |
| ***G06F 3/038*** | (2013.01) |
| ***G09G 5/10*** | (2006.01) |

(52) U.S. Cl.

USPC ............. 345/103; 345/204; 345/690; 345/87; 345/94; 345/96

(58) Field of Classification Search

USPC ................................... 345/204, 690, 87–104

See application file for complete search history.

(56) References Cited

U.S. PATENT DOCUMENTS 4,792,857 A * 12/1988 Akiyama ..................... 348/793
5,457,474 A 10/1995 Ikeda (Continued)

FOREIGN PATENT DOCUMENTS

CN 101131808 2/2008
CN 101320179 12/2008

(Continued)

OTHER PUBLICATIONS

European Search Report dated Apr. 12, 2012.

(Continued)

*Primary Examiner* — Ilana Spar
(74) *Attorney, Agent, or Firm* — Harness, Dickey & Pierce, P.L.C.

(57) ABSTRACT

At least one embodiment of a liquid crystal display device including a display unit having scan signal lines divided into a plurality of groups which are successively selected. While the scan signal lines belonging to the selected group are successively scanned horizontally, signal potentials of the same polarity are successively supplied to a data signal line. The polarity of the signal potential is reversed between a preceding group and a subsequent group which are selected continuously. A plurality of dummy scan periods are inserted between the horizontal scan period corresponding to the last horizontal scan in the preceding group and the horizontal scan period corresponding to the first horizontal scan in the subsequent group. In each of the dummy scan periods, one of the scan signal lines which belong to the group selected after the preceding group is subjected to a dummy scan so that the scan signal line is maintained in an active state for a predetermined period and then deactivated so as to align the load state of a scan signal line drive circuit. This can reduce irregularities of the horizontal stripes when the data signal line is subjected to the block reverse drive.

27 Claims, 34 Drawing Sheets

(56) References Cited

U.S. PATENT DOCUMENTS

| | | | | | |
|---|---|---|---|---|---|
| 5,699,076 | A * | 12/1997 | Tomiyasu | 345/103 |
| 6,335,719 | B1 | 1/2002 | An et al. | |
| 6,791,566 | B1 | 9/2004 | Kuratomi et al. | |
| 6,903,716 | B2 * | 6/2005 | Kawabe et al. | 345/99 |
| 2001/0022565 | A1 | 9/2001 | Kimura | |
| 2002/0030647 | A1 | 3/2002 | Hack et al. | |
| 2003/0090449 | A1 | 5/2003 | Arimoto et al. | |
| 2003/0201955 | A1 | 10/2003 | Song et al. | |
| 2003/0227429 | A1 | 12/2003 | Shimoshikiryo | |
| 2005/0036075 | A1 | 2/2005 | Taoka et al. | |
| 2005/0213015 | A1 | 9/2005 | Shimoshikiryo | |
| 2006/0007094 | A1 | 1/2006 | Kang et al. | |
| 2006/0023137 | A1 | 2/2006 | Kamada et al. | |
| 2006/0041805 | A1 | 2/2006 | Song | |
| 2006/0256271 | A1 | 11/2006 | Shimoshikiryo | |
| 2007/0052643 | A1 | 3/2007 | Li et al. | |
| 2007/0229447 | A1 | 10/2007 | Takahara et al. | |
| 2008/0012840 | A1 | 1/2008 | Higashino et al. | |
| 2008/0191985 | A1 | 8/2008 | Katayama et al. | |
| 2009/0085860 | A1 * | 4/2009 | Huang et al. | 345/102 |
| 2009/0167964 | A1 | 7/2009 | Lebrun et al. | |
| 2010/0045708 | A1 | 2/2010 | Higashino | |
| 2010/0097366 | A1 | 4/2010 | Kitayama et al. | |
| 2010/0118012 | A1 | 5/2010 | Irie et al. | |
| 2011/0063330 | A1 | 3/2011 | Bae et al. | |
| 2011/0170014 | A1 | 7/2011 | Irie et al. | |
| 2011/0221970 | A1 | 9/2011 | Kawabata et al. | |
| 2011/0221972 | A1 * | 9/2011 | Kawabata et al. | 348/731 |

FOREIGN PATENT DOCUMENTS

| | | | |
|---|---|---|---|
| CN | 102160108 | | 8/2011 |
| EP | 1 286 202 | | 2/2003 |
| FR | 2 894 369 | | 6/2007 |
| JP | 6222330 | A | 8/1994 |
| JP | 07-134572 | | 5/1995 |
| JP | 11352938 | A | 12/1999 |
| JP | 2000-098343 | | 4/2000 |
| JP | 2001051252 | A | 2/2001 |
| JP | 2002-055675 | | 2/2002 |
| JP | 2002-123209 | | 4/2002 |
| JP | 2002-140029 | | 5/2002 |
| JP | 2002-251170 | | 9/2002 |
| JP | 2004004857 | A | 1/2004 |
| JP | 2004-062146 | | 2/2004 |
| JP | 2004046236 | A | 2/2004 |
| JP | 2004046236 | A * | 2/2004 |
| JP | 2004-294540 | | 10/2004 |
| JP | 2006-003877 | A | 1/2006 |
| JP | 2006-030834 | | 2/2006 |
| JP | 2006-39290 | | 2/2006 |
| JP | 2006039542 | A | 2/2006 |
| JP | 2007-025239 | | 2/2007 |
| JP | 2007-286135 | | 11/2007 |
| JP | 2008-107369 | | 5/2008 |
| JP | 2008-145471 | | 6/2008 |
| KR | 2008-0086617 | | 9/2008 |
| WO | WO 02063384 | | 8/2002 |
| WO | WO 2008/065773 | | 6/2008 |
| WO | WO 2008/139695 | | 11/2008 |
| WO | WO-2008139693 | A1 | 11/2008 |

OTHER PUBLICATIONS

U.S. Advisory Action issued in U.S. Appl. No. 12/998,833, dated Jun. 4, 2013.

U.S. Office Action issued in U.S. Appl. No. 12/998,731, dated May 9, 2013.

U.S. Appl. No. 12/998,698, filed May 20, 2011.

U.S. Office Action issued in U.S. Appl. No. 12/998,698 dated May 6, 2013.

U.S. Office Action issued in U.S. Appl. No. 12/998,833 dated Feb. 13, 2013.

Hori, Hiroo, and Koji Suzuki, eds., Series Advanced Display Technologies 2-Color Liquid Crystal Display, Kyoritsu Shuppan Col, Ltd. 1st Ed. Jun. 25, 2001, pp. 247-248.

U.S. Office Action issued in U.S. Appl. No. 12/998,833 dated Sep. 17, 2012.

U.S. Office Action issued in U.S. Appl. No. 12/998,731 dated May 9, 2013.

U.S. Office Action issued in U.S. Appl. No. 12/998,731 dated Sep. 4, 2013.

U.S. Notice of Allowance issued in U.S. Appl. No. 12/998,731, dated Feb. 5, 2014.

U.S. Advisory Action issued in U.S. Appl. No. 12/998,731, dated Dec. 19, 2013.

* cited by examiner

LIQUID CRYSTAL DISPLAY DEVICE, LIQUID CRYSTAL DISPLAY DEVICE DRIVE METHOD, AND TELEVISION RECEIVER

TECHNICAL FIELD

The present invention relates to a driving (block inversion driving), in which a signal electric potential is supplied to each data signal line so that a polarity of the signal electric potential is reversed every plurality of horizontal scanning periods.

BACKGROUND ART

A liquid crystal display device is a display device that has excellent advantages that it has high definition, is thin, is light, consumes low electrical power, and the like. In recent years, a market scale of such a liquid crystal display device has rapidly expanded. For such a liquid crystal display device, a dot inversion driving, in which a signal electric potential is supplied to each data signal line so that a polarity of the signal electric potential is reversed every horizontal scanning period, has been widely employed. Note however that, according to the dot inversion driving, the polarity in the each data signal line is reversed frequently. This causes a problem such as a reduction in a charging rate of pixels or an increase in power consumption. In view of this, for example as described in Patent Literature 1, there has been proposed a block inversion driving in which the signal electric potential is supplied to the each data signal line so that the polarity of the signal electric potential is reversed every plurality of horizontal scanning periods. The block inversion driving makes it possible to improve the charging rate of the pixels and to suppress power consumption and heat generation, as compared with the dot inversion driving.

Patent Literature 1 discloses a configuration employing the block inversion driving, in which configuration a dummy scanning period is inserted immediately after reversal of a polarity (see FIG. 35). According to this configuration, a dummy scanning period (H3) for a pre-charge and a horizontal scanning period (H4) for an actual charge (for writing) are allocated to a piece of data (n+2), which is to be written immediately after the reversal of the polarity. This makes it possible to increase a charging rate of a pixel corresponding to the piece of data (n+2).

CITATION LIST

Patent Literature

Patent Literature 1

Japanese Patent Application Publication, Tokukai, No. 2001-51252 A (Publication Date: Feb. 23, 2001)

SUMMARY OF INVENTION

Technical Problem

However, the inventors of the present invention have found that the configuration of FIG. 35 causes the following problem. For example, assume that (i) a load imposed on a scanning signal line drive circuit when one (1) scanning signal line is in an active state is Ly and (ii) a load imposed on the scanning signal line drive circuit when two scanning signal lines are in the active state is Lz. In this case, (a) the load Lz is imposed on the scanning signal line drive circuit during a horizontal scanning period H1, (b) the load Ly is imposed on the scanning signal line drive circuit during horizontal scanning periods H2 and H3, and (c) the load Lz is imposed on the scanning signal line drive circuit during horizontal scanning periods H4 and H5.

Under such circumstances, as for a scan for writing a piece of data (n+1) during the horizontal scanning period H2, (i) the load Lz is imposed on the scanning signal line drive circuit before the scan and (ii) the load Ly is imposed on the scanning signal line drive circuit during the scan. As for a scan for writing a piece of data (n+2) during the horizontal scanning period H4, (a) the load Ly is imposed on the scanning signal line drive circuit before the scan and (b) the load Lz is imposed on the scanning signal line drive circuit during the scan. As for a scan for writing a piece of data (n+3) during the horizontal scanning period H5, (I) the load Lz is imposed on the scanning signal drive circuit before the scan and (II) the load Lz is imposed on the scanning signal drive circuit during the scan.

Since the load imposed on the scanning signal line drive circuit varies before and during the scan of each scanning signal line like above, an electric potential supplied to each pixel (or, eventually, display condition) may vary even if the pieces of data (n+1), (n+2), and (n+3) are identical. This variation may be perceived as unevenness in a form of horizontal stripes.

The present invention has been made in view of the problem, and an object of the present invention is to improve, by suppressing unevenness in a form of horizontal stripes, a display quality of a liquid crystal display device that employs a block inversion driving.

Solution to Problem

A liquid crystal display device of the present invention includes: a display section; scanning signal lines in the display section; and data signal lines, the scanning signal lines being divided into groups each of which includes two or more of the scanning signal lines, the groups being sequentially selected so that (i) two or more of the scanning signal lines included in a selected one of the groups are sequentially scanned horizontally while (ii) each of the data signal lines is sequentially supplied with signal electric potentials having an identical polarity, the identical polarity of the signal electric potentials being reversed between sequentially selected ones of the groups, a dummy scanning period being inserted between (a) a horizontal scanning period corresponding to a last horizontal scan in a former one of the sequentially selected ones of the groups and (b) another horizontal scanning period corresponding to a first horizontal scan in a latter one of the sequentially selected ones of the groups, and at least one, of the scanning signal lines, which is included in a group to be selected after the former one of the sequentially selected ones of the groups, being subjected to a dummy scan during the dummy scanning period so as to be in an active state for a predetermined period and then deactivated.

In the subject application, the term "horizontal scan" means activating of a certain scanning signal line during a corresponding horizontal scanning period. In view of this, activating of the certain scanning signal line during a horizontal scanning period that does not correspond to the certain scanning signal line, which activating is carried out for the purpose of pre-charging or the like, is not referred to as the "horizontal scan". Similarly, the term "dummy scan" means activating of a certain scanning signal line during a corresponding dummy scanning period.

According to the configuration in which a dummy scanning period is inserted immediately after reversal of a polarity of an electric potential supplied to each of the data signal lines, it is possible to equalize (i) a load imposed on a scanning signal line drive circuit during each horizontal scanning period and (ii) a load imposed on the scanning signal line drive circuit during each dummy scanning period and to align, for each of the scanning signal lines, each of (a) loads imposed on the scanning signal line drive circuit before scans of the each of the scanning signal lines and (b) loads imposed on the scanning signal line drive circuit during the scans of the each of the scanning signal lines. Accordingly, it is possible to further reduce a difference between (I) a charging rate of pixels connected with scanning signal lines to be horizontally scanned before and after (particularly, immediately after) reversal of the polarity of the electric potential and (II) a charging rate of the other pixels, and thus possible to further suppress unevenness in a form of a horizontal stripe, which has been a problem for the block inversion driving.

The liquid crystal display device of the present invention can be configured such that, during the dummy scanning period, said each of the data signal lines is supplied with a dummy electric potential. The dummy electric potential preferably has a polarity identical to a polarity of each of the signal electric potentials for the latter one of the sequentially selected ones of the groups.

The liquid crystal display device of the present invention can be configured such that: pieces of video data corresponding to horizontal scans of the respective scanning signal lines are arranged in order of the horizontal scans; n piece of dummy data is inserted between (i) one, of the pieces of video data, which corresponds to the last horizontal scan in the former one of the sequentially selected ones of the groups and (ii) another one, of the pieces of video data, which corresponds to the first horizontal scan in the latter one of the sequentially selected ones of the groups; and the signal electric potentials correspond to the respective pieces of video data, whereas the dummy electric potential corresponds to the n piece of dummy data. The n piece of dummy data is identical to one, of the pieces of video data, which corresponds to a first horizontal scan of said at least one of the scanning signal lines after the dummy scan of said at least one of the scanning signal lines. Alternatively, the n piece of dummy data is identical to one, of the pieces of video data, which corresponds to a last horizontal scan of said at least one of the scanning signal lines before the dummy scan of said at least one of the scanning signal lines.

The liquid crystal display device of the present invention can be configured such that: a time between a start of each horizontal scanning period and a start of a corresponding horizontal scan is equal to a time between a start of the dummy scanning period and a start of the dummy scan; and a time between an end of said corresponding horizontal scan and an end of said each horizontal scanning period is equal to a time between an end of the dummy scan and an end of the dummy scanning period. Further, the liquid crystal display device can be configured such that each horizontal scanning period is equal in length to the dummy scanning period.

The liquid crystal display device of the present invention can be configured such that: two or more dummy scanning periods are inserted between (i) the horizontal scanning period corresponding to the last horizontal scan in the former one of the sequentially selected ones of the groups and (ii) said another horizontal scanning period corresponding to the first horizontal scan in the latter one of the sequentially selected ones of the groups; and during the two or more dummy scanning periods, respective different ones of the scanning signal lines are subjected to the dummy scan. Alternatively, the liquid crystal display device can be configured such that, during the two or more dummy scanning periods, an identical one of the scanning signal lines is subjected to the dummy scan. Further, said at least one of the scanning signal lines, which is subjected to the dummy scan, can be included in the second one of the sequentially selected ones of the groups. Further, said at least one of the scanning signal lines, which is subjected to the dummy scan, can include one, of the scanning signal lines, which is to be horizontally scanned first in the latter one of the sequentially selected ones of the groups. Alternatively, said at least one of the scanning signal lines, which is subjected to the dummy scan, can include one, of the scanning signal lines, which is included in a group to be selected after the latter one of the sequentially selected ones of the groups.

The liquid crystal display device of the present invention can be configured such that each of the scanning signal lines is (i) activated in synchronization with a start of a horizontal scan of said each of the scanning signal lines and (ii) deactivated in synchronization with an end of the horizontal scan of said each of the scanning signal lines. In this case, the liquid crystal display device can be configured such that said at least one of the scanning signal lines, which is subjected to the dummy scan, is (i) activated in synchronization with a start of the dummy scan of said at least one of the scanning signal lines and (i) deactivated in synchronization with an end of the dummy scan of said at least one of the scanning signal lines. Further, the liquid crystal display device can be configured such that each of the scanning signal lines is activated by a gate pulse having a width equal to one (1) horizontal scanning period.

The liquid crystal display device of the present invention can be configured such that each of the scanning signal lines is (i) activated in synchronization with a start of a horizontal scan or a dummy scan, which is carried out immediately before a horizontal scan of said each of the scanning signal lines and (ii) deactivated in synchronization with an end of the horizontal scan of said each of the scanning signal lines. In this case, the liquid crystal display device can be configured such that said at least one of the scanning signal lines, which is subjected to the dummy scan, is (i) activated in synchronization with a start of a horizontal scan or a dummy scan, which is carried out immediately before the dummy scan of said at least one of the scanning signal lines and (ii) deactivated in synchronization with an end of the dummy scan of said at least one of the scanning signal lines. Further, the liquid crystal display device can be configured such that each of the scanning signal lines is activated by a gate pulse having a width twice as long as one (1) horizontal scanning period.

The liquid crystal display device of the present invention can be configured such that, in a case where the scanning signal lines are numbered beginning with one (1) and a certain one of the scanning signal lines in the display section is numbered as one (1), (i) either one of the sequentially selected ones of the groups includes only odd-numbered ones of the scanning signal lines and (ii) the other one of the sequentially selected ones of the groups includes only even-numbered ones of the scanning signal lines.

In this case, the liquid crystal display device can be configured such that, in a case where (i) a part, of the display section, which extends from the certain one of the scanning signal lines is divided into blocks defined by a plurality of borders parallel with the scanning signal lines and (ii) one, of the blocks, which is at an end of the part and includes the certain one of the scanning signal lines serves as a most upstream block and another one, of the blocks, which is at the other end of the part serves as a most downstream block, a first one, of the groups, which is to be selected first includes (a)

odd-numbered scanning signal lines included in the most upstream block or (b) even-numbered scanning signal lines included in the most upstream block; a last one, of the groups, which is to be selected lastly includes (I) odd-numbered scanning signal lines included in the most downstream block or (II) even-numbered scanning signal lines included in the most downstream block; each of the other ones of the groups includes (A) even-numbered scanning signal lines included in adjacent two of the blocks or (B) odd-numbered scanning signal lines included in adjacent two of the blocks; and the groups are sequentially selected from upstream to downstream.

Alternatively, the liquid crystal display device can be configured such that, in a case where (i) a part, of the display section, which extends from the certain one of the scanning signal lines is divided into blocks defined by a plurality of borders parallel with the scanning signal lines and (ii) one, of the blocks, which is at an end of the part and includes the certain one of the scanning signal lines serves as a most upstream block and another one, of the blocks, which is at the other end of the part serves as a most downstream block, (a) odd-numbered scanning signal lines included in each of the blocks are grouped into a former group and even-numbered scanning signal lines included in said each of the blocks are grouped into a latter group or (b) the even-numbered scanning signal lines included in said each of the blocks are grouped into a former group and the odd-numbered scanning signal lines included in said each of the blocks are grouped into a latter group; and the groups are sequentially selected from the most upstream block to the most downstream block.

The liquid crystal display device of the present invention can be configured such that, in a case where (i) a part, of the display section, which extends from a certain one of the scanning signal lines is divided into blocks defined by a plurality of borders parallel with the scanning signal lines and (ii) one, of the blocks, which is at an end of the part and includes the certain one of the scanning signal lines serves as a most upstream block and another one, of the blocks, which is at the other end of the part serves as a most downstream block, the two or more of the scanning signal lines included in each of the blocks are grouped into a corresponding one of the groups; and the groups are sequentially selected from the most upstream block to the most downstream block.

A liquid crystal display device of the present invention includes: a plurality of scanning signal lines; and a plurality of data signal lines, each of the data signal lines being supplied with (i) signal electric potentials each having a first polarity during a first period that includes a first plurality of horizontal scanning periods and (ii) signal electric potentials each having a second polarity during a second period that includes a second plurality of successive horizontal scanning periods, the second period being subsequent to the first period, a dummy scanning period being inserted between the first period and the second period, during which dummy scanning period a corresponding one of the plurality of scanning signal lines is in an active state and then deactivated, and the number of a scanning signal line to be in the active state during the dummy scanning period is same as the number of a scanning signal line to be in the active state during each horizontal scanning period. In this case, the liquid crystal display device can be configured such that the corresponding one of the plurality of scanning signal lines, which was in the active state during the dummy scanning period, is in the active state for a predetermined period and then deactivated during (i) the second period or (ii) a horizontal scanning period after the second period. Further, the liquid crystal display device can be configured such that the corresponding one of the plurality of scanning signal lines, which one was in the active state during the dummy scanning period, is in the active state for a predetermined period and then deactivated during one of the second plurality of horizontal scanning periods of the second period, which one is other than a first one of the second plurality of horizontal scanning periods. Further, the liquid crystal display device can be configured such that, during the dummy scanning period, the data signal line drive circuit supplies a dummy electric potential having the second polarity to said each of the plurality of data signal lines. Further, the liquid crystal display device can be configured such that the scanning signal line drive circuit carries out an interlacing scanning.

A method for driving a liquid crystal display device in accordance with the present invention is a method for driving a liquid crystal display device, the liquid crystal display device including: a display section; scanning signal lines in the display section; and data signal lines, said method, including the steps of: dividing the scanning signal lines into groups each of which includes two or more of the scanning signal lines; sequentially selecting the groups so that (i) two or more of the scanning signal lines included in a selected one of the groups are sequentially scanned horizontally while (ii) each of the data signal lines is sequentially supplied with signal electric potentials having an identical polarity, reversing the identical polarity of the signal electric potentials between sequentially selected ones of the groups, inserting a dummy scanning period between (i) a horizontal scanning period corresponding to a last horizontal scan in a former one of the sequentially selected ones of the groups and (ii) another horizontal scanning period corresponding to a first horizontal scan in a latter one of the sequentially selected ones of the groups, and causing at least one, of the scanning signal lines, which is included in a group to be selected after the former one of the sequentially selected ones of the groups, to be subjected to a dummy scan during the dummy scanning period so that said at least one of the scanning signal lines is in an active state for a predetermined period and then deactivated.

A television receiver of the present invention includes: the liquid crystal display device; and a tuner section for receiving television broadcasting.

Advantageous Effects of Invention

As has been described, according to the liquid crystal display device of the present invention, a dummy scanning period is inserted immediately after reversal of a polarity of an electric potential supplied to each of the data signal lines. According to this configuration, it is possible to equalize (i) a load imposed on the scanning signal line drive circuit during each horizontal scanning period and (ii) a load imposed on the scanning signal line drive circuit during each dummy scanning period and to align, for each of the scanning signal lines, each of (a) loads imposed on the scanning signal line drive circuit before scans of the each of the scanning signal lines and (b) loads imposed on the scanning signal line drive circuit during the scans of the each of the scanning signal lines. Accordingly, it is possible to further reduce a difference between (I) a charging rate of pixels connected with scanning signal lines to be horizontally scanned before and after reversal of the polarity of each electric potential and (II) a charging rate of the other pixels, and thus possible to further suppress unevenness in a form of a horizontal stripe, which has been a problem for the block inversion driving.

DESCRIPTION OF EMBODIMENTS

Embodiments in accordance with the present invention are described below with reference to FIGS. 1 through 34. As illustrated in FIG. 3, a liquid crystal display device (e.g., normally black liquid crystal display device) of the present embodiment includes, in its display section, scanning signal lines G1 through G1080 and pixels provided in a matrix manner. For example, pixel array PL1 includes pixels P1 through P1080. Each of the pixels (i.e., a pixel i, where i is an integer from 1 through 1080) is connected with a scanning signal line SL1 and a scanning signal line G1. Further, pixel array PL2, which is adjacent to the pixel array PL1, includes pixels p1 through p1080. Each of the pixels (i.e., a pixel pi, where i is an integer from 1 through 1080) is connected with a scanning signal line SL2 and a scanning signal line G1.

Embodiment 1

Figure 1:
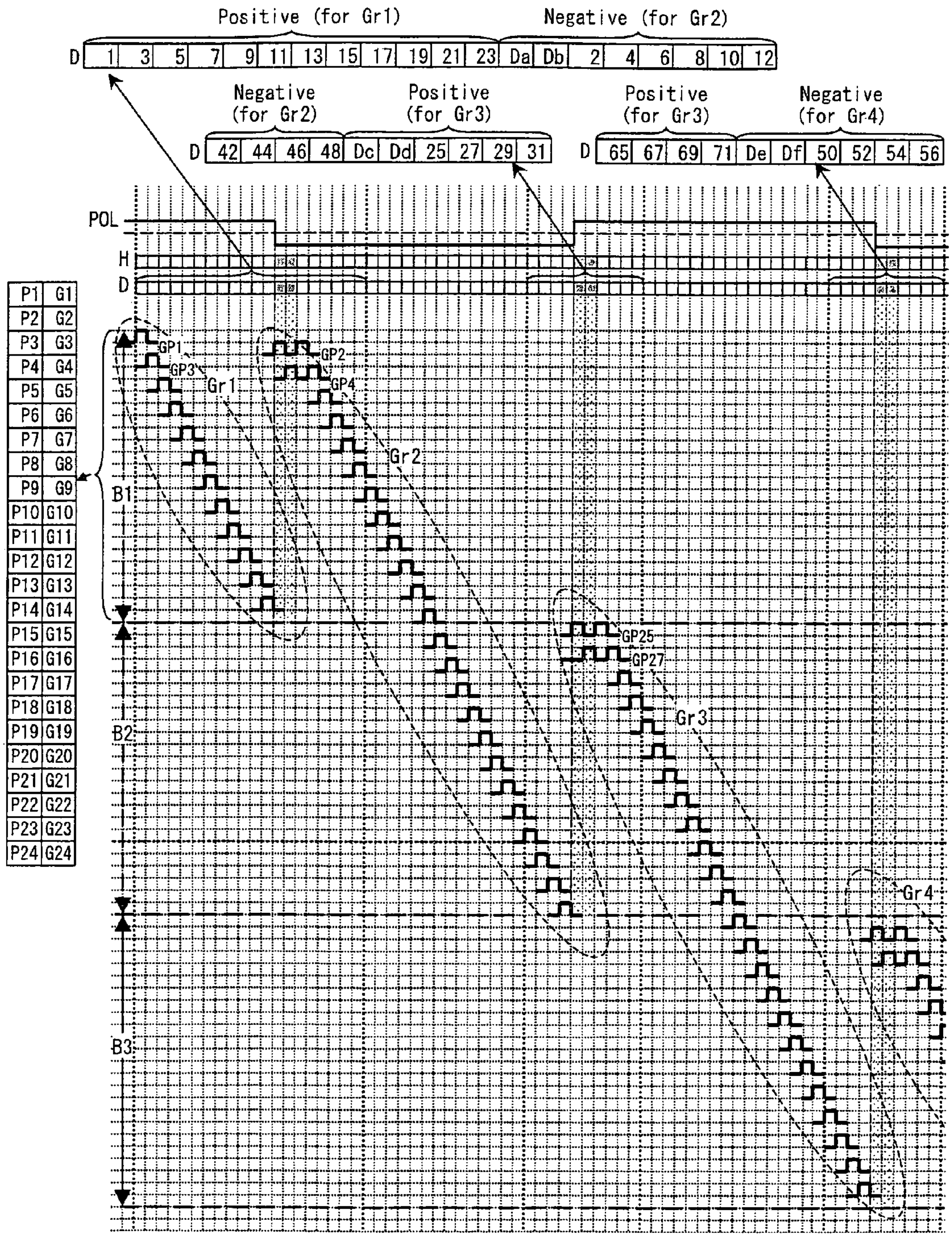
FIG. 1 is a timing chart illustrating one example of how a liquid crystal display device in accordance with Embodiment 1 is driven.
Figure 2:
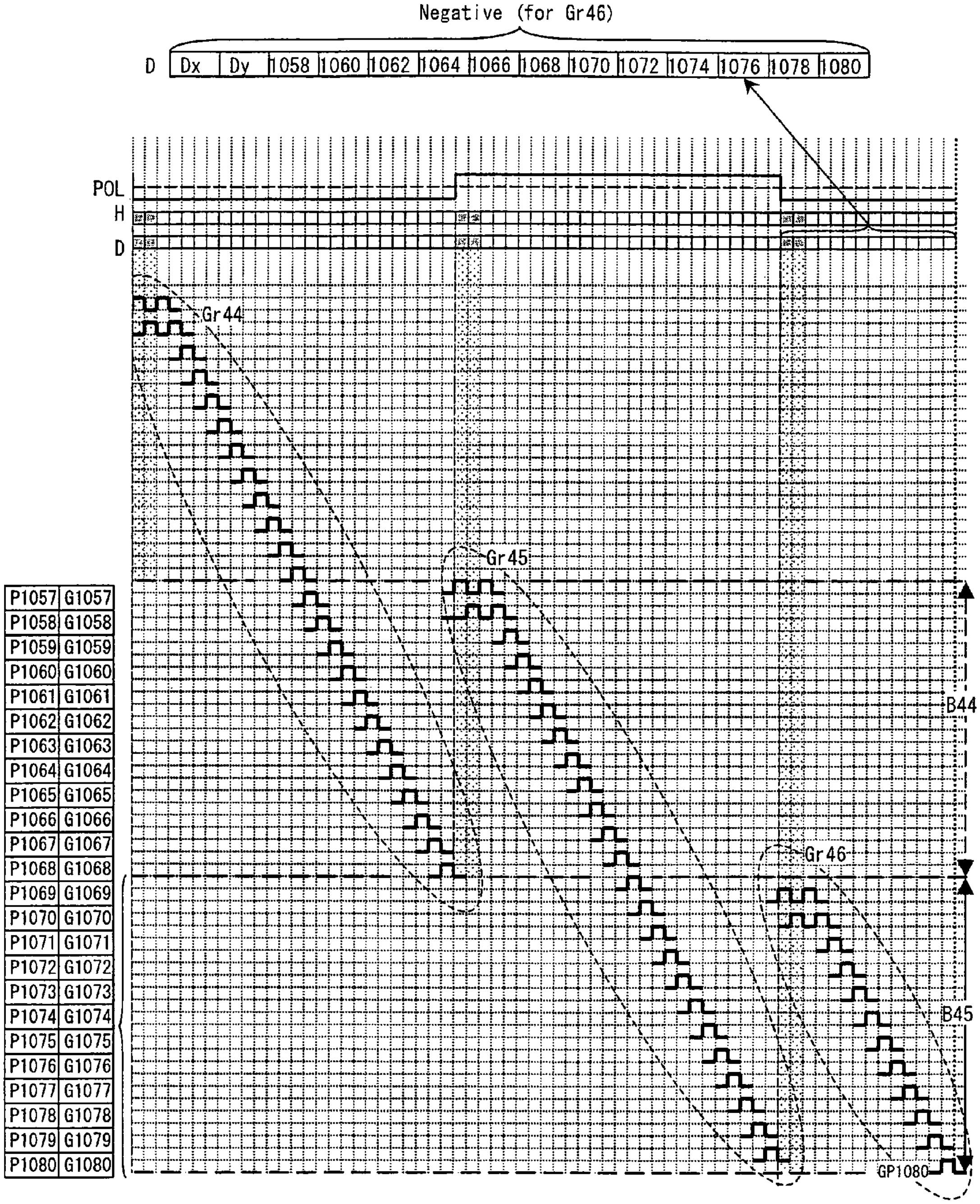
FIG. 2 is a timing chart illustrating a continuation of the timing chart of FIG. 1.
Figure 3:
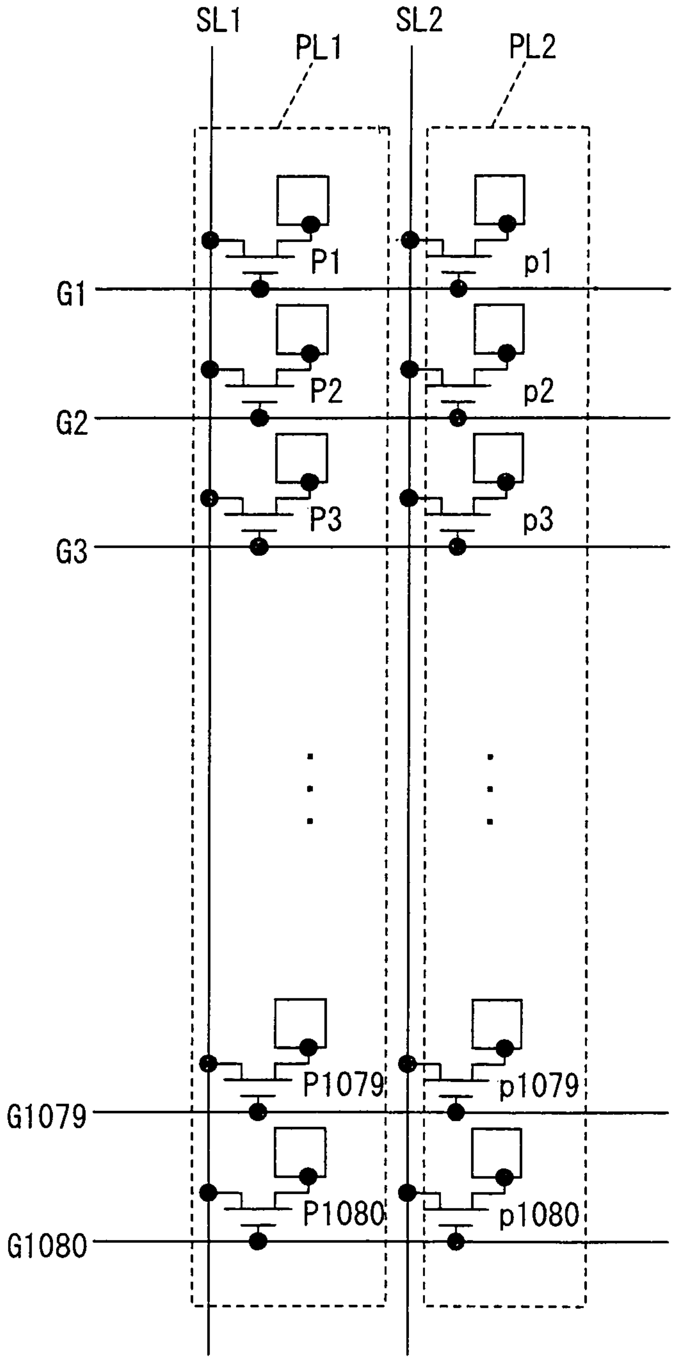
FIG. 3 is a view schematically illustrating how the liquid crystal display device is configured.

According to the present embodiment, as illustrated in FIGS. 1 and 2, the scanning signal lines are subjected to an interlacing scanning while data signal lines are block-inversion driven. First, assume that a part, of the display section, which extends from the scanning signal line G1 is divided into 45 blocks (B1 through B45), which are defined by 44 borders parallel with the scanning signal lines. Each of the blocks includes sequentially arranged 24 of the scanning signal lines. For example, the block B1, which is at a most upstream end, includes scanning signal lines G1 through G24; the block B2 includes scanning signal lines G25 through G48; the block B3 includes scanning signal lines G49 through G72; and the block B45, which is at a most downstream end, includes scanning signal lines G1057 through G1080.

Then, 12 odd-numbered scanning signal lines (G1, G3, . . . and G23) included in the block B1, which is the most upstream block, are grouped into a first group Gr1; and 24 even-numbered scanning signal lines (G2, G4, . . . and G48) included in the block B1 and the block B2 downstream of the block B1 are grouped into a group Gr2. Further, 24 odd-numbered scanning signal lines (G25, G27, . . . and G71) included in the second block B2 and the block B3 downstream of the block B2 are grouped into a group Gr3. Similarly, 24 even-numbered scanning signal lines included in a block Bj (j is an integer from 3 through 43) and a block B(j+1) downstream of the block Bj are grouped, and 24 odd-numbered scanning signal lines included in the block B(j+1) and a block B(j+2) downstream of the block B(j+1) are grouped. This is repeated so as to make groups Gr4 through G45. Then, 12 even-numbered scanning signal lines (G1058, G1060, . . .

and G1080) included in the block B45, which is the most downstream block, are grouped into a last group Gr46. The groups Gr1 through Gr46 are sequentially selected in this order so that (i) scanning signal lines belonging to a selected one of the groups Gr1 through Gr46 are horizontally scanned sequentially while (ii) the data signal lines are sequentially supplied with signal electric potentials having an identical polarity. Note in FIGS. 1 and 2 that pieces of data D1 through D1080 are pieces of video data (digital data) corresponding to the respective pixels P1 through P1080 (refer to FIG. 3) connected with the respective scanning signal lines G1 through G1080. A polarity reverse signal POL is a signal for controlling a polarity of a signal electric potential supplied to the data signal line SL1. As illustrated in FIGS. 1 and 2, a polarity (positive or negative) of each of the signal electric potentials supplied to each of the data signal lines is reversed between sequentially selected ones of the groups.

Specifically, while the group Gr1 is being selected so that the scanning signal lines (G1, G3, . . . and G23) belonging to the group Gr1 are sequentially scanned horizontally, the data signal line SL1 is sequentially supplied with signal electric potentials each having a positive polarity, which signal electric potentials correspond to respective pieces of video data (D1, D3, . . . and D23). Next, while the group Gr2 is being selected so that the scanning signal lines (G2, G4, . . . and G48) belonging to the group Gr2 are sequentially scanned horizontally, the data signal line SL1 is sequentially supplied with signal electric potentials each having a negative polarity, which signal electric potentials correspond to respective pieces of video data (D2, D4, . . . and D48). Further, while the group Gr3 is being selected so that the scanning signal lines (G25, G27, . . . and G71) belonging to the group Gr3 are sequentially scanned horizontally, the data signal line SL1 is sequentially supplied with signal electric potentials having a positive polarity, which signal electric potentials correspond to respective pieces of video data (D25, D27, . . . and D71). Note here that a period, during which a signal electric potential corresponding to a piece of video data is supplied (outputted) to a corresponding one of the data signal lines, is referred to as a horizontal scanning period (H).

Under such circumstances, first and second pieces of dummy data are inserted between (i) a piece of video data corresponding to a last horizontal scan in a current group and (ii) a piece of video data corresponding to a first horizontal scan in a next group. Further, first and second dummy scanning periods are inserted between (a) a horizontal scanning period corresponding to the last horizontal scan in the current group and (b) a horizontal scanning period corresponding to the first horizontal scan in the next group.

During the first dummy scanning period, a scanning signal line to be horizontally scanned first in the next group is subjected to a dummy scan so as to be in the active state for a predetermined period and thereafter deactivated. During the first dummy scanning period, a dummy electric potential, which corresponds to the first piece of dummy data and has a polarity identical to that of a signal electric potential for the next group, is supplied to a corresponding one of the data signal lines. The first piece of dummy data is identical to a piece of video data which corresponds to a first horizontal scan of the scanning signal line (i.e., the scanning signal line to be horizontally scanned first in the next group) after the dummy scan of the scanning signal line. Further, during the second dummy scanning period, a scanning signal line to be horizontally scanned secondly in the next group is subjected to a dummy scan so as to be in the active state for a predetermined period and thereafter deactivated. During the second dummy scanning period, a dummy electric potential, which corresponds to the second piece of dummy data and has a polarity identical to that of the signal electric potential for the next group, is supplied to the corresponding one of the data signal lines. The second piece of dummy data is identical to a piece of video data which corresponds to a first horizontal scan of the scanning signal line (i.e., the scanning signal line to be horizontally scanned secondly in the next group) after the dummy scan of the scanning signal line.

Note here that a timing of a horizontal scan in each horizontal scanning period is same as a timing of the dummy scan in each of the dummy scanning periods. Specifically, a start of a horizontal scanning period (i.e., a start of output of a signal electric potential) and an end of the horizontal scanning period (i.e., an end of the output of the signal electric potential) are matched with a start of a corresponding horizontal scan (a start of supplying of the signal electric potential) and an end of the corresponding horizontal scan (i.e., an end of the supplying of the signal electric potential), respectively. Further, a start of a dummy scanning period (i.e., a start of output of a dummy electric potential) and an end of the dummy scanning period (i.e., an end of the output of the dummy electric potential) are matched with a start of a corresponding dummy scan (i.e., a start of supplying of the dummy electric potential) and an end of the corresponding dummy scan (i.e., an end of the supplying of the dummy electric potential), respectively.

Further, the scanning signal lines G1 through G1080 are supplied with respective gate pulses GP1 through GP1080, each of which has a pulse width equal to one (1) horizontal scanning period (i.e., 1H). Each of the scanning signal lines is activated at a start of a horizontal scan thereof. Similarly, each of scanning signal lines (i.e., the scanning signal lines to be horizontally scanned first and secondly in the next group), which are subjected to a dummy scan, is activated at a start of a dummy scan thereof.

Figure 4:
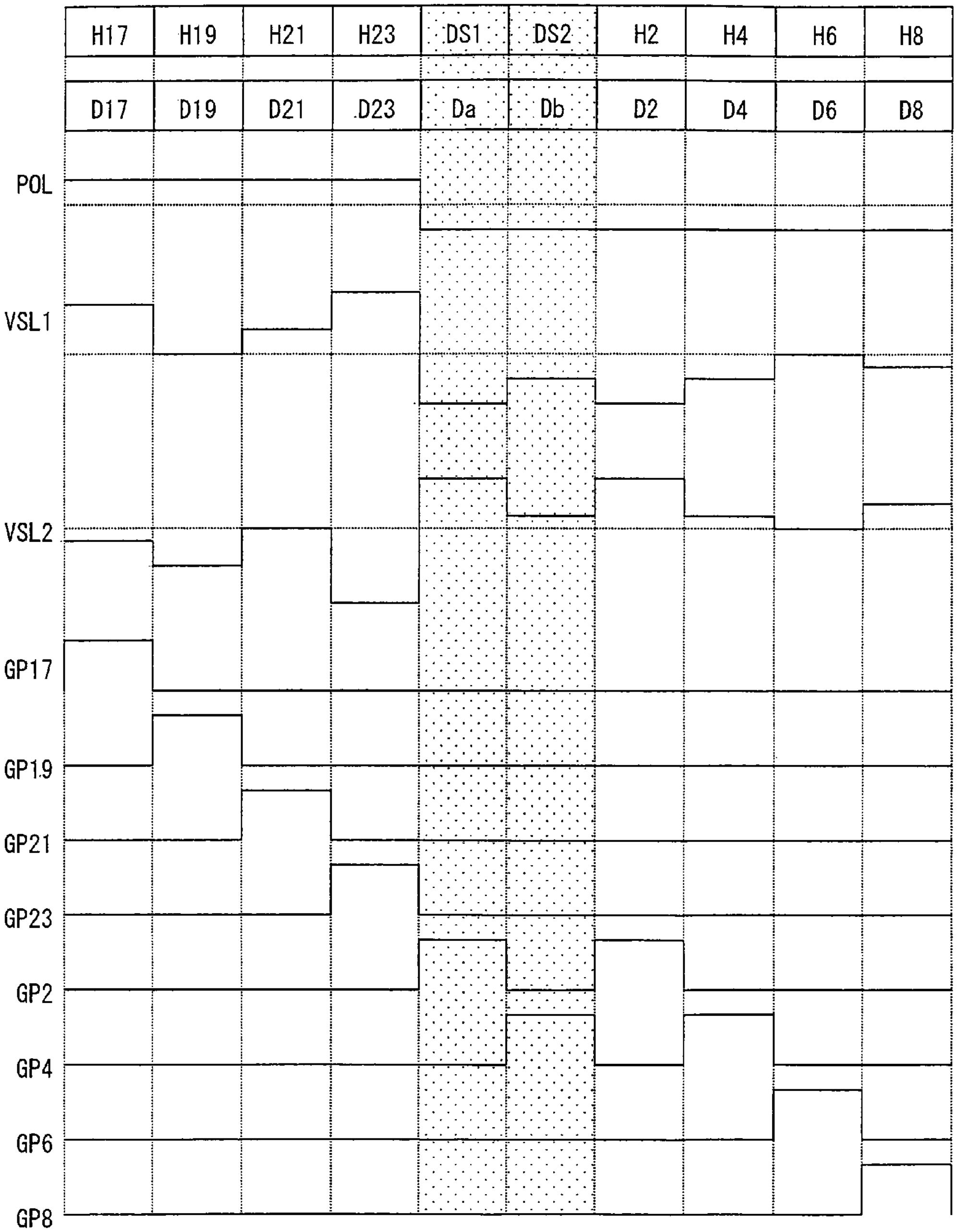
FIG. 4 is a timing chart more specifically illustrating the example of FIGS. 1 and 2.

For example, as illustrated in FIGS. 1 and 4, a first piece of dummy data Da and a second piece of dummy data Db are inserted between (i) the piece of video data D23 corresponding to a last horizontal scan (i.e., horizontal scan of G23) in the group Gr1 and (ii) the piece of video data D2 corresponding to a first horizontal scan (i.e., horizontal scan of G2) in the group Gr2. Further, a first dummy scanning period DS1 and a second dummy scanning period DS2 are inserted between (a) a horizontal scanning period H23 corresponding to the last horizontal scan in the group Gr1 and (b) a horizontal scanning period H2 corresponding to the first horizontal scan in the group Gr2.

Specifically, the gate pulse GP23, which is supplied to the scanning signal line G23, (i) becomes active at a start of the horizontal scanning period H23 and (ii) becomes inactive at an end of the horizontal scanning period H23. During the horizontal scanning period H23, a signal electric potential, which corresponds to the piece of video data D23 (i.e., a piece of video data corresponding to a pixel connected with the scanning signal line G23) and has a polarity (positive polarity) identical to that of a signal electric potential for the group Gr1, is supplied to the data signal line SL1.

Next, the gate pulse GP2, which is supplied to the scanning signal line G2 to be horizontally scanned first in the group Gr2, (i) becomes active at a start of the first dummy scanning period DS1 and (ii) becomes inactive at an end of the first dummy scanning period DS1. During the first dummy scanning period DS1, a dummy electric potential, which corresponds to the first piece of dummy data Da and has a polarity (negative polarity) identical to that of a signal electric potential for the group Gr2, is supplied to the data signal line SL1. The first piece of dummy data Da is identical to the piece of video data D2 (i.e., a piece of data for a next frame), which corresponds to a first horizontal scan of the scanning signal line G2 after the dummy scan of the scanning signal line G2. Accordingly, as is clear from an electric potential VSL1 (refer to FIG. 4) supplied to the data signal line SL1, the dummy electric potential supplied during the first dummy scanning period DS1 is equal to the signal electric potential supplied during the horizontal scanning period H2.

Next, the gate pulse GP4, which is supplied to the scanning signal line G4 to be horizontally scanned secondly in the group Gr2, (i) becomes active at a start of the second dummy scanning period DS2 and (ii) becomes inactive at a an end of the second dummy scanning period DS2. During the second dummy scanning period DS2, a dummy electric potential, which corresponds to the second piece of dummy data Db and has a polarity (negative polarity) identical to that of a signal electric potential for the group Gr2, is supplied to the data signal line SL1. The second piece of dummy data Db is identical to the piece of video data D4 (i.e., a piece of data for a next frame), which corresponds to a first horizontal scan of the scanning signal line G4 after the dummy scan of the scanning signal line G4. Accordingly, as is clear from the electric potential VSL1 (refer to FIG. 4) supplied to the data signal line SL1, the dummy electric potential supplied during the second dummy scanning period DS2 is equal to the signal electric potential supplied during the horizontal scanning period H4.

Next, the gate pulse GP2, which is supplied to the scanning signal line G2, (i) becomes active at a start of the horizontal scanning period H2 and (ii) becomes inactive at an end of the horizontal scanning period H2. During the horizontal scanning period H2, a signal electric potential, which corresponds to the piece of video data D2 (i.e., a piece of video data corresponding to a pixel connected with the scanning signal line G2) and has a polarity (negative polarity) identical to that of the signal electric potential for the group Gr2, is supplied to the data signal line SL1.

Figure 5:
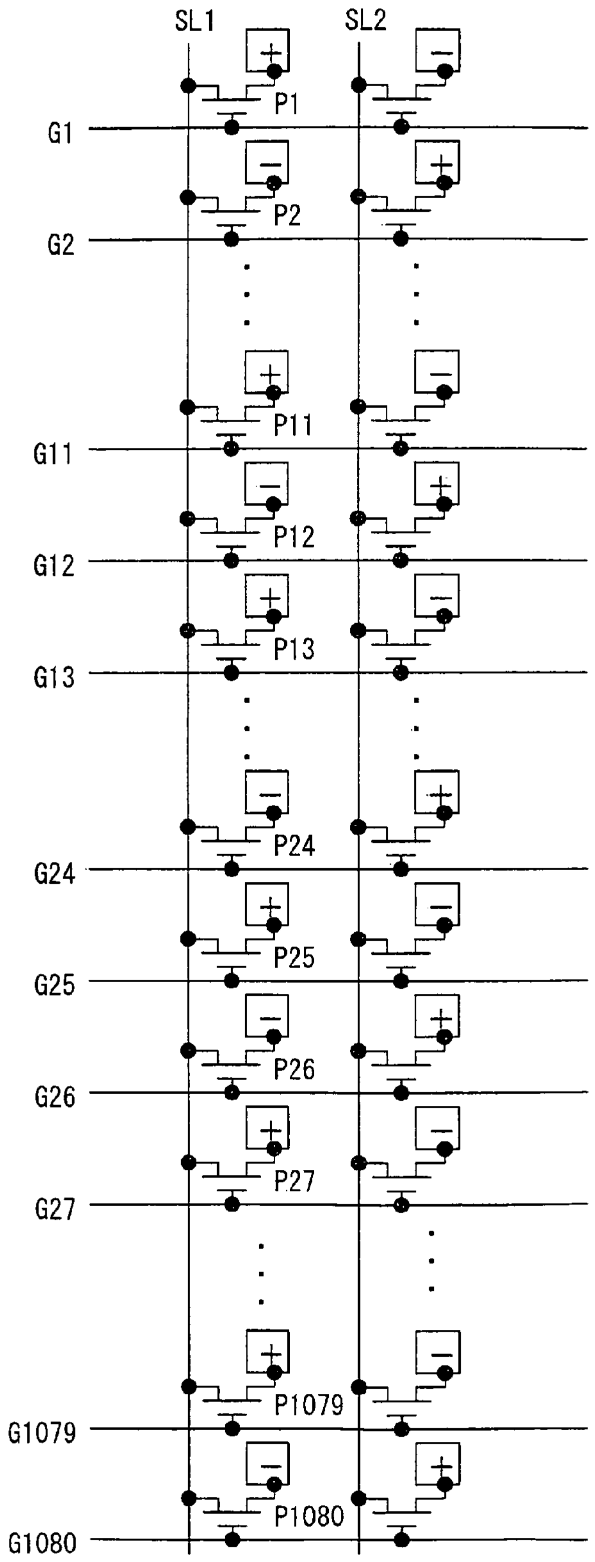
FIG. 5 is a view schematically illustrating distribution of polarities of electric potentials in the liquid crystal display device.

According to the liquid crystal display device of the present embodiment, it is possible to supply signal electric potentials to the pixels so that polarities of the signal electric potentials supplied to the pixels are arranged in a dot-inversion manner in a column direction (i.e., in a direction in which the data signal lines extend) (see FIG. 5). This makes it possible to suppress flicker. Further, it is possible to reduce power consumption and heat generation of a driver and to increase a charging rate of the pixels, as compared with a case where the data signal lines are dot-inversion driven (i.e., 1H inversion). Furthermore, immediately after reversal of a polarity of a signal electric potential supplied to a corresponding one of the data signal lines, the dummy electric potentials each having a polarity identical to the reversed polarity are supplied to the corresponding one of the data signal lines over the first and second dummy scanning periods. This makes it possible to reduce a difference between (i) a charging rate of pixels connected with a second scanning signal line in each odd-numbered block or pixels connected with a first scanning signal line in each even-numbered block and (ii) a charging rate of the other pixels. As such, it is possible to suppress unevenness, in a form of a horizontal string, which may be observed in the vicinity of a border between blocks in a case of a block-inversion driving.

Further, it is notable that, since one (1) scanning signal line is in the active state for a predetermined period and then deactivated in each of the first and second dummy scanning periods, it is possible to align, for each of the scanning signal lines, each of (i) loads imposed on a scanning signal line drive circuit before scans of the each of the scanning signal lines, (ii) loads imposed on the scanning signal line drive circuit at starts of the scans of the each of the scanning signal lines, and (iii) loads imposed on the scanning signal drive circuit during the scans of the each of the scanning signal lines.

Assume that a load imposed on the scanning signal line drive circuit at a time when simultaneously (i) one (1) scanning signal line is activated and (ii) another scanning signal line is deactivated is Lp. Similarly, assume that a load imposed on the scanning signal line drive circuit while one (1) scanning signal line is in the active state is Ly. The following description discusses, with reference to FIG. 6, loads imposed on the scanning signal line drive circuit (a) before a scan of each of the scanning signal lines G24, G25, and G26, which are in the vicinity of the border between the blocks B1 and B2, (b) at a start of the scan of the each of the scanning signal lines G24, G25, and G26, and (c) during the scan of the each of the scanning signal lines G24, G25, and G26.

Before the scan of the scanning signal line G24, the load Ly is imposed on the scanning signal line drive circuit because one (1) scanning signal line (i.e., the scanning signal line G22) is in the active state. At the start of the scan of the scanning signal line G24, the load Lp is imposed on the scanning signal line drive circuit because one (1) scanning signal line (i.e., the scanning signal line G24) is activated, and simultaneously, another scanning signal line (i.e., the scanning signal line G22) is deactivated. During the scan of the scanning signal line G24, the load Ly is imposed on the scanning signal line drive circuit because one (1) scanning signal line (i.e., the scanning signal line G24) is in the active state.

Before the scan of the scanning signal line G25, the load Ly is imposed on the scanning signal line drive circuit because one (1) scanning signal line (i.e., the scanning signal line G27) is in the active state. At the start of the scan of the scanning signal line G25, the load Lp is imposed on the scanning signal line drive circuit because one (1) scanning signal line (i.e., the scanning signal line G25) is activated, and simultaneously, another scanning signal line (i.e., the scanning signal line G27) is deactivated. During the scan of the scanning signal line G25, the load Ly is imposed on the scanning signal line drive circuit because one (1) scanning signal line (i.e., the scanning signal line G25) is in the active state.

Before the scan of the scanning signal line G26, the load Ly is imposed on the scanning signal line drive circuit because one (1) scanning signal line (i.e., the scanning signal line G24) is in the active state. At the start of the scan of the scanning signal line G26, the load Lp is imposed on the scanning signal line drive circuit because one (1) scanning signal line (i.e., the scanning signal line G26) is activated, and simultaneously, another scanning signal line (i.e., the scanning signal line G24) is deactivated. During the scan of the scanning signal line G26, the load Ly is imposed on the scanning signal line drive circuit because one (1) scanning signal line (i.e., the scanning signal line G26) is in the active state.

As has been described, according to the liquid crystal display device of the present embodiment, the dummy scanning periods are inserted immediately after reversal of a polarity of an electric potential supplied to each of the data signal lines. According to this configuration, it is possible to equalize (i) a load imposed on the scanning signal line drive circuit during each of the horizontal scanning periods and (ii) a load imposed on the scanning signal line drive circuit during each of the dummy scanning periods and align, for each of the scanning signal lines, each of (a) loads imposed on the scanning signal line drive circuit before scans of the each of the scanning signal lines, (b) loads imposed on the scanning signal line drive circuit at starts of the scans of the each of the scanning signal lines, and (c) loads imposed on the scanning signal line drive circuit during the scans of the each of the scanning signal lines. Accordingly, it is possible to further reduce a difference between (I) a charging rate of pixels connected with scanning signal lines to be horizontally scanned before and after the reversal of the polarity of each electric potential and (II) a charging rate of the other pixels, and thus possible to further suppress unevenness in the form of the horizontal string which occurs in the vicinity of a border between blocks.

Figure 6:
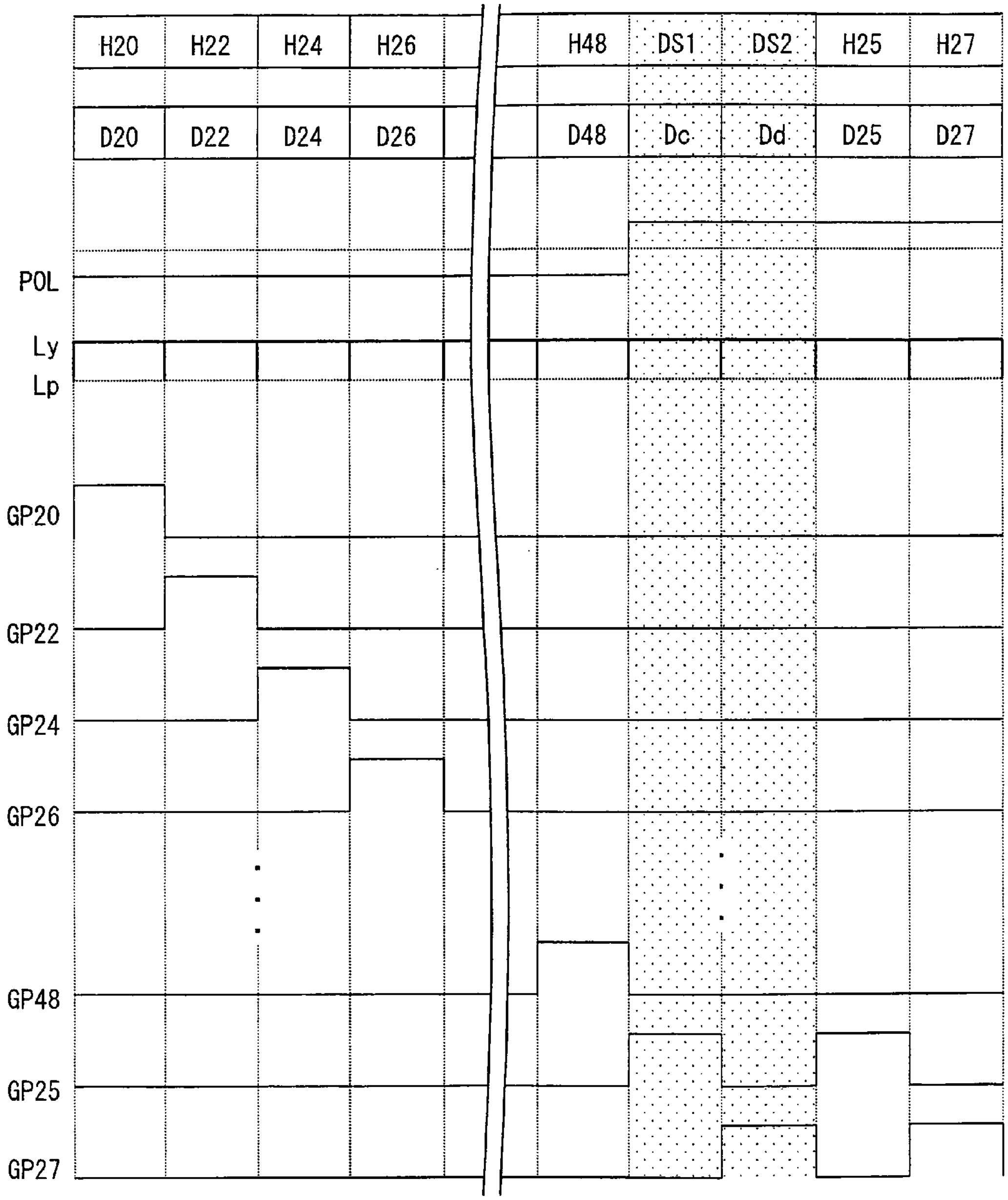
FIG. 6 is a timing chart illustrating how a load on a scanning signal line drive circuit varies in the example of FIGS. 1 and 2.
Figure 32:
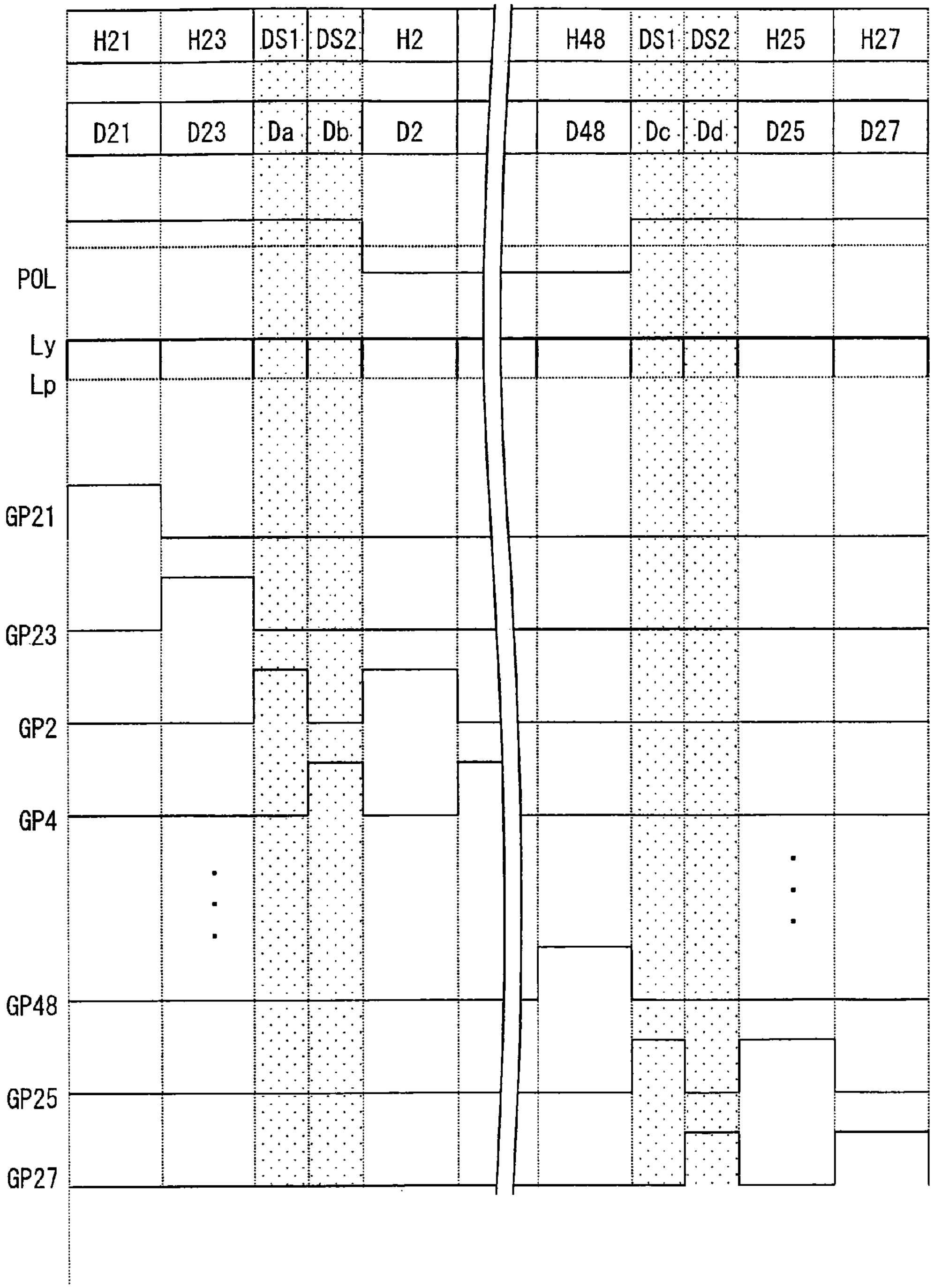
FIG. 32 is a timing chart illustrating a modification of FIG. 6.

Furthermore, according to the liquid crystal display device of the present embodiment, a load on the scanning signal line drive circuit is almost always kept at Ly throughout a vertical scanning period. That is, the load itself on the scanning signal line drive circuit shows little change. This suppresses unevenness in the form of the horizontal string more effectively. Further, since the timing at which the load becomes Lp is periodic as illustrated in FIG. 6, it is possible to more effectively suppress unevenness in the form of the horizontal string. Note however that, as illustrated in FIG. 32, the timing (period) at which the load becomes Ly and the timing at which the load becomes Lp can be non-periodic.

The liquid crystal display device of the present embodiment is preferably configured such that, during a single horizontal scanning period or during a single dummy scanning period, (i) a polarity of each signal electric potential supplied to each of the data signal lines is reverse to (ii) a polarity of each signal electric potential supplied to adjacent one of the each of the data signal lines. For example, as illustrated in FIG. 4, (a) a signal electric potential having a positive polarity is being supplied to the data signal line SL1 while (b) a signal electric potential having a negative polarity is being supplied to the data signal line SL2. Similarly, (I) a signal electric potential having a negative polarity is being supplied to the data signal line SL1 while (II) a signal electric potential having a positive polarity is being supplied to the data signal line SL2. This makes it possible to supply signal electric potentials to the pixels so that distribution of polarities of the signal electric potentials supplied to the pixels are arranged in a dot-inversion manner also in a line direction (i.e., a direction in which the scanning signal lines extend) (see FIG. 5), thereby further suppressing flicker.

According to the configuration of FIGS. 1 and 4, (i) the first piece of dummy data Da is identical to the piece of video data D2 (a piece of video data for the next frame), which corresponds to the first horizontal scan of the scanning signal line G2 after the dummy scan of the scanning signal line G2 and (ii) the second dummy data Db is identical to the piece of video data D4 (a piece of video data for the next frame), which corresponds to the first horizontal scan of the scanning signal line G4 after the dummy scan of the scanning signal line G4. Note, however, that the pieces of dummy data Da and Db are not limited to those described above. For example, (a) the first piece of dummy data Da can be identical to a piece of video data (a piece of video data for a current frame), which corresponds to a last horizontal scan of the scanning signal line G2 before the dummy scan of the scanning signal line G2 and (b) the second piece of dummy data Db can be identical to a piece of video data (a piece of video data for the current frame), which corresponds to a last horizontal scan of the scanning signal line G4 before the dummy scan of the scanning signal line G4. Alternatively, the first piece of dummy data Da can be made on the basis of (I) the piece of video data (the piece of video data for the current frame), which corresponds to the last horizontal scan of the scanning signal line G2 before the dummy scan of the scanning signal line G2 and (II) the piece of video data. D2 (the piece of video data for the next frame), which corresponds to the first horizontal scan of the scanning signal line G2 after the dummy scan of the scanning signal line G2. Similarly, the second piece of dummy data Db can be made on the basis of (A) the piece of video data (the piece of video data for the current frame), which corresponds to the last horizontal scan of the scanning signal line G4 before the dummy scan of the scanning signal line G4 and (B) the piece of video data D4 (the piece of video data for the next frame), which corresponds to the first horizontal scan of the scanning signal line G4 after the dummy scan of the scanning signal line G4. Further, the first and second pieces of dummy data Da and Db can be a predetermined (identical) piece of video data.

Although each of the dummy scanning periods is equal to one (1) horizontal scanning period according to the configuration of FIGS. 1, 2, and 4, each of the dummy scanning periods is not limited to that described above. Each of the dummy scanning periods can be shorter or longer than one (1) horizontal scanning period. For example, FIG. 32 shows a configuration in which each of the dummy scanning periods is shorter than one (1) horizontal scanning period. Note that, according also to FIG. 32, the timing of the horizontal scan in each of the horizontal scanning periods is same as the timing of the dummy scan in each of the dummy scanning periods.

According to the configuration of FIGS. 1, 2, and 4, (i) a scanning signal line to be horizontally scanned first in the next group is subjected to a dummy scan during the first dummy scanning period and (ii) a scanning signal line to be horizontally scanned secondly in the next group is subjected to a dummy scan during the second dummy scanning period. Note, however, that how the dummy scan is carried out is not limited to this. For example, as illustrated in FIG. 7, (a) a scanning signal line to be horizontally scanned first in the next group can be subjected to a dummy scan during the first dummy scanning period so as to be in the active state for a predetermined period and then deactivated and (b) the same scanning signal line can be again subjected to a dummy scan during the second dummy scanning period so as to be in the active state for a predetermined period and then deactivated.

Figure 7:
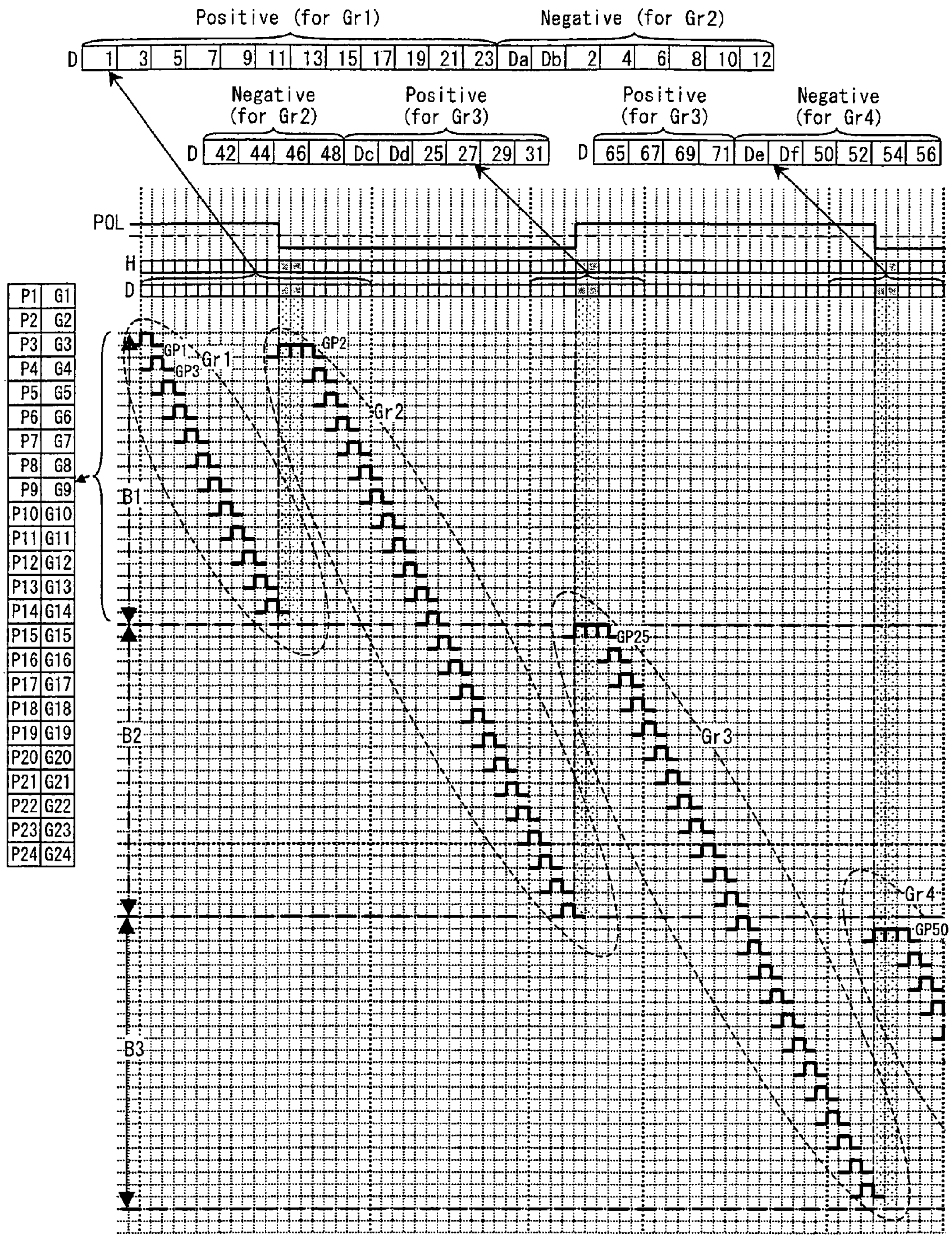
FIG. 7 is a timing chart illustrating another example of how the liquid crystal display device is driven.
Figure 8:
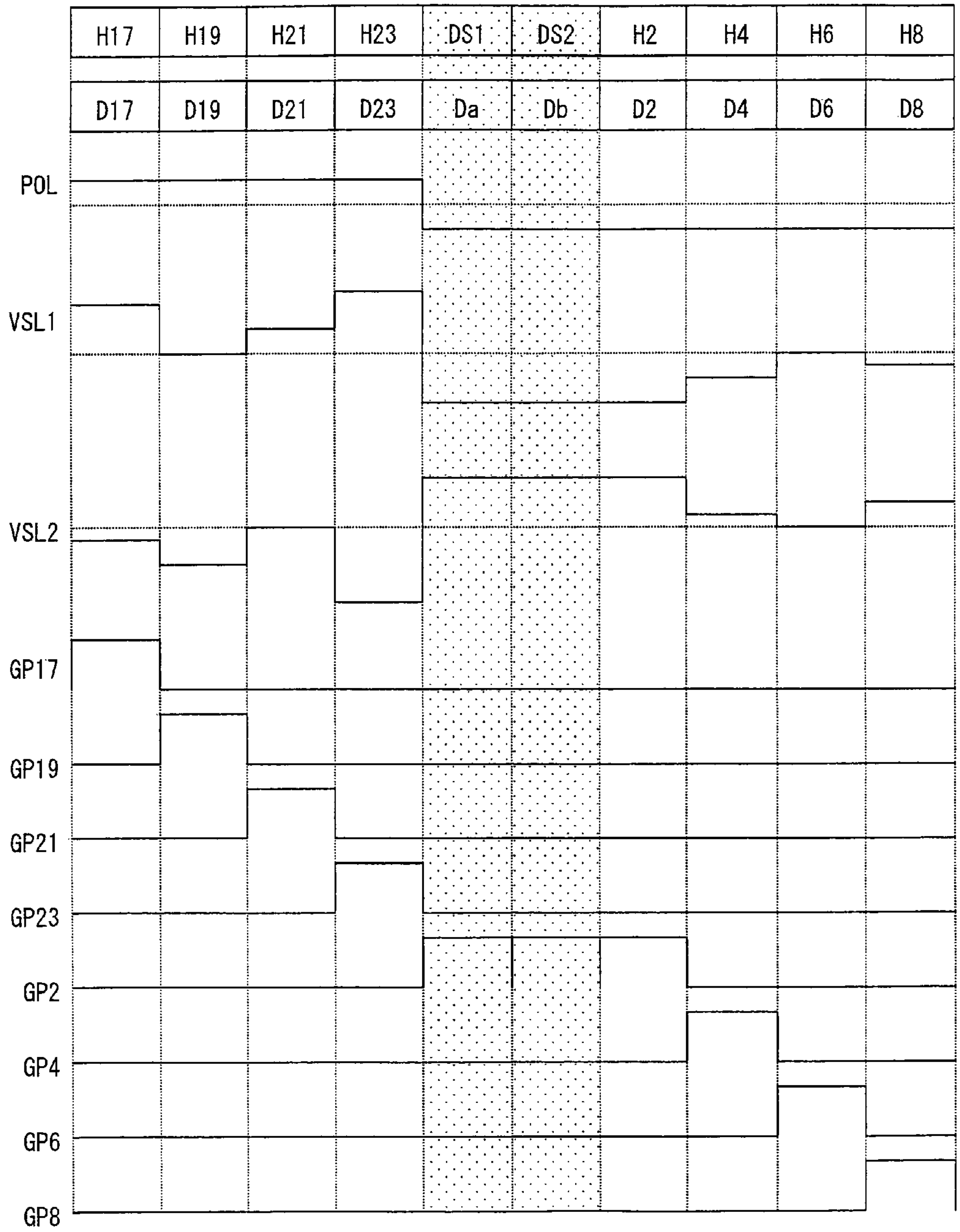
FIG. 8 is a timing chart more specifically illustrating the example of FIG. 7.

Specifically, as illustrated in FIGS. 7 and 8, the first and second pieces of dummy data Da and Db are inserted between (i) the piece of video data D23 which corresponds to the last horizontal scan (horizontal scan of G23) in the group Gr1 and (ii) the piece of video data D2 which corresponds to the first horizontal scan (horizontal scan of G2) in the group Gr2. Further, the first and second dummy scanning periods DS1 and DS2 are inserted between (a) the horizontal scanning period H23 which corresponds to the last horizontal scan in the group Gr1 and (b) the horizontal scanning period H2 which corresponds to the first horizontal scan in the group Gr2.

Under such circumstances, the gate pulse GP2, which is supplied to the scanning signal line G2 to be scanned first in the group Gr2, (i) becomes active at a start of the first dummy scanning period DS1 and (ii) becomes inactive at an end of the first dummy scanning period DS1. During the first dummy scanning period DS1, a dummy electric potential, which corresponds to the first piece of dummy data Da and has a polarity (negative polarity) identical to that of the signal electric potential for the group Gr2, is supplied to the data signal line SL1. The first piece of dummy data Da is identical to the piece of video data D2 (i.e., a piece of video data for the next frame), which corresponds to the first horizontal scan of the scanning signal line G2 after the dummy scan of the scanning signal line G2. Accordingly, as is clear from an electric potential VSL1 (refer to FIG. 8) supplied to the data signal line SL1, the dummy electric potential supplied during the first dummy scanning period DS1 is equal to the signal electric potential supplied during the horizontal scanning period H2.

Next, the gate pulse GP2, which is supplied to the scanning signal line G2 to be scanned first in the group Gr2, (i) becomes active again at a start of the second dummy scanning period DS2 and (ii) becomes inactive at an end of the second dummy scanning period DS2. During the second dummy scanning period DS2, a dummy electric potential, which corresponds to the second piece of dummy data Db and has a polarity (negative polarity) identical to that of the signal electric potential for the group Gr2, is supplied to the data signal line SL1. The second piece of dummy data Db is identical to the piece of video data D2 (i.e., a piece of video data for the next frame), which corresponds to the first horizontal scan of the scanning signal line G2 after the dummy scan of the scanning signal line G2. Accordingly, as is clear from the electric potential VSL1 (refer to FIG. 8) supplied to the data signal line SL1, the dummy electric potential supplied during the second dummy scanning period DS2 is equal to the signal electric potential supplied during the horizontal scanning period H2.

According also to the configuration of FIGS. 7 and 8, the following is achieved. Namely, assume that a load imposed on the scanning signal line drive circuit at a time when simultaneously (i) one (1) scanning signal line is activated and (ii) another scanning signal line is deactivated is Lp. Similarly, assume that a load imposed on the scanning signal line drive circuit while one (1) scanning signal line is in the active state is Ly. According to this configuration, it is possible to equalize (a) a load imposed on the scanning signal line drive circuit during each of the horizontal scanning periods and (b) a load imposed on the scanning signal line drive circuit during each of the dummy scanning periods and to align, for each of the scanning signal lines, each of (I) loads imposed on the scanning signal line drive circuit before scans of the each of the scanning signal lines, (II) loads imposed on the scanning signal line drive circuit at starts of the scans of the each of the scanning signal lines, and (III) loads imposed on the scanning signal line drive circuit during the scans of the each of the scanning signal lines (see FIG. 9). Accordingly, it is possible to further reduce a difference between (A) a charging rate of pixels connected with a scanning signal line (e.g., a second scanning signal line in each of the odd-numbered blocks or a first scanning signal line in each of the even-numbered blocks) to be horizontally scanned immediately after reversal of a polarity of an electric potential and (B) a charging rate of the other pixels, and thus possible to further suppress unevenness in the form of the horizontal string in the vicinity of a border between blocks.

Figure 9:
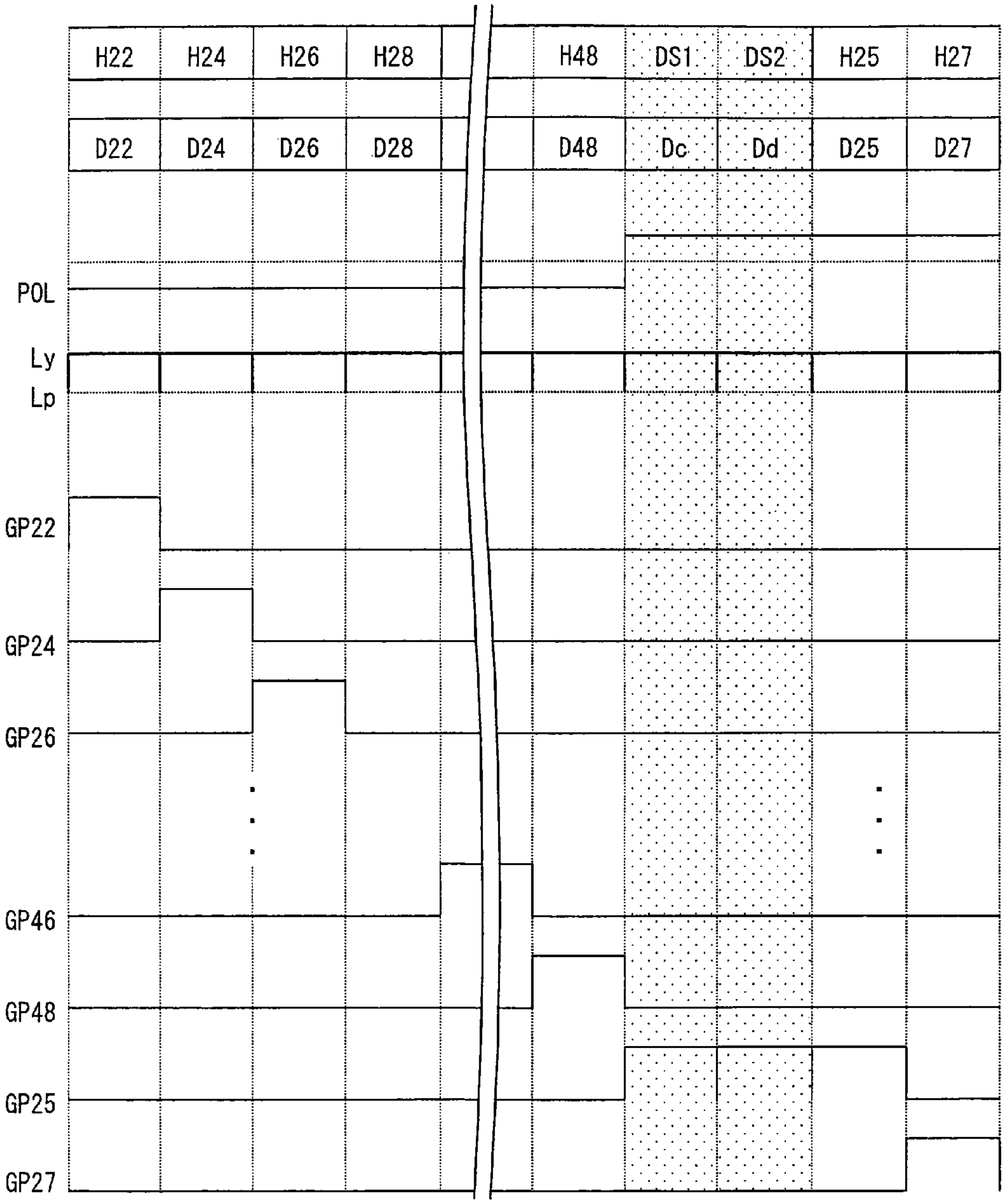
FIG. 9 is a timing chart illustrating how a load on the scanning signal drive circuit varies in the example of FIG. 7.

Furthermore, according also to this configuration, a load on the scanning signal line drive circuit is almost always kept at Ly throughout a vertical scanning period. That is, the load itself on the scanning signal line drive circuit shows little change. This suppresses unevenness in the form of the horizontal string more effectively. Further, since the timing at which the load becomes Lp is periodic as illustrated in FIG. 9, it is possible to more effectively suppress unevenness in the form of the horizontal string. Note here that, although each of the dummy scanning periods is equal to one (1) horizontal scanning period according to the configuration of FIGS. 7 and 8, each of the dummy scanning periods is not limited to this. Each of the dummy scanning periods can be shorter or longer than one (1) horizontal scanning period.

Moreover, the present embodiment can be arranged such that (i) a scanning signal line (a 13-th scanning signal line in the next group) three lines below the last scanning signal line in the current group is subjected to a dummy scan during the first dummy scanning period so as to be in the active state for a predetermined period and then deactivated and (ii) a scanning signal line (a 14-th scanning signal line in the next group) two lines below the scanning signal line, which is subjected to the dummy scan during the first dummy scanning period, is subjected to a dummy scan during the second dummy scanning period so as to be in the active state for a predetermined period and then is deactivated (see FIG. 10).

Figure 10:
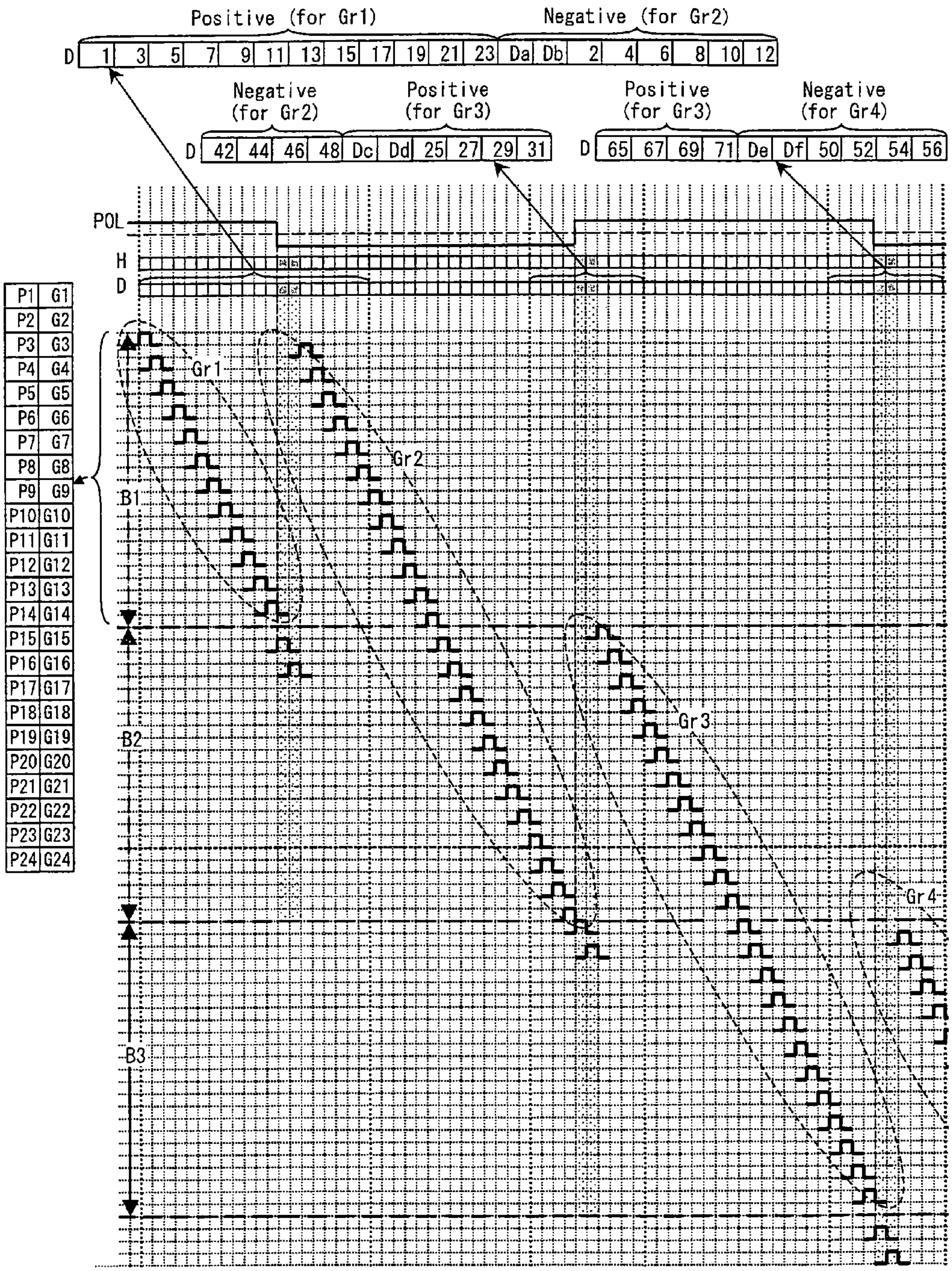
FIG. 10 is a timing chart illustrating a further example of how the liquid crystal display device is driven.
Figure 11:
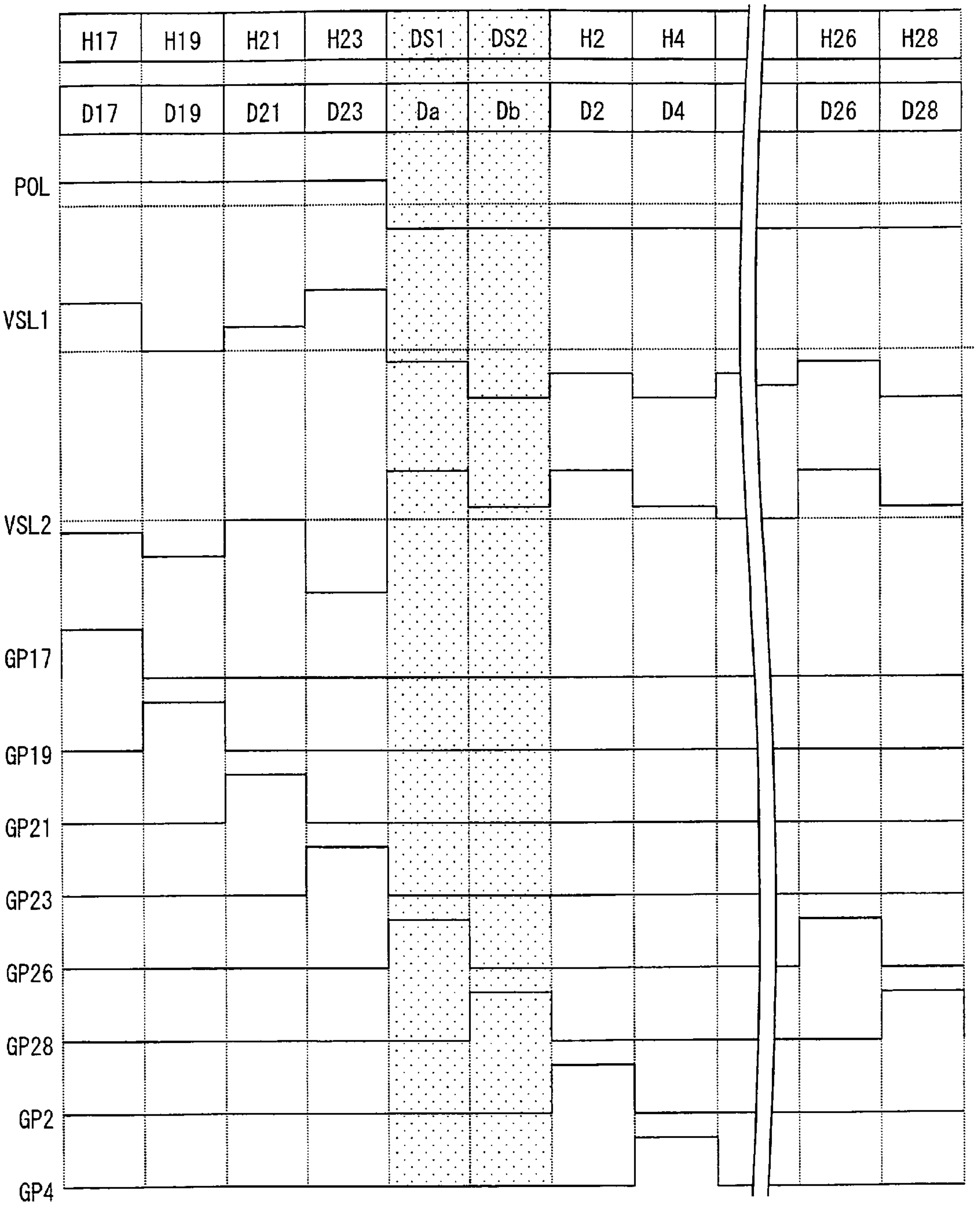
FIG. 11 is a timing chart more specifically illustrating the example of FIG. 10.

For example, as illustrated in FIGS. 10 and 11, the first and second pieces of dummy data Da and Db are inserted between (i) the piece of video data D23 which corresponds to the last horizontal scan (i.e., the horizontal scan of G23) in the group Gr1 and (ii) the piece of video data D2 which corresponds to the first horizontal scan (i.e., the horizontal scan of G2) in the group Gr2. Further, the first and second dummy scanning periods DS1 and DS2 are inserted between (a) the horizontal scanning period H23 which corresponds to the last horizontal scan in the group Gr1 and (b) the horizontal scanning period H2 which corresponds to the first horizontal scan in the group Gr2.

Under such circumstances, the gate pulse GP26, which is supplied to the scanning signal line G26 (i.e., the 13-th scanning signal line in the group Gr2) three lines below the scanning signal line G23, (i) becomes active at a start of the first dummy scanning period DS1 and (ii) becomes inactive at an end of the first dummy scanning period DS1. During the first dummy scanning period DS1, a dummy electric potential, which corresponds to the first piece of dummy data Da and has a polarity (negative polarity) identical to that of a signal electric potential for the group Gr2, is supplied to the data signal line SL1. The first piece of dummy data Da is identical to the piece of video data D26 (i.e., a piece of data for the next frame), which corresponds to a first horizontal scan of the scanning signal line G26 after the dummy scan of the scanning signal line G26. Accordingly, as is clear from an electric potential VSL1 (refer to FIG. 11) supplied to the data signal line SL1, the dummy electric potential supplied during the first dummy scanning period DS1 is equal to the signal electric potential supplied during the horizontal scanning period H26.

Next, the gate pulse GP28, which is supplied to the scanning signal line G28 two lines below the scanning signal line G26, (i) becomes active at a start of the second dummy scanning period DS2 and (ii) becomes inactive at an end of the second dummy scanning period DS2. During the second dummy scanning period DS2, a dummy electric potential, which corresponds to the second piece of dummy data Db and has a polarity (negative polarity) identical to that of a signal electric potential for the group Gr2, is supplied to the data signal line SL1. The second piece of dummy data Db is identical to the piece of video data D28 (i.e., a piece of data for the next frame), which corresponds to a first horizontal scan of the scanning signal line G28 after the dummy scan of the scanning signal line G28. Accordingly, as is clear from an electric potential VSL1 (refer to FIG. 11) supplied to the data signal line SL1, the dummy electric potential supplied during the second dummy scanning period DS2 is equal to the signal electric potential supplied during the horizontal scanning period H28.

According also to the configuration of FIGS. 10 and 11, the following is achieved. Namely, assume that a load imposed on the scanning signal line drive circuit at a time when simultaneously (i) one (1) scanning signal line is activated and (ii) another scanning signal line is deactivated is Lp. Similarly, a load imposed on the scanning signal line drive circuit while one (1) scanning signal line is in the active state is Ly. According to this configuration, it is possible to equalize (a) a load imposed on the scanning signal line drive circuit during each of the horizontal scanning periods and (b) the load imposed on the scanning signal line drive circuit during each of the dummy scanning periods and to align, for each of the scanning signal lines, each of (I) loads imposed on the scanning signal line drive circuit before scans of the each of the scanning signal lines, (II) loads imposed on the scanning signal line drive circuit at starts of the each of the scans of the scanning signal lines, and (III) loads imposed on the scanning signal line drive circuit during the scans of the each of the scanning signal lines (see FIG. 12). Accordingly, it is possible to further reduce a difference between (A) a charging rate of pixels connected with a scanning signal line to be horizontally scanned immediately after reversal of a polarity of an electric potential and (B) a charging rate of the other pixels, and thus possible to further suppress unevenness in the form of the horizontal string in the vicinity of a border between blocks.

Figure 12:
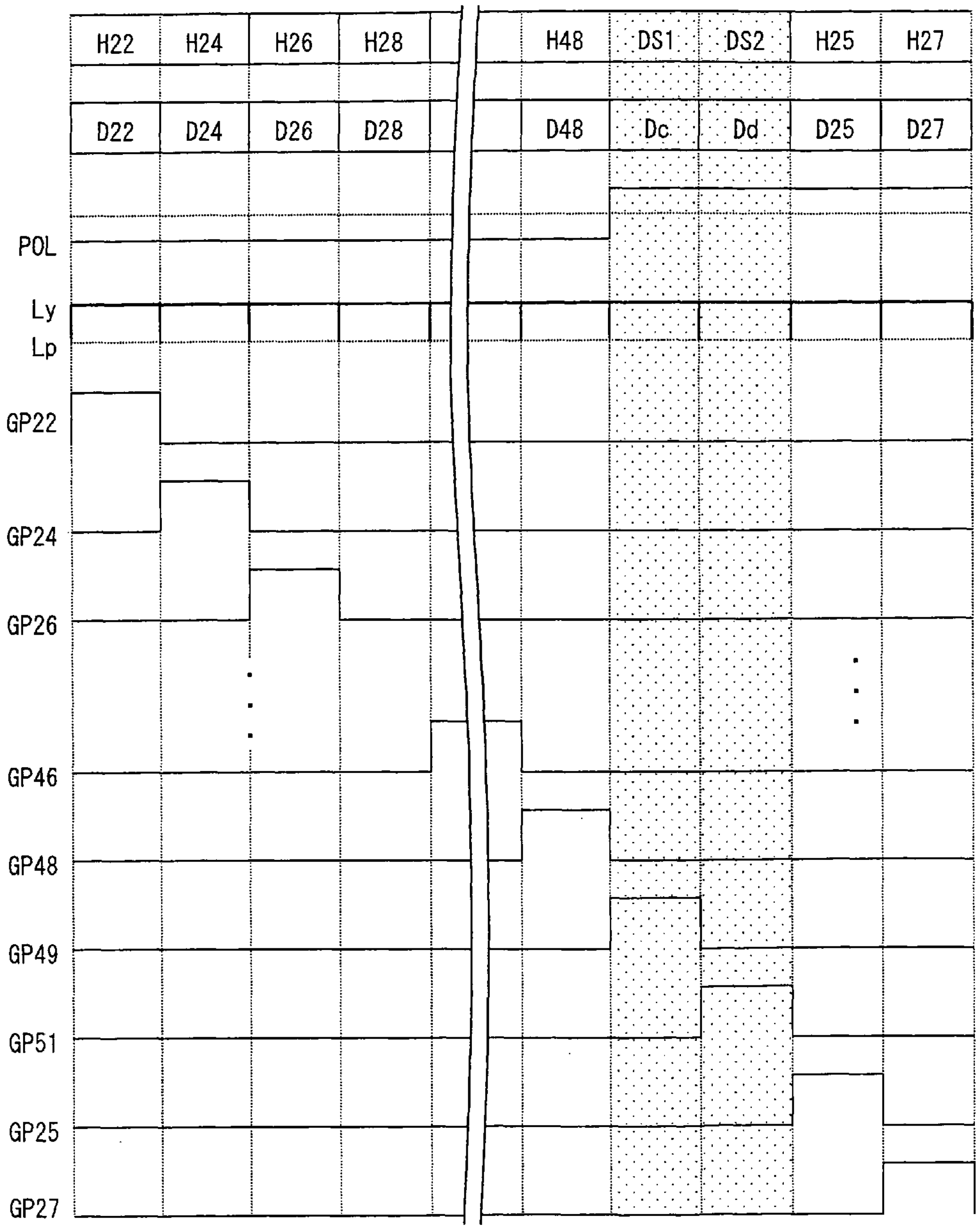
FIG. 12 is a timing chart illustrating how a load on the scanning signal line drive circuit varies in the example of FIG. 10.

Furthermore, according also to this configuration, a load on the scanning signal line drive circuit is almost always kept at Ly throughout a vertical scanning period. That is, the load itself on the scanning signal line drive circuit shows little change. This suppresses unevenness in the form of the horizontal string more effectively. Further, since the timing at which the load becomes Lp is periodic as illustrated in FIG. 12, it is possible to more effectively suppress unevenness in the form of the horizontal string. Note here that, although each of the dummy scanning periods is equal to one (1) horizontal scanning period according to the configuration of FIGS. 11 and 12, each of the dummy scanning periods is not limited to this. Each of the dummy scanning periods can be shorter or longer than one (1) horizontal scanning period.

Note here that, according to the configuration of FIGS. 10 and 11, (i) the first piece of dummy data Da is identical to the piece of video data D26 (i.e., a piece of video data for the next frame), which corresponds to the first horizontal scan of the scanning signal line G26 after the dummy scan of the scanning signal line G26 and (ii) the second piece of dummy data Db is identical to the piece of video data D28 (i.e., a piece of video data for the next frame), which corresponds to the first horizontal scan of the scanning signal line G28 after the dummy scan of the scanning signal line G28. In this case, a time interval between (a) the first dummy scanning period DS1 and (b) a horizontal scanning period H25 corresponding to the scanning signal line G25 preceding the scanning signal line G26 is less than or equal to 0.8 (ms). This reduces the likelihood that tearing (display shift observed in a moving image) is perceived. Note here that the first piece of dummy data Da can be identical to a piece of video data (i.e., a piece of video data for the current frame), which corresponds to a last horizontal scan of the scanning signal line G26 before the dummy scan of the scanning signal line G26. Similarly, the second piece of dummy data Db can be identical to a piece of video data (i.e., a piece of video data for the current frame), which corresponds to a last horizontal scan of the scanning signal line G28 before the dummy scan of the scanning signal line G28. This achieves an advantage that tearing is prevented from being perceived.

Moreover, the present embodiment can be arranged such that (i) a scanning signal line (a first scanning signal line in a group after the next group) two lines below the last scanning signal line in the current group is subjected to a dummy scan during the first dummy scanning period so as to be in the active state for a predetermined period and then deactivated and (ii) a scanning signal line (a second scanning signal line in the group after the next group) two lines below the scanning signal line subjected to the dummy scan during the first dummy scanning period is subjected to a dummy scan during the second dummy scanning period so as to be in the active state for a predetermined period and then is deactivated (see for example FIG. 13).

Figure 13:
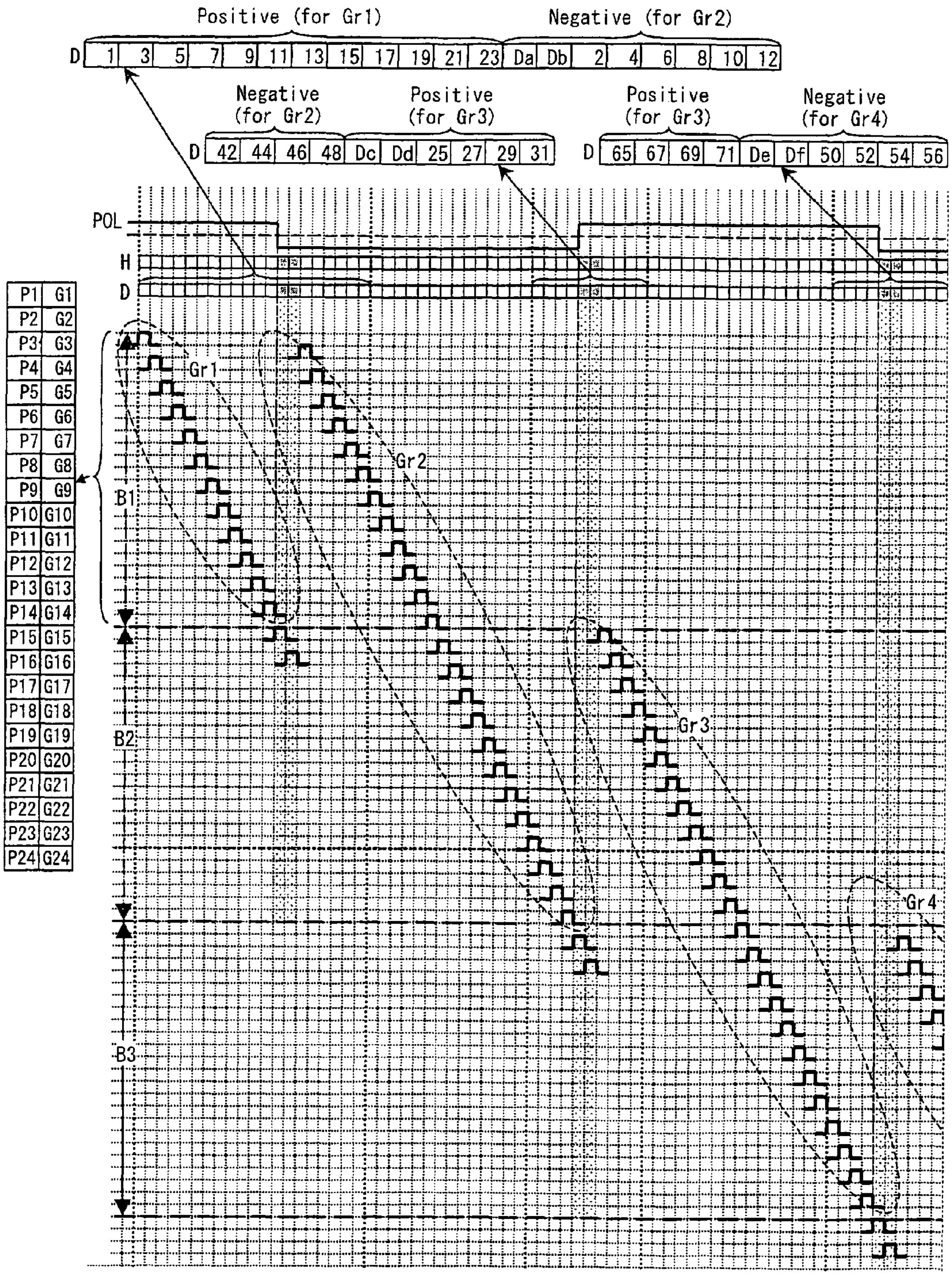
FIG. 13 is a timing chart illustrating still a further example of how the liquid crystal display device is driven.
Figure 14:
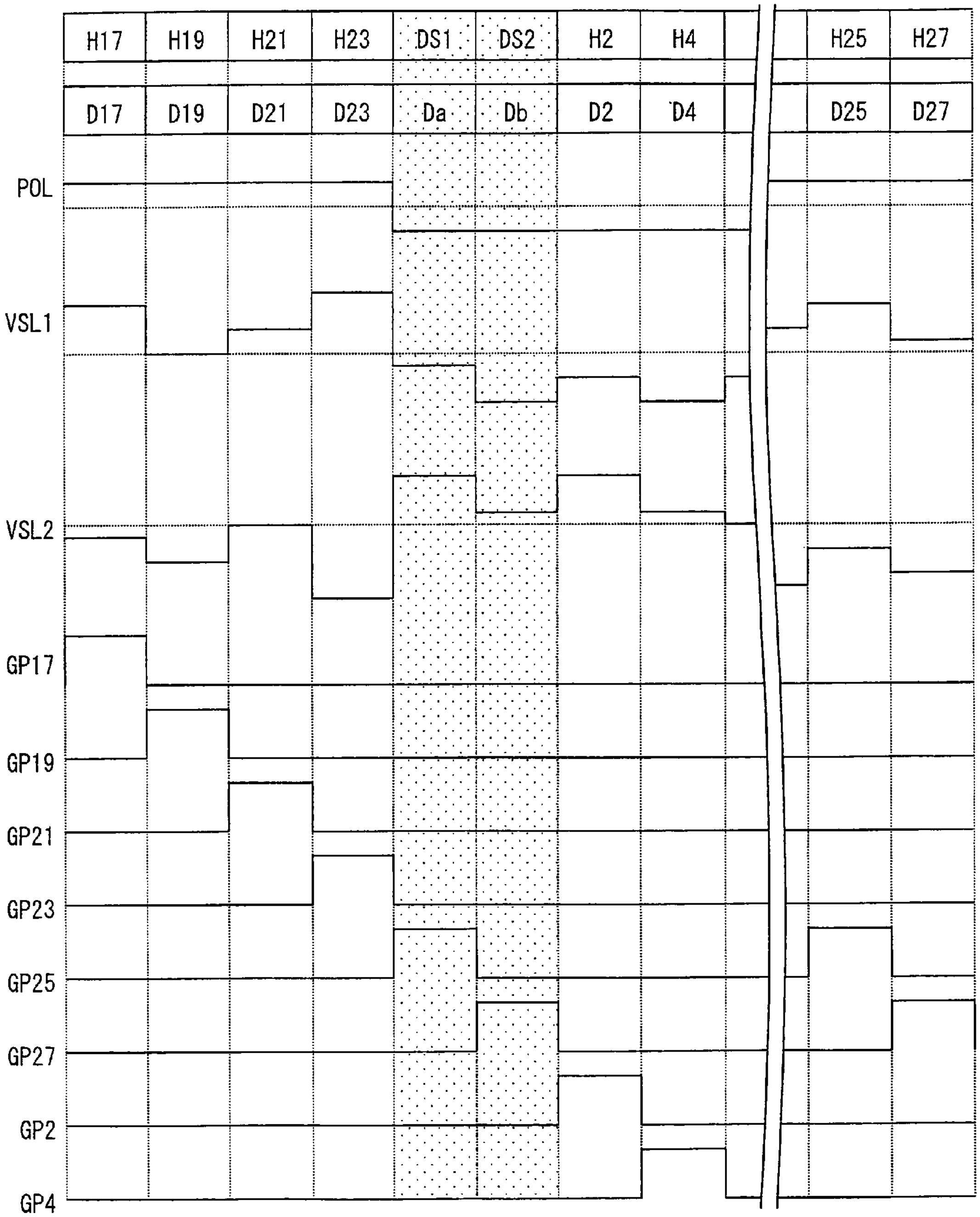
FIG. 14 is a timing chart more specifically illustrating the example of FIG. 13.

For example, as illustrated in FIGS. 13 and 14, the first and second pieces of dummy data Da and Db are inserted between (i) the piece of video data D23 which corresponds to the last horizontal scan (i.e., the horizontal scan of G23) in the group Gr1 and (ii) the piece of video data D2 which corresponds to the first horizontal scan (i.e., the horizontal scan of G2) in the group Gr2. Further, the first and second dummy scanning periods DS1 and DS2 are inserted between (a) a horizontal scanning period H23 which corresponds to the last horizontal scan in the group Gr1 and (b) a horizontal scanning period H2 which corresponds to the first horizontal scan in the group Gr2.

Under such circumstances, the gate pulse GP25, which is supplied to the scanning signal line G25 (i.e., the first scanning signal line in the group Gr3 which is subsequent to the group Gr2) two lines below the scanning signal line G23, (i) becomes active at a start of the first dummy scanning period DS1 and (ii) becomes inactive at an end of the first dummy scanning period DS1. During the first dummy scanning period DS1, a dummy electric potential, which corresponds to the first piece of dummy data Da and has a polarity (negative polarity) identical to that of a signal electric potential for the group Gr2, is supplied to the data signal line SL1. The first piece of dummy data Da is identical to a piece of video data (i.e., a piece of data for the current frame), which corresponds to a last horizontal scan of the scanning signal line G25 before the dummy scan of the scanning signal line G25.

Next, the gate pulse GP27, which is supplied to the scanning signal line G27 (i.e., the second scanning signal line in the group Gr3) two lines below the scanning signal line G25, (i) becomes active at a start of the second dummy scanning period DS2 and (ii) becomes inactive at an end of the second dummy scanning period DS2. During the second dummy scanning period DS2, a dummy electric potential, which corresponds to the second piece of dummy data Db and has a polarity (negative polarity) identical to that of a signal electric potential for the group Gr2, is supplied to the data signal line SL1. The second piece of dummy data Db is identical to the piece of video data (i.e., a piece of data for the current frame), which corresponds to a last horizontal scan of the scanning signal line G27 before the dummy scan of the scanning signal line G27.

According also to the configuration of FIGS. 13 and 14, the following is achieved. Namely, assume that a load imposed on the scanning signal line drive circuit at a time when simultaneously (i) one (1) scanning signal line is activated and (ii) another scanning signal line is deactivated is Lp. Similarly, a load imposed on the scanning signal line drive circuit while one (1) scanning signal line is in the active state is Ly. According to this configuration, it is possible to equalize (a) a load imposed on the scanning signal line drive circuit during each of the horizontal scanning periods and (b) a load imposed on the scanning signal line drive circuit during each of the dummy scanning periods and to align, for each of the scanning signal lines, each of (I) loads imposed on the scanning signal line drive circuit before scans of the each of the scanning signal lines, (II) loads imposed on the scanning signal line drive circuit at starts of the scans of the each of the scanning signal lines, and (III) loads imposed on the scanning signal line drive circuit during the scans of the each of the scanning signal lines (see FIG. 15). Accordingly, it is possible to further reduce a difference between (A) a charging rate of pixels connected with scanning signal lines to be horizontally scanned before and after reversal of a polarity of an electric potential and (B) a charging rate of the other pixels, and thus possible to further suppress unevenness in the form of the horizontal string in the vicinity of a border between blocks.

Figure 15:
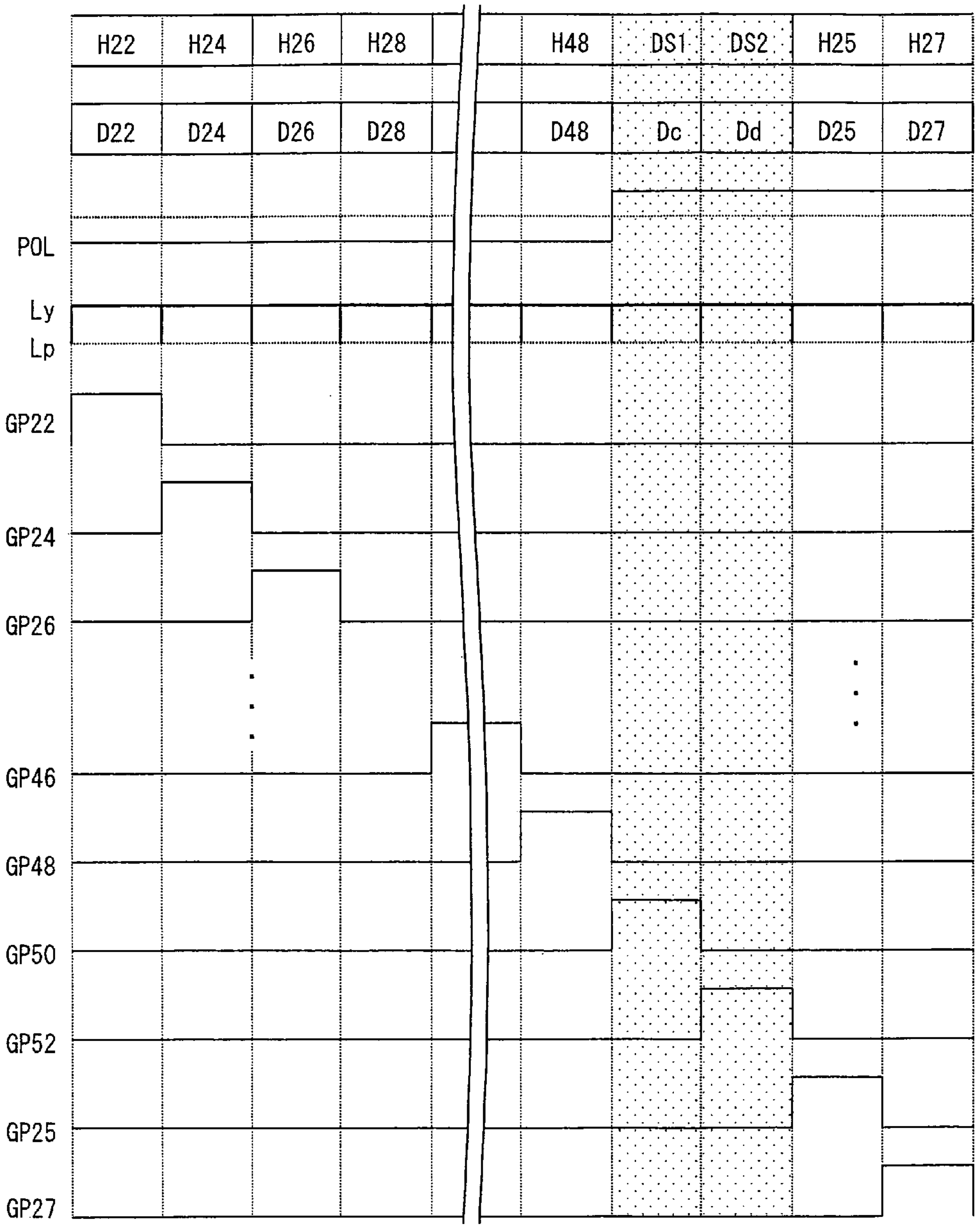
FIG. 15 is a timing chart illustrating how a load on the scanning signal line drive circuit varies in the example of FIG. 13.

Furthermore, according also to this configuration, a load on the scanning signal line drive circuit is almost always kept at Ly throughout a vertical scanning period. That is, the load itself on the scanning signal line drive circuit shows little change. This suppresses unevenness in the form of the horizontal string more effectively. Further, since the timing at which the load becomes Lp is periodic as illustrated in FIG. 15, it is possible to more effectively suppress unevenness in the form of the horizontal string. Note here that, although each of the dummy scanning periods is equal to one (1) horizontal scanning period according to the configuration of FIGS. 13 and 14, each of the dummy scanning periods is not limited to this. Each of the dummy scanning periods can be shorter or longer than one (1) horizontal scanning period.

Further, the configuration of FIGS. 1, 2 and 4 can be arranged as below. That is, (i) a width of each of the gate pulses GP0 through GP1081 is twice (i.e., 2H) as long as one (1) horizontal scanning period, (ii) each of the scanning signal lines is (a) activated in synchronization with a start of a horizontal scan or a dummy scan immediately before a horizontal scan of the each of the scanning signal lines and (b) deactivated in synchronization with an end of the horizontal scan of the each of the scanning signal lines, and (iii) each of scanning signal lines to be subjected to a dummy scan is (A) activated in synchronization with a start of a horizontal scan or a dummy scan immediately before a dummy horizontal scan of the each of the scanning signal lines and (B) deactivated in synchronization with an end of the dummy scan of the each of the scanning signal lines (see FIGS. 16 and 17). According also to the configuration of FIGS. 16 and 17, a timing of a horizontal scan in each of the horizontal scanning periods is same as a timing of the dummy scan in each of the dummy scanning periods. Specifically, a start (a start of output of a signal electric potential) and an end (an end of the output of the signal electric potential) of each of the horizontal scanning periods are matched with a start (a start of supplying of the signal electric potential) and an end (an end of the supplying of the signal electric potential) of a corresponding horizontal scan, respectively. Further, a start (a start of output of a dummy electric potential) and an end (an end of the output of the dummy electric potential) of each of the dummy scanning periods are matched with a start (a start of supplying of the dummy electric potential) and an end (an end of the supplying of the dummy electric potential) of a corresponding dummy scan, respectively.

Under such circumstances, the gate pulse GP23, which is supplied to the scanning signal line G23, (i) becomes active at a start of a horizontal scan (i.e., a start of the horizontal scanning period H21) immediately before a horizontal scan of the scanning signal line G23, (ii) is in an active state for two horizontal scanning periods throughout the horizontal scanning periods H21 and H23, and (ii) becomes inactive at an end of the horizontal scanning period H23. During the horizontal scanning period H21, a signal electric potential, which corresponds to the piece of video data D21 (i.e., a piece of video data corresponding to a pixel connected with the scanning signal line G21) and has a polarity (positive polarity) identical to that of a signal electric potential for the group Gr1, is supplied to the data signal line SL1. Further, during the horizontal scanning period H23, a signal electric potential, which corresponds to the piece of video data D23 (i.e., a piece of video data corresponding to a pixel connected with the scanning signal line G23) and has a polarity (positive polarity) identical to that of a signal electric potential for the group Gr1, is supplied to the data signal line SL1. That is, a pre-charging is carried out during the horizontal scanning period H21, and an actual charging (i.e., supplying of the signal electric potential which corresponds to the piece of video data D23 and has a positive polarity) is carried out by the horizontal scan during the horizontal scanning period H23.

Further, the gate pulse GP2, which is supplied to the scanning signal line G2, (i) becomes active at a start of a horizontal scan (i.e., at a start of the horizontal scanning period H23) immediately before a dummy scan of the scanning signal line G2, (ii) is in the active state for two horizontal scanning periods throughout the horizontal scanning period H23 and the first dummy scanning period DS1, and (iii) becomes inactive at an end of the first dummy scanning period DS1.

Further, the gate pulse GP4, which is supplied to the scanning signal line G4, (i) becomes active at a start of a dummy scan (i.e., at a start of the dummy scanning period DS1) immediately before a dummy scan of the scanning signal line G4, (ii) is in the active state for two horizontal scanning periods throughout the first and second dummy scanning periods DS1 and DS2, and (iii) becomes inactive at an end of the second dummy scanning period DS2.

Further, the gate pulse GP2, which is supplied to the scanning signal line G2, (i) becomes active at a start of a dummy scan (i.e., at a start of the dummy scanning period DS2) immediately before a horizontal scan of the scanning signal line G2, (ii) is in the active state for two horizontal scanning periods throughout the second dummy scanning period HDS2 and the horizontal scanning period H2, and (iii) becomes inactive at an end of the horizontal scanning period H2.

During the second dummy scanning period DS2, a signal electric potential, which corresponds to the second piece of dummy data Db and has a polarity (negative polarity) identical to that of a signal electric potential for the group Gr2, is supplied to the data signal line SL1. During the horizontal scanning period H2, a signal electric potential, which corresponds to the piece of video data D2 (i.e., a piece of video data corresponding to a pixel connected with the scanning signal line G2) and has a polarity (positive polarity) identical to that of a signal polarity for the group Gr2, is supplied to the data signal line SL1. That is, a pre-charging is carried out during the dummy scanning period DS2, and an actual charging (i.e., supplying of the signal electric potential which corresponds to the piece of video data D2 and has a positive polarity) is carried out by the horizontal scan during the horizontal scanning period H2.

Under such circumstances, assume that a load imposed on the scanning signal line drive circuit when (i) one (1) scanning signal line is in the active state and (ii) another scanning signal line and a further scanning signal line are simultaneously activated and deactivated, respectively, is Lq. Similarly, assume that a load imposed on the scanning signal line drive circuit while one (1) scanning signal line and another scanning signal line are in the active state is Lz. The following description discusses, with reference to FIG. 18, loads imposed on the scanning signal line drive circuit (a) before a scan of each of scanning signal lines G24, G25, and G26, which are in the vicinity of a border between the blocks B1 and B2, (b) at a start of the scan of the each of the scanning signal lines G24, G25, and G26, and (c) during the scan of the each of the scanning signal lines G24, G25, and G26.

Before the scan of the scanning signal line G24, the load Lz is imposed on the scanning signal line drive circuit because one (1) scanning signal line (i.e., the scanning signal line G22) and another scanning signal line (i.e., the scanning signal line G24) are in the active state. At the start of the scan of the scanning signal line G24, the load Lq is imposed on the scanning signal line drive circuit because (i) one (1) scanning signal line (i.e., the scanning signal line G24) is in the active state and (ii) another scanning signal line (i.e., the scanning signal line G26) and a further scanning signal line (i.e., the scanning signal line G22) are simultaneously activated and deactivated, respectively. During the scan of the scanning signal line G24, the load Lz is imposed on the scanning signal line drive circuit because one (1) scanning signal line (i.e., the scanning signal line G24) and another scanning signal line (i.e., the scanning signal line G26) are in the active state.

Before the scan of the scanning signal line G25, the load Lz is imposed on the scanning signal line drive circuit because one (1) scanning signal line (i.e., the scanning signal line G25) and another scanning signal line (i.e., the scanning signal line G27) are in the active state. At the start of the scan of the scanning signal line G25, a load of approximately Lq is imposed on the scanning signal line drive circuit because (i) one (1) scanning signal line (i.e., the scanning signal line G25) is in the active state and (ii) another scanning signal line (i.e., the scanning signal line G27) is deactivated and then activated. During the scan of the scanning signal line G25, the load Lz is imposed on the scanning signal line drive circuit because one (1) scanning signal line (i.e., the scanning signal line G25) and another scanning signal line (i.e., the scanning signal line G27) are in the active state.

Before the scan of the scanning signal line G26, the load Lz is imposed on the scanning signal line drive circuit because one (1) scanning signal line (i.e., the scanning signal line G24) and another scanning signal line (i.e., the scanning signal line G26) are in the active state. At the start of the scan of the scanning signal line G26, the load Lq is imposed on the scanning signal line drive circuit because (i) one (1) scanning signal line (i.e., the scanning signal line G26) is in the active state and (ii) another scanning signal line (i.e., the scanning signal line G28) and a further scanning signal line (i.e., the scanning signal line G24) are simultaneously activated and deactivated, respectively. During the scan of the scanning signal line G26, the load Lz is imposed on the scanning signal line drive circuit because one (1) scanning signal line (i.e., the scanning signal line G26) and another scanning signal line (i.e., the scanning signal line G28) are in the active state.

Figure 16:
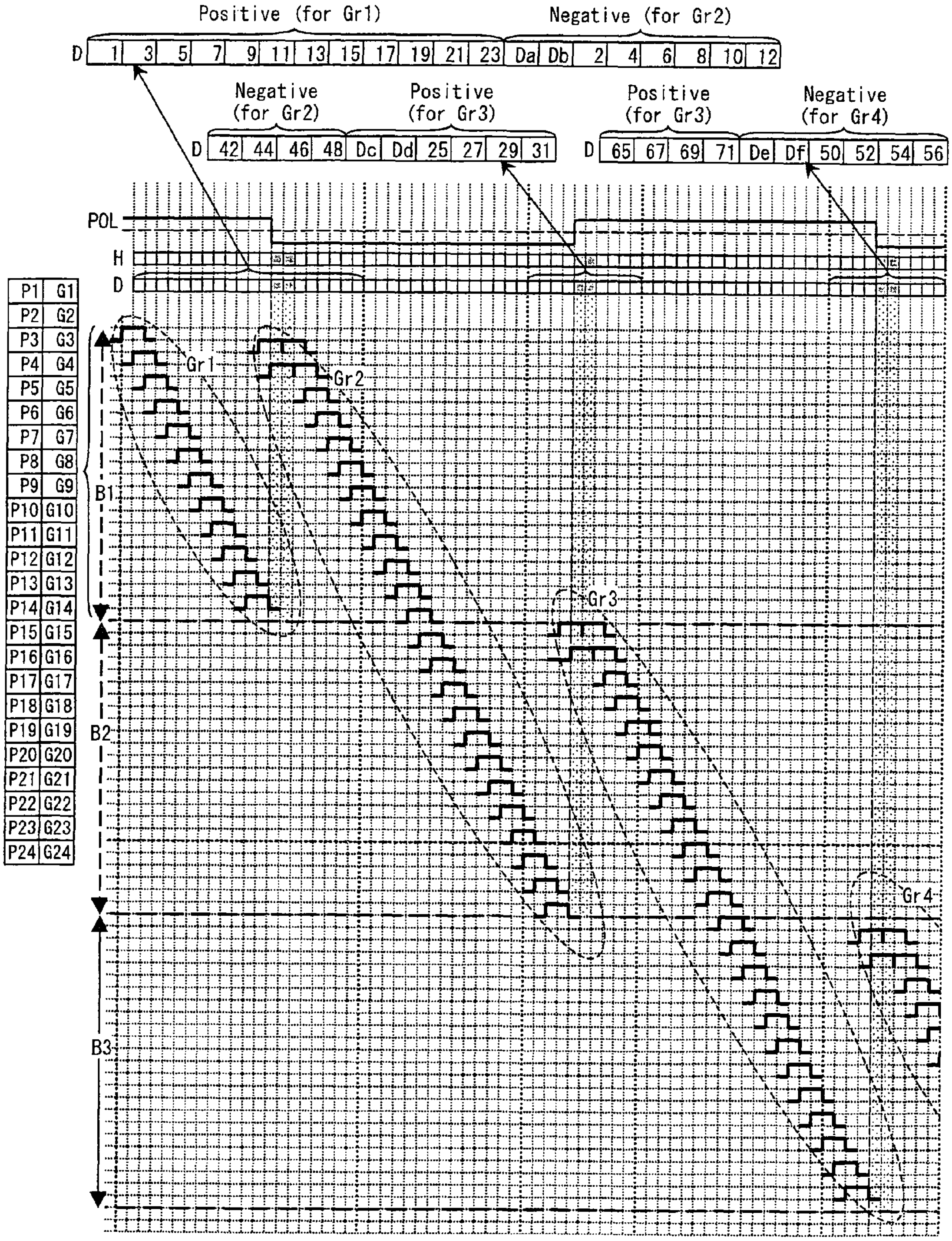
FIG. 16 is a timing chart illustrating still yet a further example of how the liquid crystal display device is driven.
Figure 17:
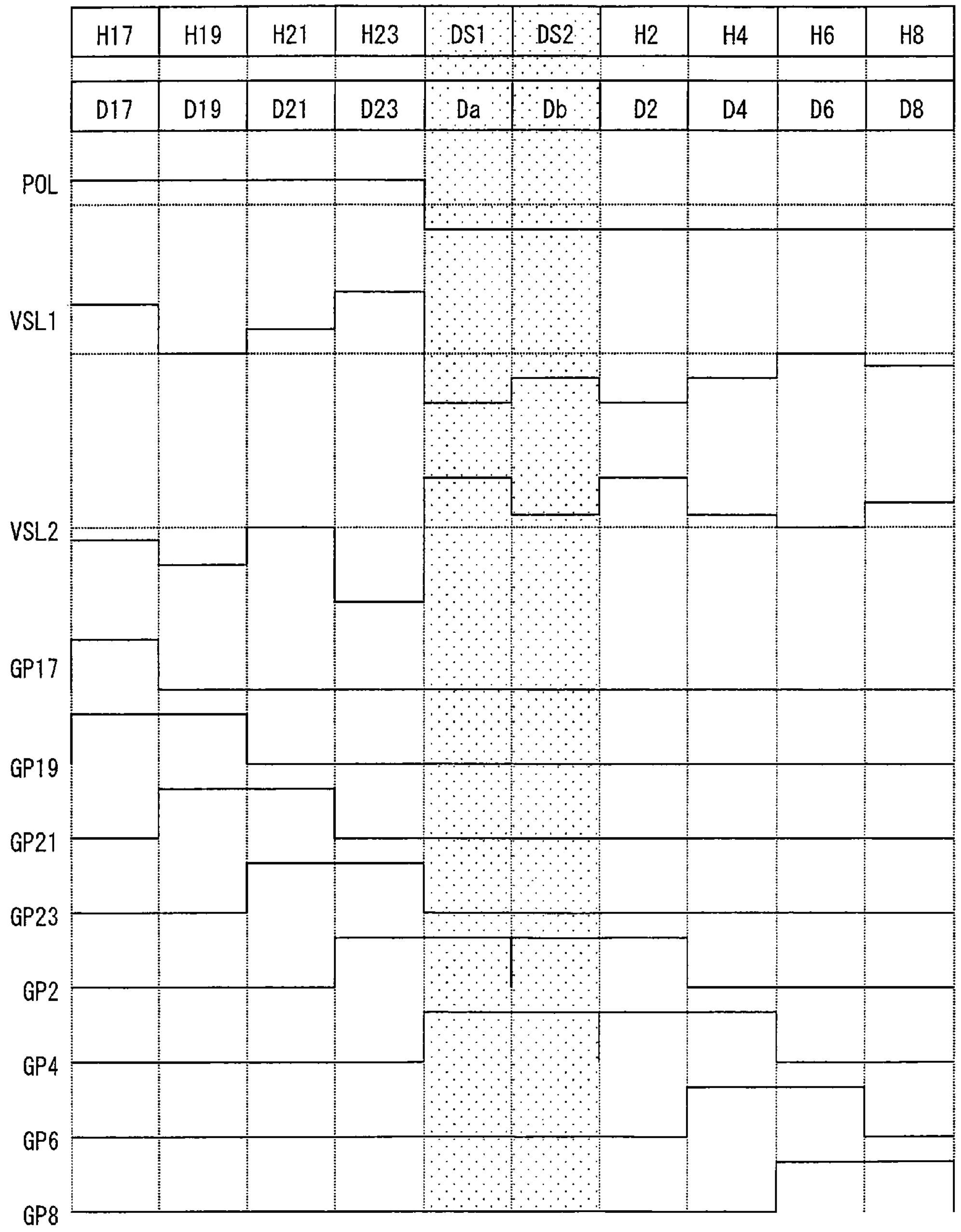
FIG. 17 is a timing chart more specifically illustrating the example of FIG. 16.

As described above, according also to the configuration of FIGS. 15 and 16, it is possible to equalize (i) a load imposed on the scanning signal line drive circuit during each of the horizontal scanning periods and (ii) a load imposed on the scanning signal line drive circuit during each of the dummy scanning periods and to align, for each of the scanning signal lines, each of (a) loads imposed on the scanning signal line drive circuit before scans of the each of the scanning signal lines and (b) loads imposed on the scanning signal line drive circuit during the scans of the each of the scanning signal lines. Accordingly, it is possible to further reduce a difference between (I) a charging rate of pixels connected with scanning signal lines to be horizontally scanned before and after reversal of a polarity of an electric potential and (II) a charging rate of the other pixels, and thus possible to further suppress unevenness in the form of the horizontal string in the vicinity of a border between blocks.

Figure 18:
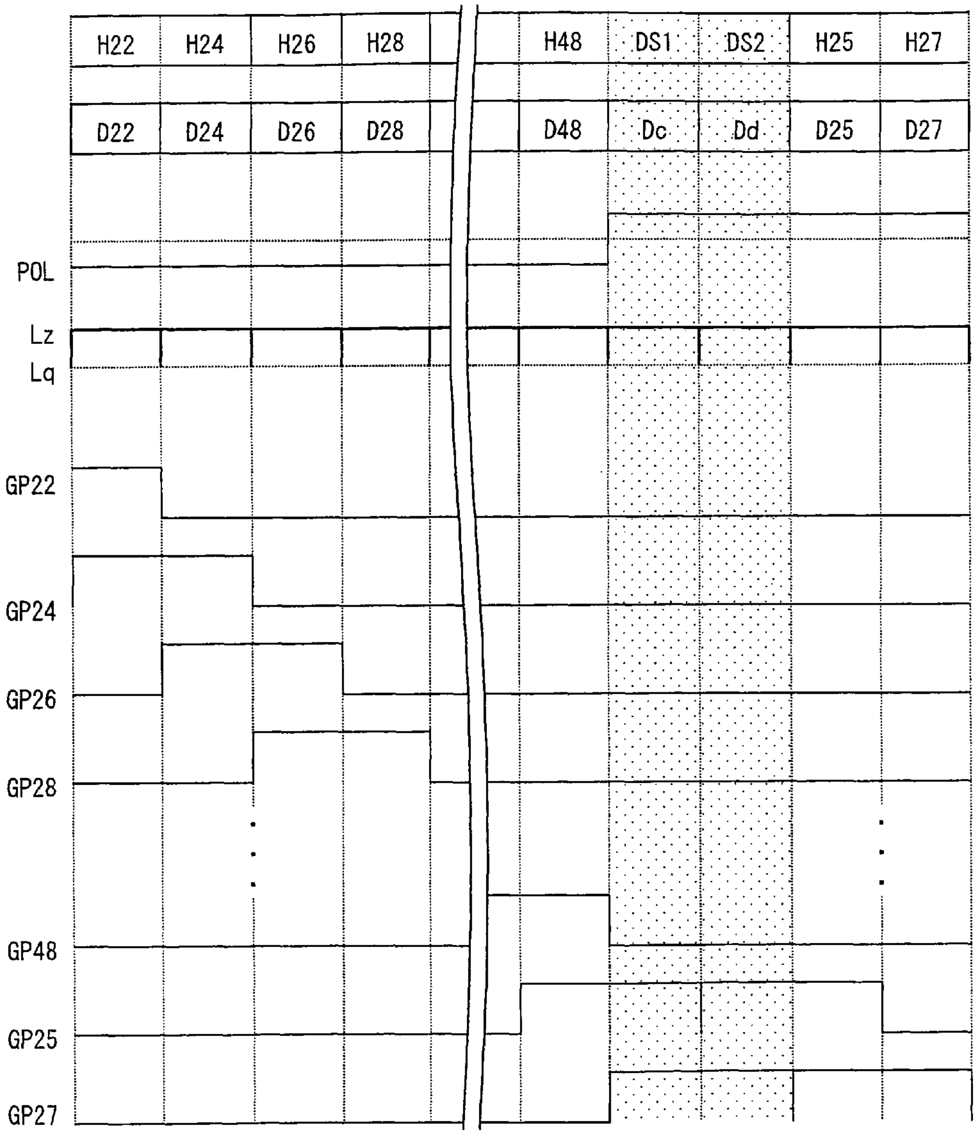
FIG. 18 is a timing chart illustrating how a load on the scanning signal line drive circuit varies in the example of FIG. 16.

Furthermore, according to this configuration, a load on the scanning signal line drive circuit is almost always kept at Lz throughout a vertical scanning period. That is, the load itself on the scanning signal line drive circuit shows little change. This suppresses unevenness in the form of the horizontal string more effectively. Further, since the timing at which the load becomes Lq is periodic as illustrated in FIG. 18, it is possible to more effectively suppress unevenness in the form of the horizontal string.

Moreover, according to this configuration, each pixel is pre-charged for one (1) horizontal scanning period. This makes it possible to increase a charging rate of the each pixel. Note that, although each of the dummy scanning periods is equal to one (1) horizontal scanning period according to the configuration of FIGS. 16 and 17, each of the dummy scanning periods is not limited to this. Each of the dummy scanning periods can be shorter or longer than one (1) horizontal scanning period.

Figure 19:
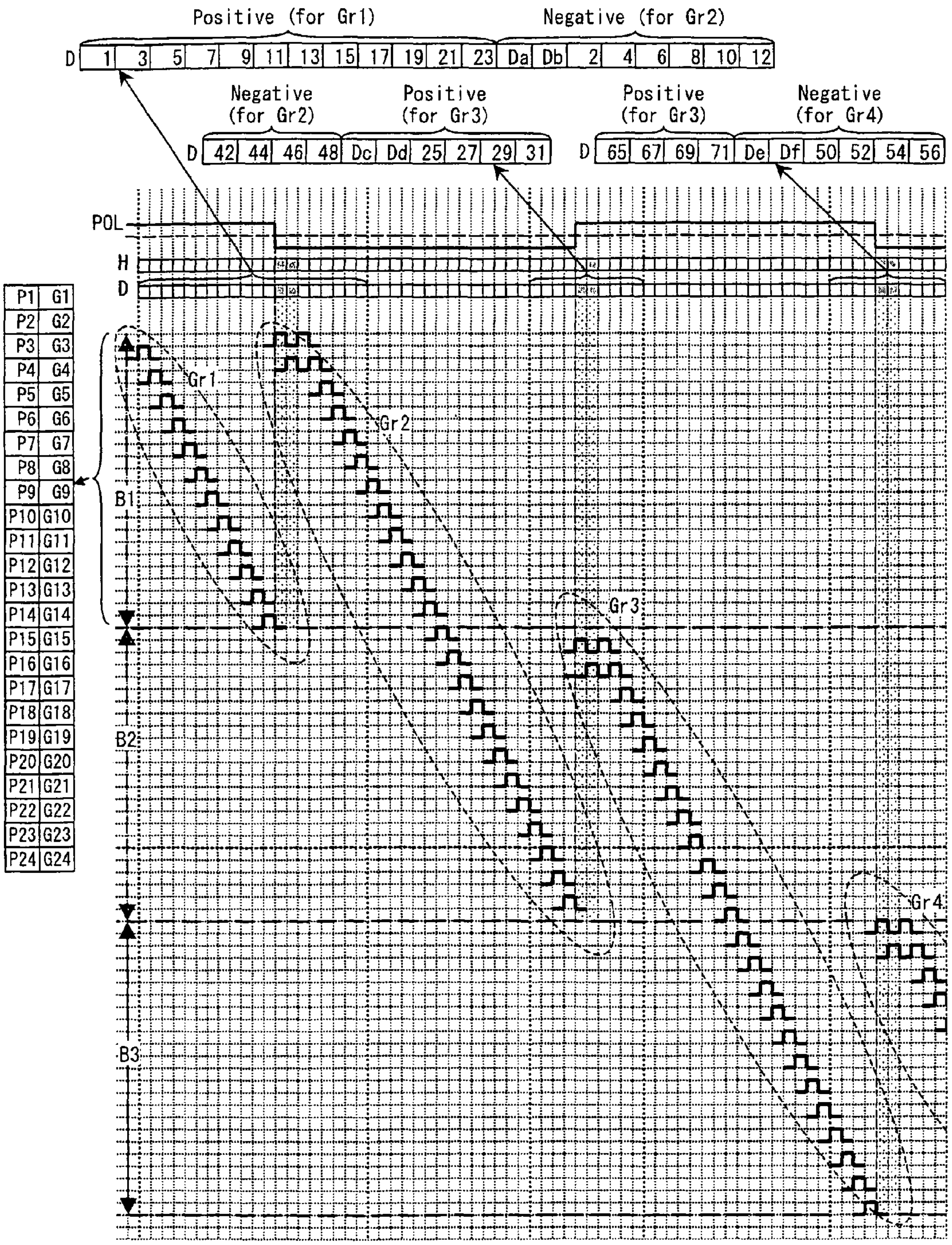
FIG. 19 is a timing chart illustrating how the liquid crystal display device is driven in a case where scanning signal lines are grouped in a different manner.
Figure 20:
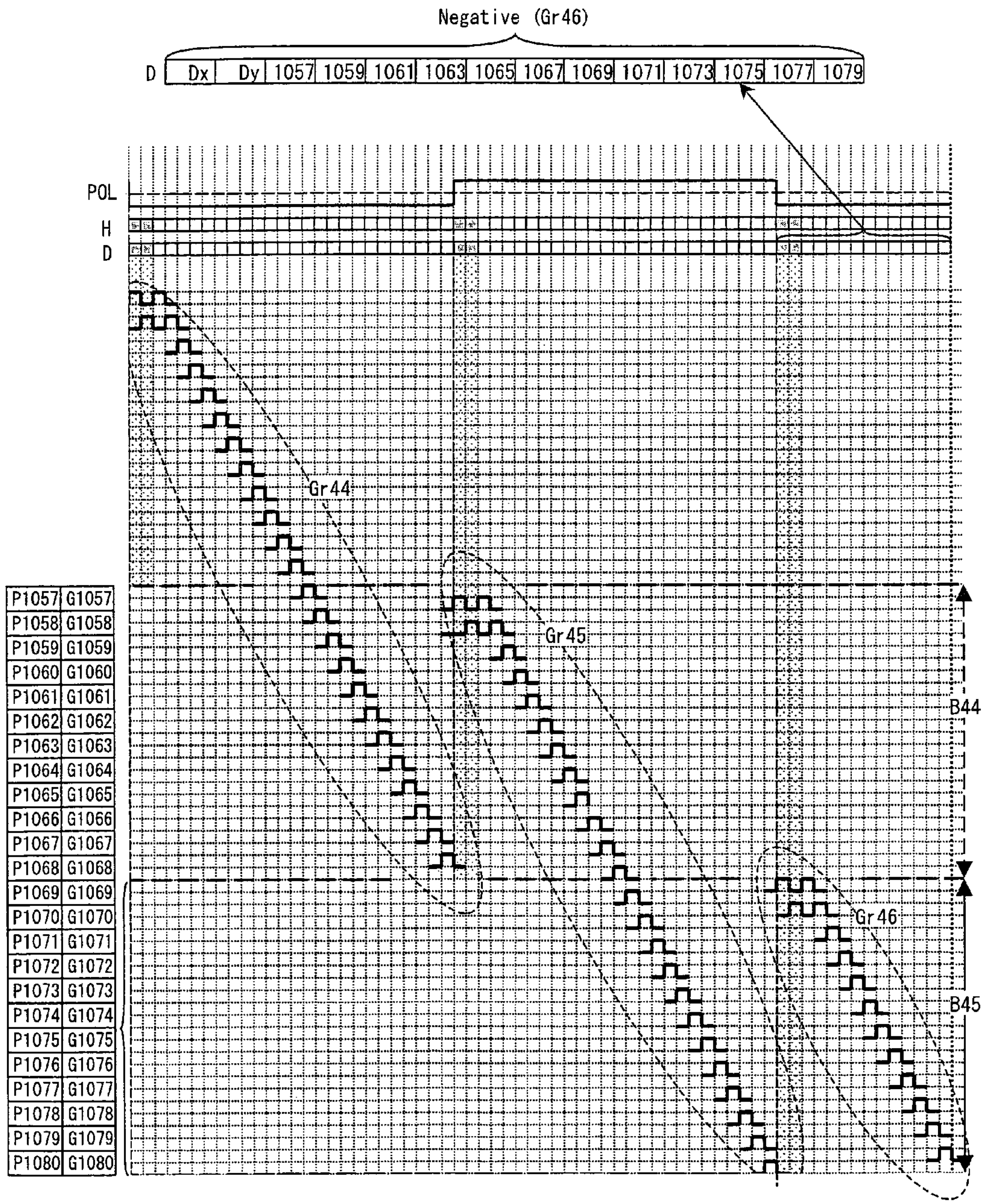
FIG. 20 is a timing chart illustrating a continuation of the timing chart of FIG. 19.

Further, the liquid crystal display device can be configured such that the scanning signal lines are grouped as illustrated in FIGS. 19 and 20. That is, (i) 12 even-numbered scanning signal lines (G2, G4, . . . and G24) in the most upstream block B1 are grouped into a first group Gr1, (ii) 24 even-numbered scanning signal lines (G1, G3, . . . and G47) in the block B1 and the block B2 downstream of the block B1 are grouped into a group Gr2, and (iii) 24 odd-numbered scanning signal lines (G26, G28, . . . and G27) in the second block B2 and the block B3 downstream of the block B2 are grouped into a group Gr3. Similarly, 24 odd-numbered scanning signal lines included in a block Bj (j is an integer from 3 through 43) and a block B(j+1) downstream of the block Bj are grouped, and 24 even-numbered scanning signal lines included in the block B(j+1) and a block B(j+2) downstream of the block B(j+1) are grouped. This is repeated so as to make groups Gr4 through Gr45. Then, even-numbered scanning signal lines (G1057, G1059, . . . and G1079) included in a block B45, which is the most downstream block, are grouped into a last group Gr46. The groups Gr1 through Gr46 are sequentially selected from upstream to downstream.

Figure 21:
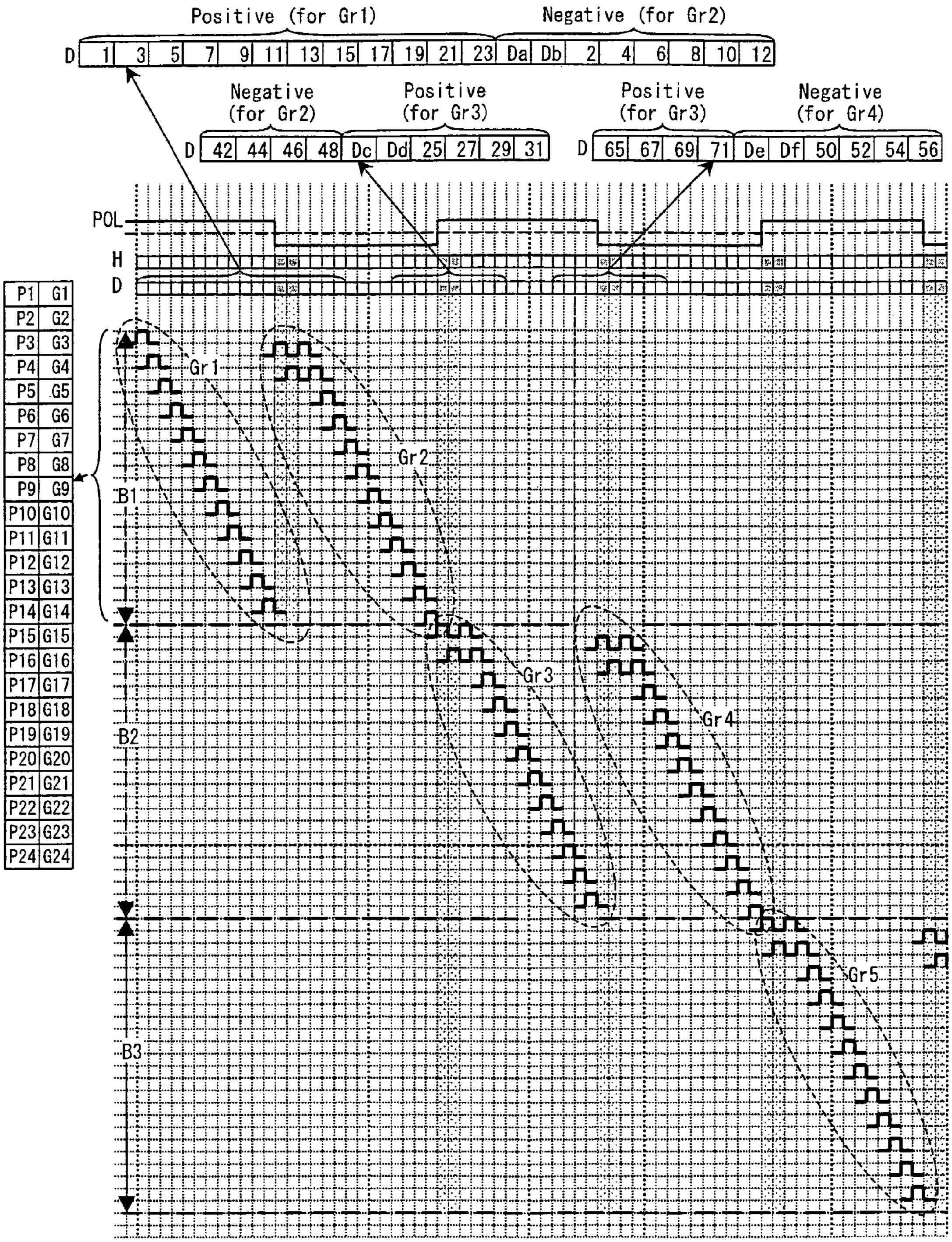
FIG. 21 is a timing chart illustrating how the liquid crystal display device is driven in a case where the scanning signal lines are grouped in a different manner.
Figure 22:
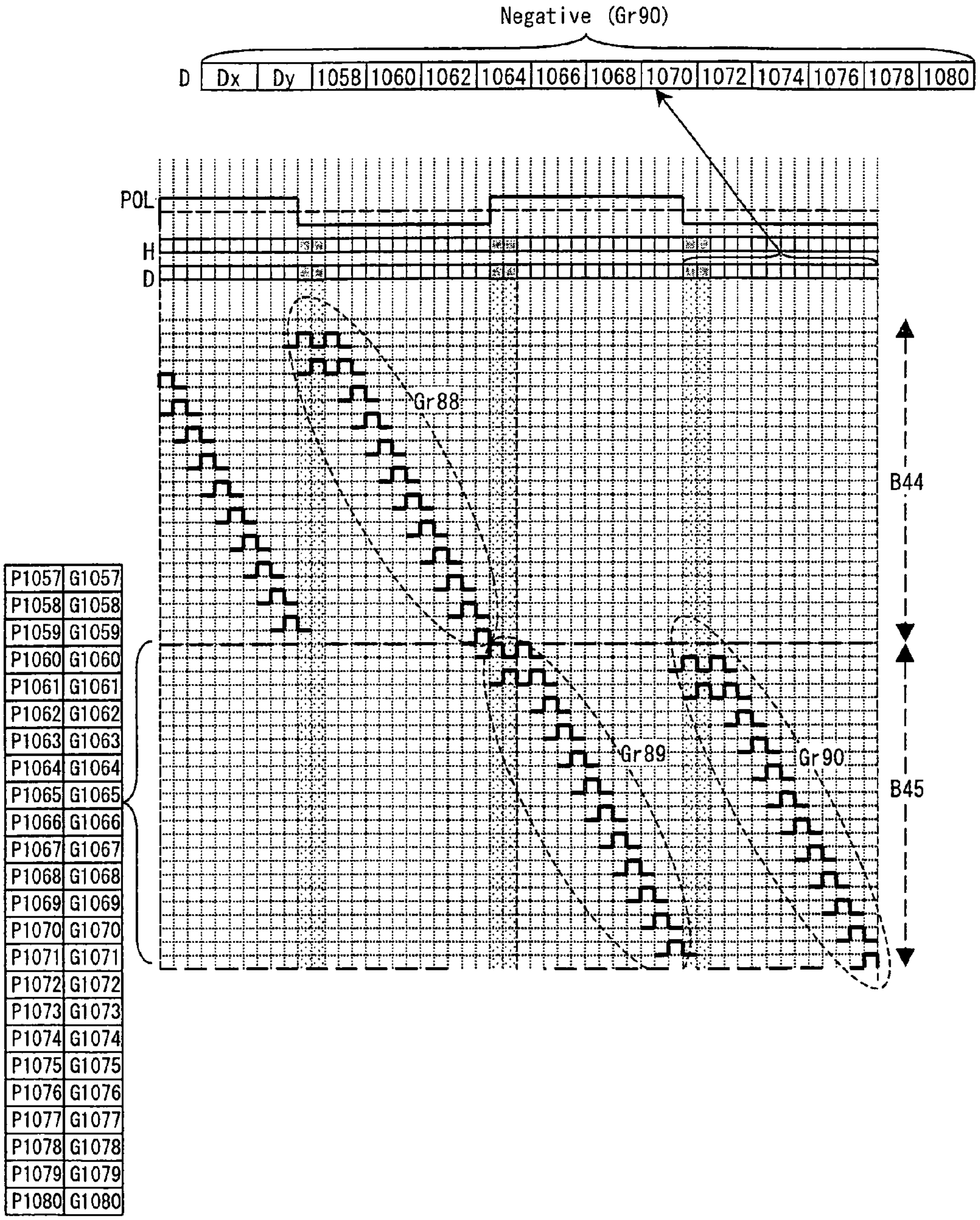
FIG. 22 is a timing chart illustrating a continuation of the timing chart of FIG. 21.

Furthermore, the liquid crystal display device can be configured such that the scanning signal lines are grouped as illustrated in FIGS. 21 and 22. That is, 12 odd-numbered scanning signal lines (G1, G3, . . . and G23) in the most upstream block B1 are grouped into a first group Gr1 and (ii) 12 even-numbered scanning signal lines (G2, G4, . . . and G24) in the block B1 are grouped into a group Gr2. Similarly, 12 odd-numbered scanning signal lines included in each block are grouped and 12 even-numbered scanning signal lines in the each block are grouped. This is repeated for the block B2 through the most downstream block B45 so as to make groups Gr3 through G90. The groups Gr1 through Gr90 are sequentially selected from upstream to downstream.

Embodiment 2

Figure 23:
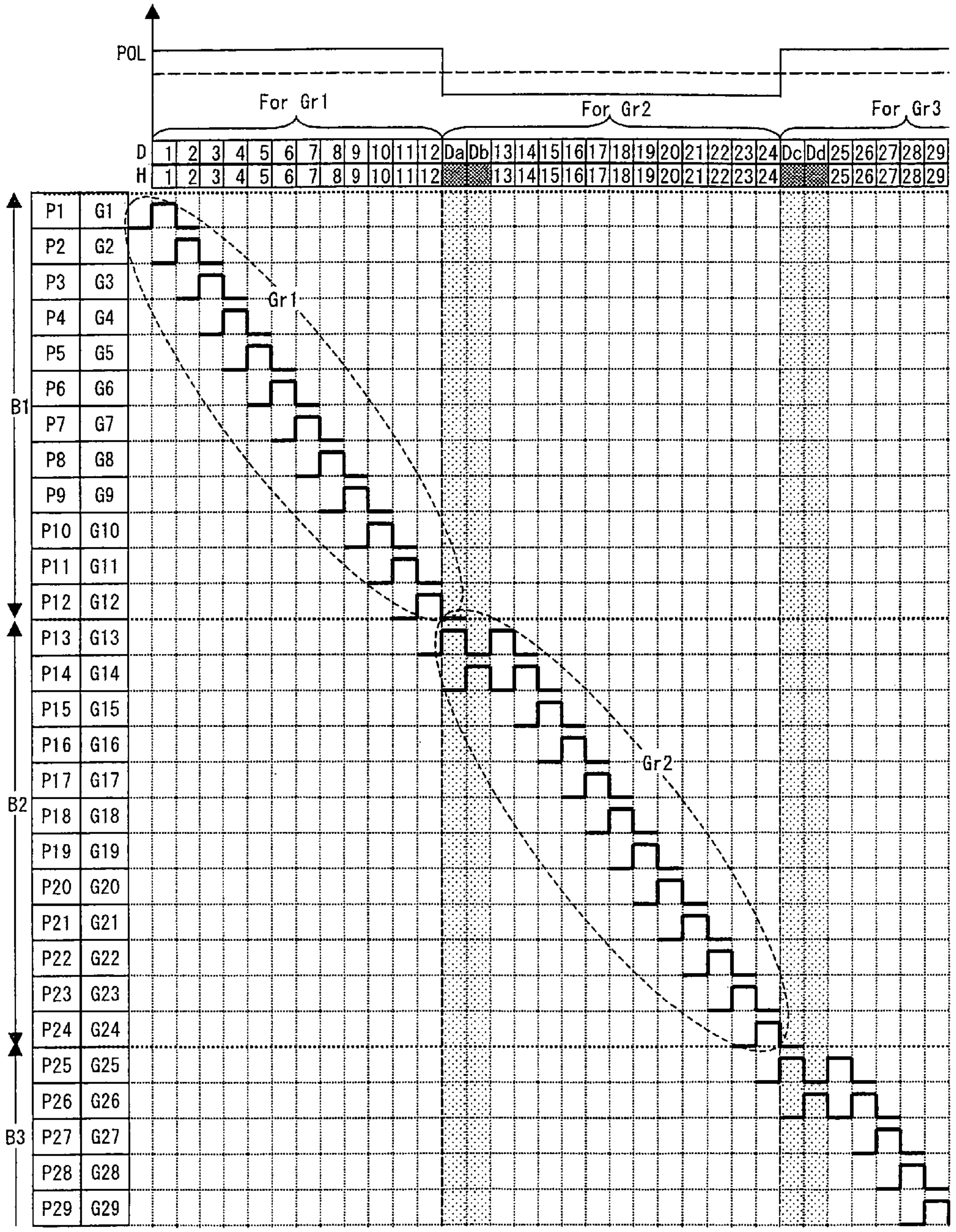
FIG. 23 is a timing chart illustrating one example of how a liquid crystal display device in accordance with Embodiment 2 is driven.
Figure 24:
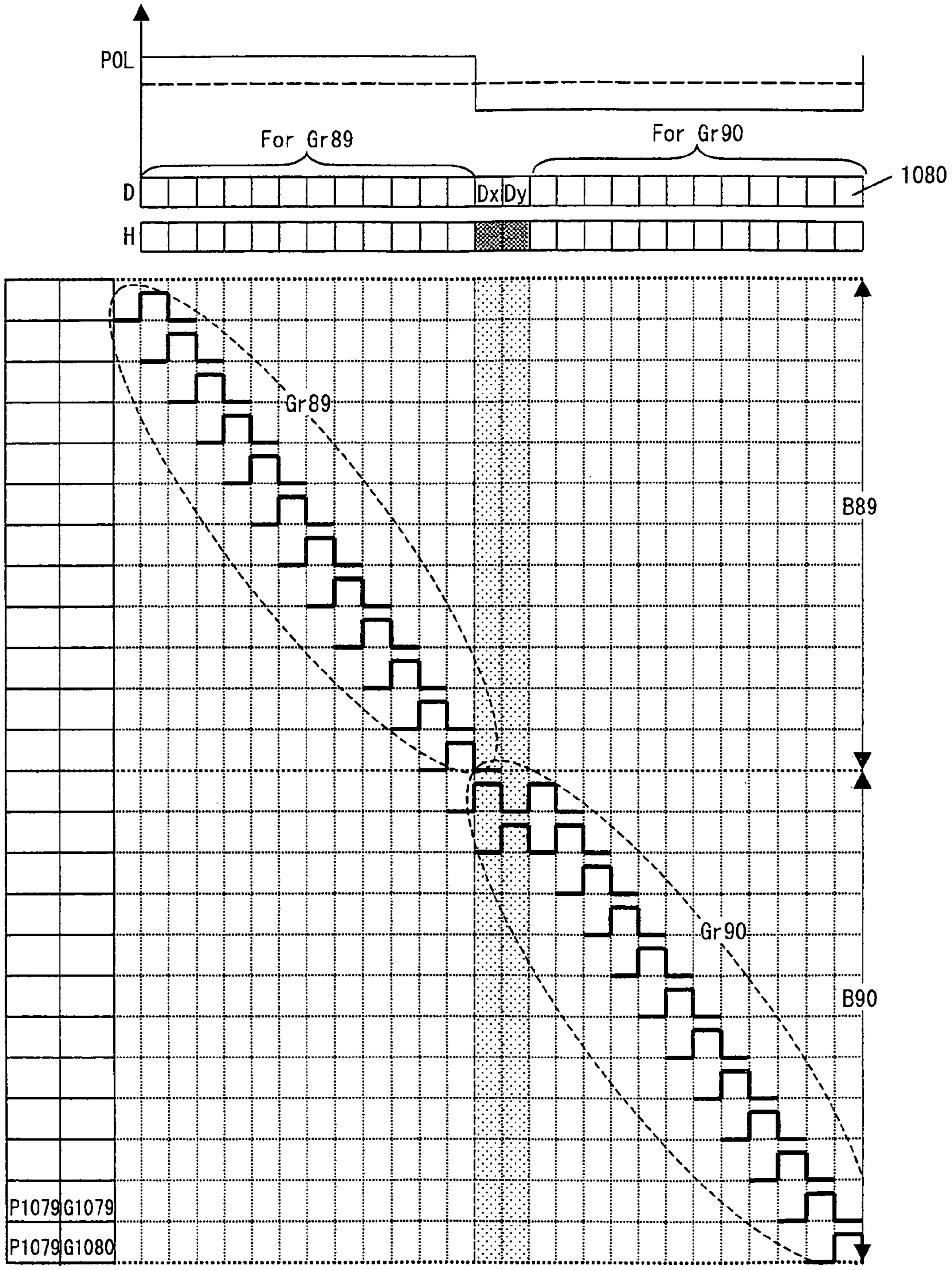
FIG. 24 is a timing chart illustrating a continuation of the timing chart of FIG. 1.

According to the present embodiment, as illustrated in FIGS. 23 and 24, the scanning signal lines are sequentially scanned while the data signal lines are block-inversion driven. First, assume that a part, of a display section, which extends from the scanning signal line G1 is divided into 90 blocks (B1 through B90), which are defined by 89 borders parallel with the scanning signal lines. Each of the blocks includes sequentially arranged 12 of the scanning signal lines. For example, a block B1, which is at a most upstream end, includes scanning signal lines G1 through G12; a block B2 includes scanning signal lines G13 through G24; a block B3 includes scanning signal lines G25 through G36; and a block B90, which is at a most downstream end, includes scanning signal lines G1069 through G1080.

Then, the 12 scanning signal lines (G1, G2, . . . and G12) included in the block B1, which is the most upstream block, are grouped into a first group Gr1, and the 12 scanning signal lines (G13, G14, . . . and G24) included in the block B2 downstream of the block B1 are grouped into a group Gr2. Similarly, 12 scanning signal lines included in each of the blocks are grouped into a corresponding one of groups Gr3 through Gr90. The groups Gr1 through Gr90 are sequentially selected in this order so that (i) scanning signal lines belonging to a selected one of the groups Gr1 through Gr90 are horizontally scanned sequentially while (ii) the data signal lines are sequentially supplied with signal electric potentials having an identical polarity. Further, as is clear from a polarity reverse signal POL of FIG. 23, a polarity (positive or negative) of each of the signal electric potentials supplied to each of the data signal lines is reversed between sequentially selected ones of the groups.

Specifically, while the group Gr1 is being selected so that the scanning signal lines (G1, G2, . . . and G12) belonging to the group Gr1 are sequentially scanned horizontally, the data signal line SL1 is sequentially supplied with signal electric potentials each having a positive polarity, which signal electric potentials correspond to respective pieces of video data (D1, D2, . . . and D12). Next, while the group Gr2 is being selected so that the scanning signal lines (G13, G14, . . . and G24) belonging to the group Gr2 are sequentially scanned horizontally, the data signal line SL1 is sequentially supplied with signal electric potentials each having a negative polarity, which signal electric potentials correspond to respective pieces of video data (D13, D14, . . . and D24). Next, while the group Gr3 is being selected so that the scanning signal lines (G25, G26, . . . and G48) belonging to the group Gr3 are sequentially scanned horizontally, the data signal line SL1 is sequentially supplied with signal electric potentials each having a positive polarity, which signal electric potentials correspond to respective pieces of video data (D25, D26, . . . and D48). Note here that a period, during which a signal electric potential corresponding to a piece of video data is supplied (outputted) to a corresponding one of the data signal lines, is referred to as a horizontal scanning period (H).

During a first dummy scanning period, a scanning signal line to be horizontally scanned first in the next group is subjected to a dummy scan so as to be in the active state for a predetermined period and thereafter deactivated. During the first dummy scanning period, a dummy electric potential, which corresponds to a first piece of dummy data and has a polarity identical to that of a signal electric potential for a next group, is supplied to a corresponding one of the data signal lines. The first piece of dummy data is identical to a piece of video data which corresponds to a first horizontal scan of the scanning signal line (i.e., the scanning signal line to be horizontally scanned first in the next group) after the dummy scan of the scanning signal line. Further, during a second dummy scanning period, a scanning signal line to be horizontally scanned secondly in the next group is subjected to a dummy scan so as to be in the active state for a predetermined period and thereafter deactivated. During the second dummy scanning period, a dummy electric potential, which corresponds to a second piece of dummy data and has a polarity identical to that of the signal electric potential for the next group, is supplied to the corresponding one of the data signal lines. The second piece of dummy data is identical to a piece of video data which corresponds to a first, horizontal scan of the scanning signal line (i.e., the scanning signal line to be horizontally scanned secondly in the next group) after the dummy scan of the scanning signal line.

Note here that a timing of a horizontal scan in each horizontal scanning period is same as a timing of a dummy scan in each of the dummy scanning periods. Specifically, a start of a horizontal scanning period (i.e., a start of output of a signal electric potential) and an end of the horizontal scanning period (i.e., an end of the output of the signal electric potential) are matched with a start of a corresponding horizontal scan (a start of supplying of the signal electric potential) and an end of the corresponding horizontal scan (i.e., an end of the supplying of the signal electric potential), respectively. Further, a start of a dummy scanning period (i.e., a start of output of a dummy electric potential) and an end of the dummy scanning period (i.e., an end of the output of the dummy electric potential) are matched with a start of a corresponding dummy scan (i.e., a start of supplying of the dummy electric potential) and an end of the corresponding dummy scan (i.e., an end of the supplying of the dummy electric potential), respectively.

Further, the scanning signal lines G1 through G1080 are supplied with respective gate pulses GP1 through GP1080, each of which has a pulse width equal to one (1) horizontal scanning period (i.e., 1H). Each of the scanning signal lines is activated at a start of a horizontal scan thereof. Similarly, each of scanning signal lines (i.e., the scanning signal lines to be horizontally scanned first and secondly in the next group) to be subjected to a dummy scan is activated at a start of a dummy scan thereof.

Figure 25:
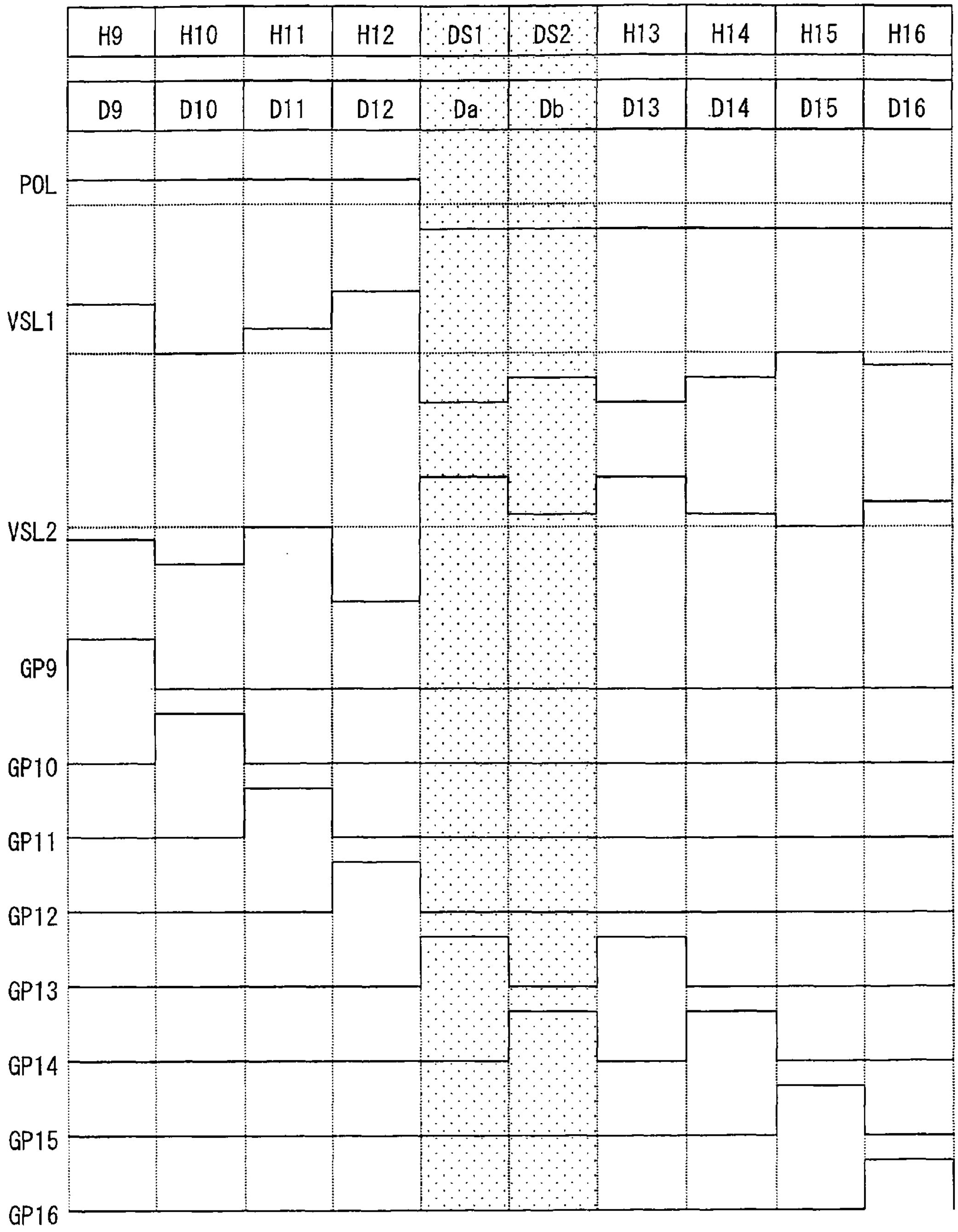
FIG. 25 is a timing chart more specifically illustrating the example of FIGS. 23 and 24.

For example, as illustrated in FIGS. 23 and 25, a first piece of dummy data Da and a second piece of dummy data Db are inserted between (i) a piece of video data D12 corresponding to a last horizontal scan (i.e., horizontal scan of G12) in the group Gr1 and (ii) a piece of video data D13 corresponding to a first horizontal scan (i.e., horizontal scan of G13) in the group Gr2. Further, a first dummy scanning period DS1 and a second dummy scanning period DS2 are inserted between (a) a horizontal scanning period H12 corresponding to the last horizontal scan in the group Gr1 and (b) a horizontal scanning period H13 corresponding to the first horizontal scan in the group Gr2.

Under such circumstances, the gate pulse GP12, which is supplied to the scanning signal line G12, (i) becomes active at a start of the horizontal scanning period H12 and (ii) becomes inactive at an end of the horizontal scanning period H12. During the horizontal scanning period H12, a signal electric potential, which corresponds to the piece of video data D12 (i.e., a piece of video data corresponding to a pixel connected with the scanning signal line G12) and has a polarity (positive polarity) identical to that of a signal electric potential for the group Gr1, is supplied to the data signal line SL1.

Next, the gate pulse GP13, which is supplied to the scanning signal line G13 to be horizontally scanned first in the group Gr2, (i) becomes active at a start of the first dummy scanning period DS1 and (ii) becomes inactive at an end of the first dummy scanning period DS1. During the first dummy scanning period DS1, a dummy electric potential, which corresponds to the first piece of dummy data Da and has a polarity (negative polarity) identical to that of a signal electric potential for the group Gr2, is supplied to the data signal line SL1. The first piece of dummy data Da is identical to the piece of video data D13 (i.e., a piece of data for a next frame), which corresponds to a first horizontal scan of the scanning signal line G13 after the dummy scan of the scanning signal line G13. Accordingly, as is clear from an electric potential VSL1 (refer to FIG. 25) supplied to the data signal line SL1, the dummy electric potential supplied during the first dummy scanning period DS1 is equal to the signal electric potential supplied during the horizontal scanning period H13.

Next, the gate pulse GP14, which is supplied to the scanning signal line G14 to be horizontally scanned secondly in the group Gr2, (i) becomes active at a start of the second dummy scanning period DS2 and (ii) becomes inactive at an end of the second dummy scanning period DS2. During the second dummy scanning period DS2, a dummy electric potential, which corresponds to the second piece of dummy data Db and has a polarity (negative polarity) identical to that of a signal electric potential for the group Gr2, is supplied to the data signal line SL1. The second piece of dummy data Db is identical to the piece of video data D14 (i.e., a piece of data for a next frame), which corresponds to a first horizontal scan of the scanning signal line G14 after the dummy scan of the scanning signal line G14. Accordingly, as is clear from the electric potential VSL1 (refer to FIG. 25) supplied to the data signal line SL1, the dummy electric potential supplied during the second dummy scanning period DS2 is equal to the signal electric potential supplied during the horizontal scanning period H14.

Next, the gate pulse GP13, which is supplied to the scanning signal line G13, (i) becomes active at a start of the horizontal scanning period H13 and (ii) becomes inactive at an end of the horizontal scanning period H13. During the horizontal scanning period H13, a signal electric potential, which corresponds to the piece of video data D13 (i.e., a piece of video data corresponding to a pixel connected with the scanning signal line G13) and has a polarity (negative polarity) identical to that of the signal electric potential for the group Gr2, is supplied to the data signal line SL1.

Figure 26:
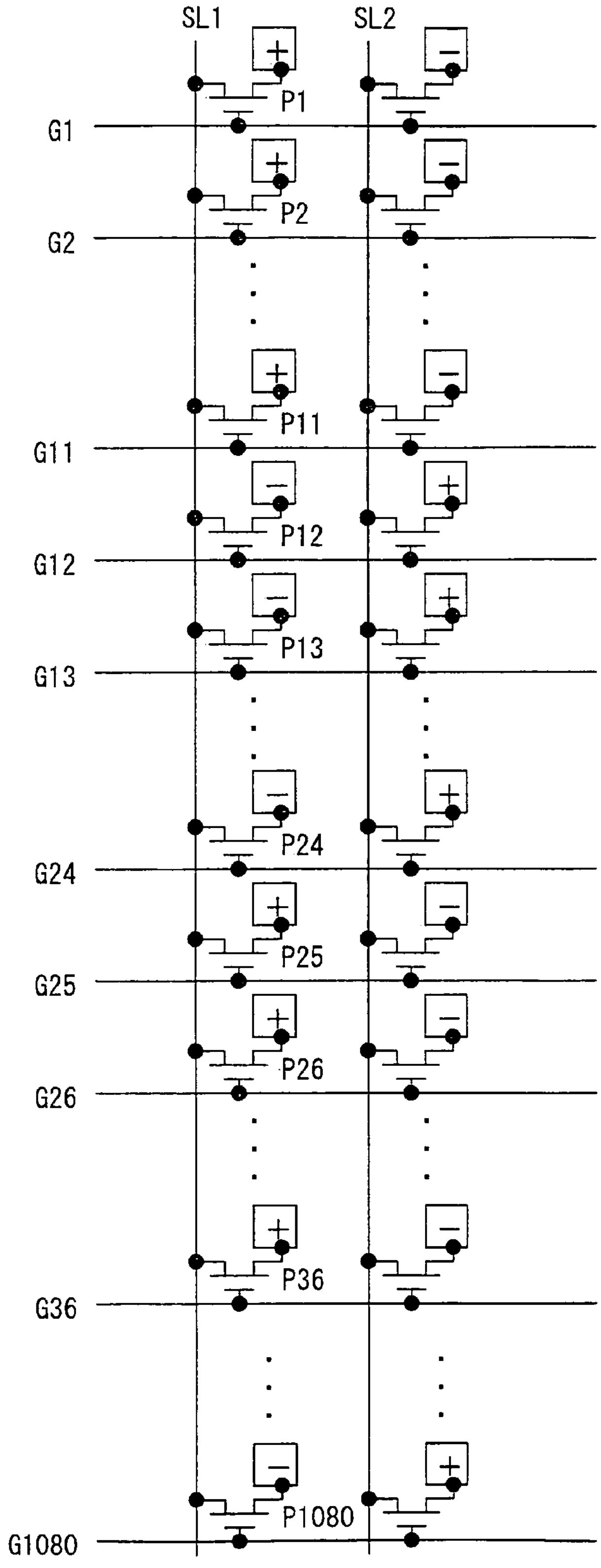
FIG. 26 is a view schematically illustrating distribution of polarities of electric potentials in the liquid crystal display device.

According to the present embodiment in which the scanning signal lines are sequentially scanned while the data signal lines are block-inversion driven, polarities of electric potentials supplied to the pixels are distributed as illustrated in FIG. 26.

According to the liquid crystal display device of the present embodiment, it is possible to reduce a power consumption and heat generation of a driver and to increase a charging rate of the pixels, as compared with a case where the data signal lines are dot-inversion driven (i.e., 1H inversion). Furthermore, immediately after reversal of a polarity of a signal electric potential supplied to a corresponding one of the data signal lines, the dummy electric potentials each having a potential identical to the reversed polarity is supplied to the corresponding one of the data signal lines over the first and second dummy scanning periods. This makes it possible to reduce a difference between (i) a charging rate of pixels connected with the first scanning signal line in each block and (ii) a charging rate of the other pixels. This makes it possible to suppress unevenness, in a form of a horizontal string, which may be observed in the vicinity of a border between blocks in a case of a block-inversion driving.

Further, it is notable that, since one (1) scanning signal line is in the active state for a predetermined period and then deactivated in each of the first and second dummy scanning periods, it is possible to align, for each of the scanning signal lines, each of (i) loads imposed on the scanning signal line driving circuit before scans of the each of the scanning signal lines, (ii) loads imposed on the scanning signal line drive circuit at starts of the scans of the each of the scanning signal lines, and (iii) loads imposed on the scanning signal drive circuit during the scans of the each of the scanning signal lines.

Assume that a load imposed on the scanning signal line drive circuit at a time when simultaneously (i) one (1) scanning signal line is activated and (ii) another scanning signal line is deactivated is Lp. Similarly, assume that a load imposed on the scanning signal line drive circuit while one (1) scanning signal line is in the active state is Ly. The following description discusses, with reference to FIG. 27, loads imposed on the scanning signal line drive circuit (a) before a scan of each of the scanning signal lines G24, G25, and G26, which are in the vicinity of the border between the blocks B1 and B2, (b) at a start of the scan of the each of the scanning signal lines G24, G25, and G26, and (c) during the scan of the each of the scanning signal lines G24, G25, and G26.

Before the scan of the scanning signal line G24, the load Ly is imposed on the scanning signal line drive circuit because one (1) scanning signal line (i.e., the scanning signal line G23) is in the active state. At the start of the scan of the scanning signal line G24, the load Lp is imposed on the scanning signal line drive circuit because one (1) scanning signal line (i.e., the scanning signal line G24) is activated, and simultaneously, another scanning signal line (i.e., the scanning signal line G23) is deactivated. During the scan of the scanning signal line G24, the load Ly is imposed on the scanning signal line drive circuit because one (1) scanning signal line (i.e., the scanning signal line G24) is in the active state.

Before the scan of the scanning signal line G25, the load Ly is imposed on the scanning signal line drive circuit because one (1) scanning signal line (i.e., the scanning signal line G26) is in the active state. At the start of the scan of the scanning signal line G25, the load Lp is imposed on the scanning signal line drive circuit because one (1) scanning signal line (i.e., the scanning signal line G25) is activated, and simultaneously, another scanning signal line (i.e., the scanning signal line G26) is deactivated. During the scan of the scanning signal line G25, the load Ly is imposed on the scanning signal line drive circuit because one (1) scanning signal line (i.e., the scanning signal line G25) is in the active state.

Before the scan of the scanning signal line G26, the load Ly is imposed on the scanning signal line drive circuit because one (1) scanning signal line (i.e., the scanning signal line G25) is in the active state. At the start of the scan of the scanning signal line G26, the load Lp is imposed on the scanning signal line drive circuit because one (1) scanning signal line (i.e., the scanning signal line G26) is activated, and simultaneously, another scanning signal line (i.e., the scanning signal line G25) is deactivated. During the scan of the scanning signal line G26, the load Ly is imposed on the scanning signal line drive circuit because one (1) scanning signal line (i.e., the scanning signal line G26) is in the active state.

As described above, according to the liquid crystal display device of the present embodiment, the dummy scanning periods are inserted immediately after reversal of a polarity of an electric potential supplied to each of the data signal lines. According to this configuration, it is possible to equalize (i) a load imposed on the scanning signal line drive circuit during each of the horizontal scanning periods and (ii) a load imposed on the scanning signal line drive circuit during each of the dummy scanning periods and to align, for each of the scanning signal lines, each of (a) loads imposed on the scanning signal line drive circuit before scans of the each of the scanning signal lines, (b) loads imposed on the scanning signal drive circuit at starts of the scans of the each of the scanning signal lines, and (c) loads imposed on the scanning signal line drive circuit during the scans of the each of the scanning signal lines. Accordingly, it is possible to further reduce a difference between (I) a charging rate of pixels connected with scanning signal lines to be horizontally scanned before and after the reversal of the polarity of each electric potential and (II) a charging rate of the other pixels, and thus possible to further suppress unevenness in the form of the horizontal string in the vicinity of a border between blocks.

Figure 27:
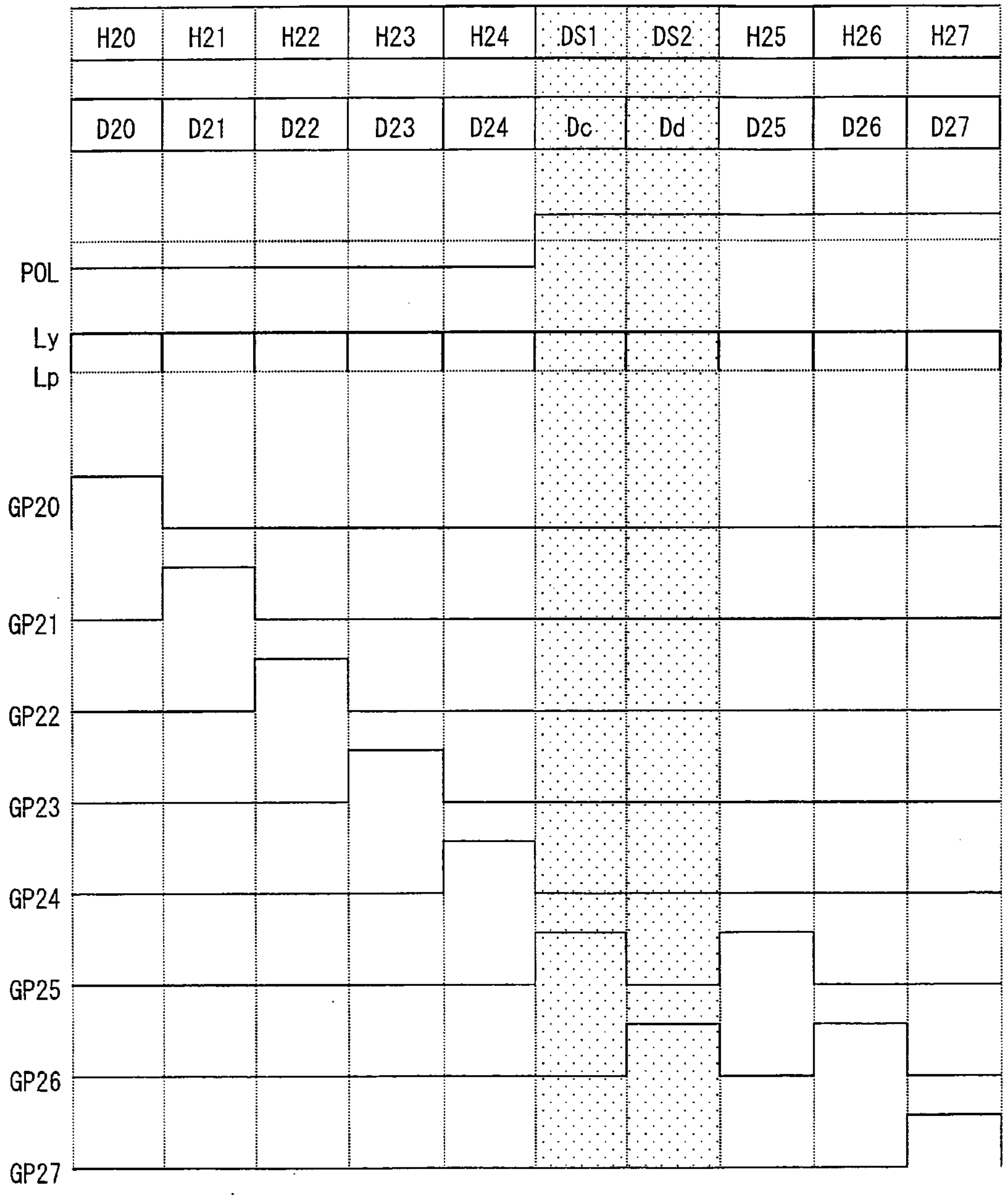
FIG. 27 is a timing chart illustrating how a load on a scanning signal line drive circuit varies in the example of FIGS. 23 and 24.
Figure 28:
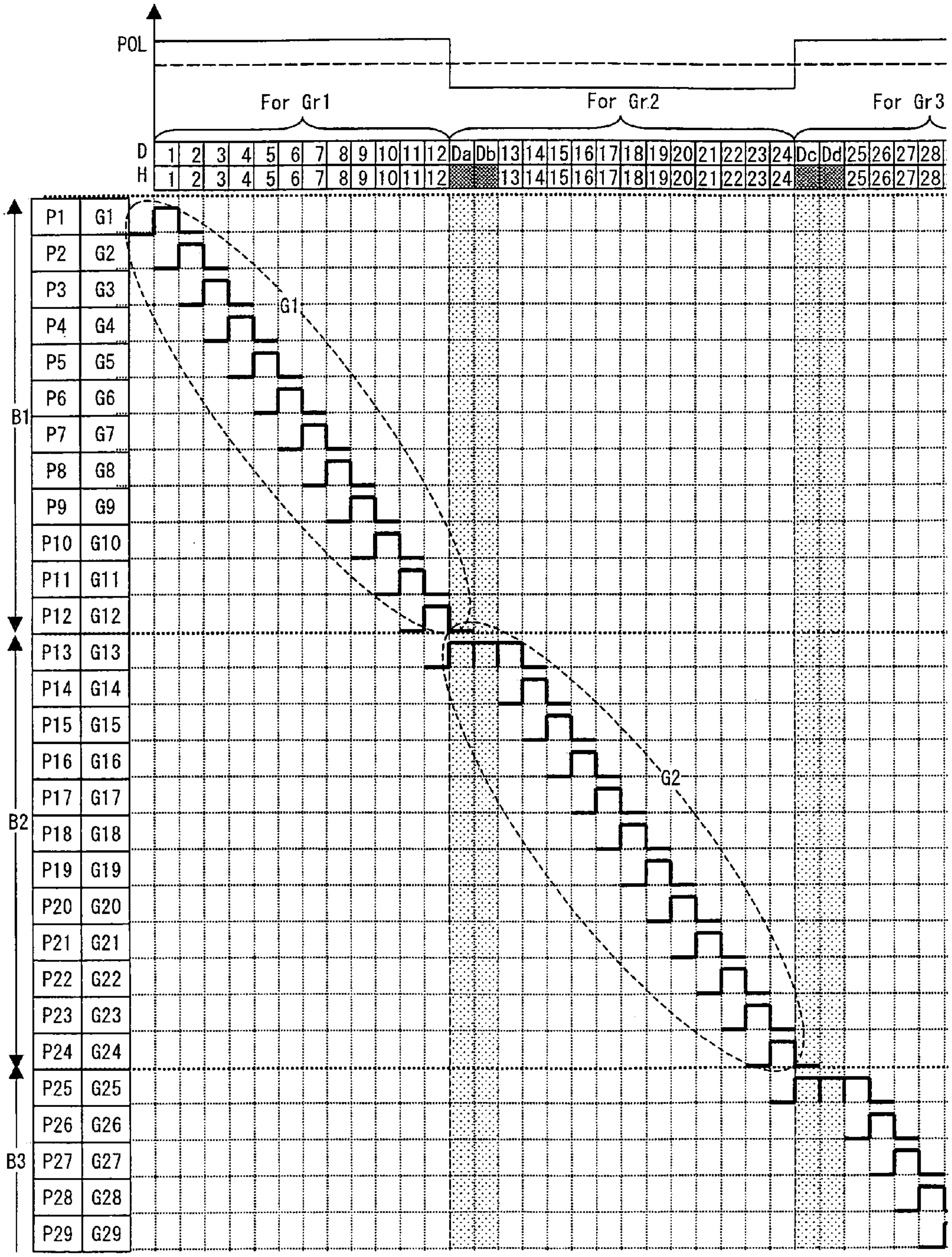
FIG. 28 is a timing chart illustrating another example of how the liquid crystal display device is driven.

Furthermore, according to the liquid crystal display device of the present embodiment, a load on the scanning signal line drive circuit is almost always kept at Ly throughout a vertical scanning period. That is, the load itself on the scanning signal line drive circuit shows little change. This suppresses unevenness in the form of the horizontal string more effectively. Further, since the timing at which the load becomes Lp is periodic as illustrated in FIG. 27, it is possible to more effectively suppress unevenness in the form of the horizontal string.

Note here that, although each of the dummy scanning periods is equal to one (1) horizontal scanning period according to the configuration of FIGS. 23 through 25, each of the dummy scanning periods is not limited to this. Each of the dummy scanning periods can be shorter or longer than one (1) horizontal scanning period.

According to the configuration of FIGS. 23 through 25, (i) a scanning signal line to be horizontally scanned first in the next group is subjected to a dummy scan during the first dummy scanning period and (ii) a scanning signal line to be horizontally scanned secondly in the next group is subjected to a dummy scan during the second dummy scanning period. Note, however, that how the dummy scan is carried out is not limited to this. For example, (a) a scanning signal line to be horizontally scanned first in the next group can be subjected to a dummy scan during the first dummy scanning period so as to be in the active state for a predetermined period and then deactivated and (b) the same scanning signal line can be again subjected to a dummy scan during the second dummy scanning period so as to be in the active state for a predetermined period and then deactivated (see FIG. 28).

Further, the configuration of FIGS. 23 through 25 can be arranged as below. That is, (i) a width of each of the gate pulses GP0 through GP1081 is twice (i.e., 2H) as long as one (1) horizontal scanning period, (ii) each of the scanning signal lines is (a) activated in synchronization with a start of a horizontal scan or a dummy scan immediately before a horizontal scan of the each of the scanning signal lines and (b) deactivated in synchronization with an end of the horizontal scan of the each of the scanning signal lines, and (iii) each of scanning signal lines to be subjected to a dummy scan is (A) activated in synchronization with a start of a horizontal scan or a dummy horizontal scan immediately before a dummy horizontal scan of the each of the scanning signal lines and (B) deactivated in synchronization with an end of the dummy scan of the each of the scanning signal lines. According also to this configuration, a timing of a horizontal scan in each of the horizontal scanning periods is same as a timing of a dummy scan in each of the dummy scanning periods.

Figure 29:
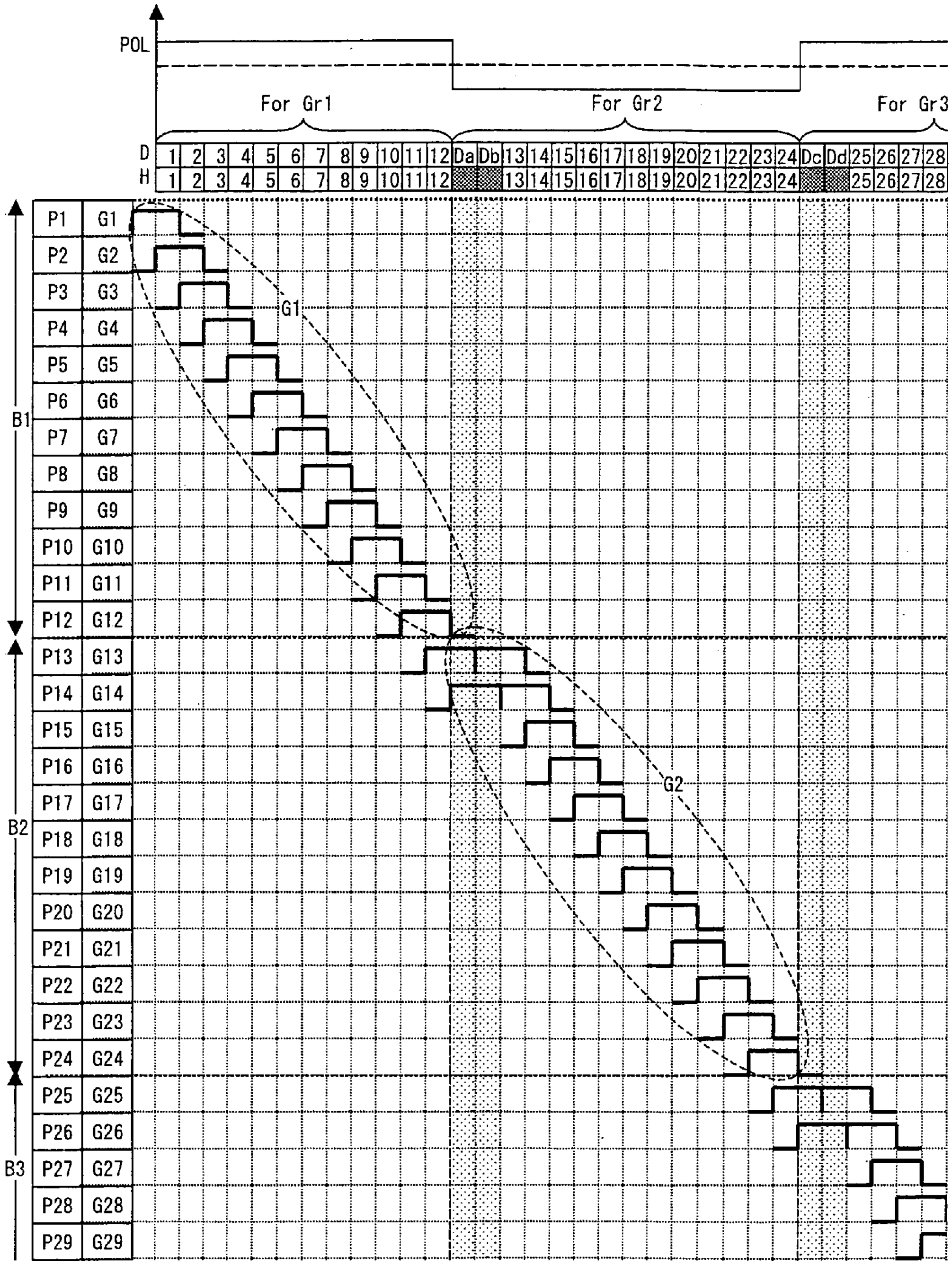
FIG. 29 is a timing chart illustrating a further example of how the liquid crystal display device is driven.
Figure 30:
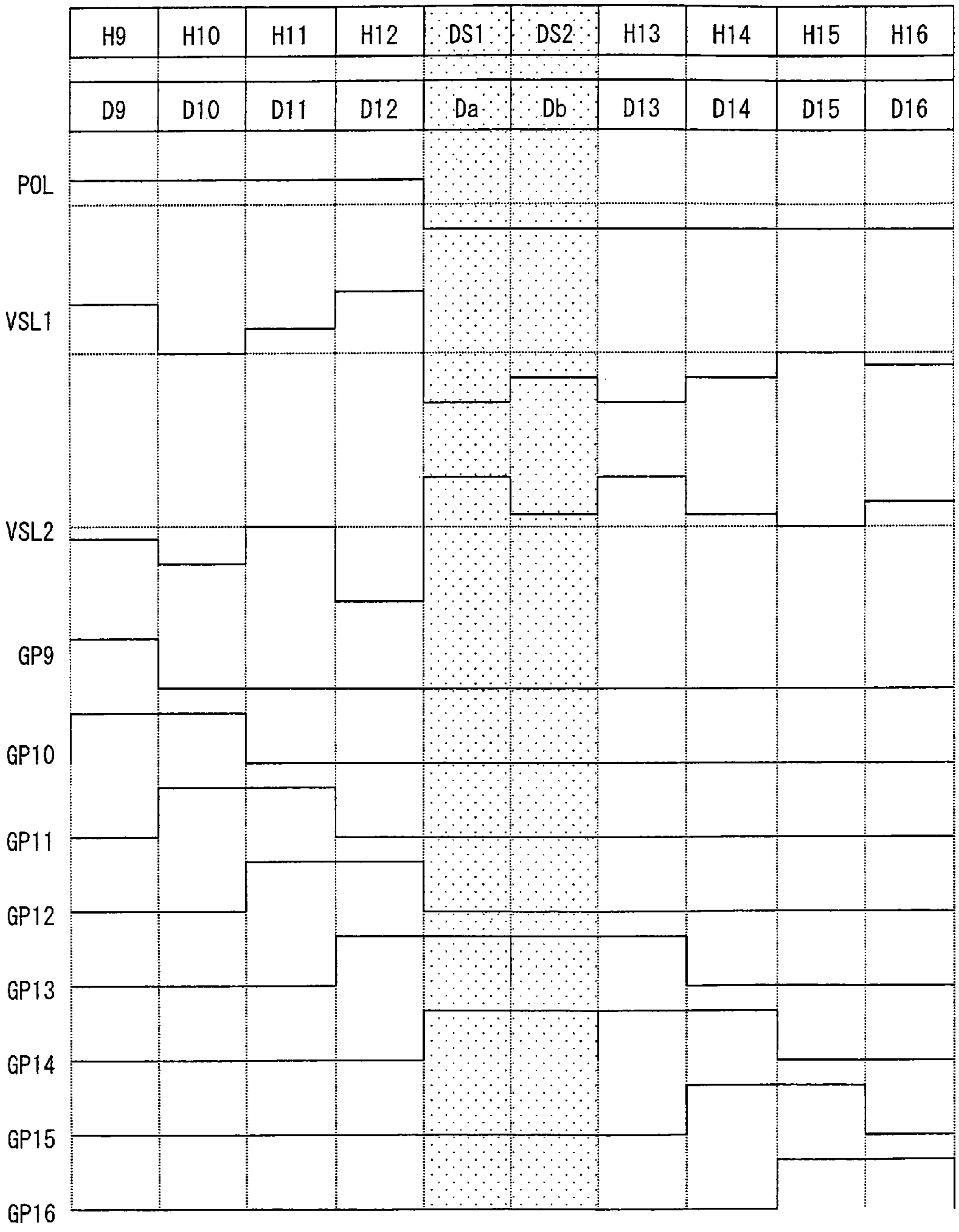
FIG. 30 is a timing chart more specifically illustrating the example of FIG. 29.

According to this configuration, as illustrated in FIGS. 29 and 30, the gate pulse GP12, which is supplied to the scanning signal line G12, (i) becomes active at a start of a horizontal scan (i.e., a start of the horizontal scanning period H11) immediately before a horizontal scan of the scanning signal line G12, (ii) is in the active state for two horizontal periods throughout the horizontal scanning periods H11 and H12, and (ii) becomes inactive at an end of the horizontal scanning period H12. During the horizontal scanning period H11, a signal electric potential, which corresponds to the piece of video data D11 (i.e., a piece of video data corresponding to a pixel connected with the scanning signal line G11) and has a polarity (positive polarity) identical to that of a signal electric potential for the group Gr1, is supplied to the data signal line SL1. Further, during the horizontal scanning period H12, a signal electric potential, which corresponds to the piece of video data D12 (i.e., a piece of video data corresponding to a pixel connected with the scanning signal line G12) and has a polarity (positive polarity) identical to that of a signal electric potential for the group Gr1, is supplied to the data signal line SL1. That is, a pre-charging is carried out during the horizontal scanning period H11, and an actual charging (i.e., supplying of the signal electric potential which corresponds to the piece of video data D12 and has a positive polarity) is carried out by the horizontal scan during the horizontal scanning period H12.

Further, the gate pulse GP13, which is supplied to the scanning signal line G13, (i) becomes active at a start of a horizontal scan (i.e., the start of the horizontal scanning period H12) immediately before a dummy scan of the scanning signal line G13, (ii) is in the active state for two horizontal scanning periods throughout the horizontal scanning period H12 and the first dummy scanning period DS1, and (iii) becomes inactive at an end of the first dummy scanning period DS1.

Further, the gate pulse GP14, which is supplied to the scanning signal line G14, (i) becomes active at a start of a dummy scan (i.e., the start of the first dummy scanning period DS1) immediately before a dummy scan of the scanning signal line G14, (ii) is in the active state for two horizontal scanning periods throughout the first and second dummy scanning periods DS1 and DS2, and (iii) becomes inactive at an end of the second dummy scanning period DS2.

Further, the gate pulse GP13, which is supplied to the scanning signal line G13, (i) becomes active at a start of a dummy scan (i.e., the start of the second dummy scanning period DS2) immediately before a horizontal scan of the scanning signal line G13, (ii) is in the active state for two horizontal scanning periods throughout the second dummy scanning period DS2 and the horizontal scanning period H13, and (iii) becomes inactive at an end of the horizontal scanning period H2.

During the second dummy scanning period DS2, a signal electric potential, which corresponds to the second piece of dummy data Db and has a polarity (negative polarity) identical to that of a signal electric potential for the group Gr2, is supplied to the data signal line SL1. During the horizontal scanning period H13, a signal electric potential, which corresponds to the piece of video data D13 (i.e., a piece of video data corresponding to a pixel connected with the scanning signal line G13) and has a polarity (positive polarity) identical to that of a signal polarity for the group Gr2, is supplied to the data signal line SL1. That is, a pre-charging is carried out during the second dummy scanning period DS2, and an actual charging (i.e., supplying of the signal electric potential which corresponds to the piece of video data D2 and has a positive polarity) is carried out by the horizontal scan during the horizontal scanning period H13.

According also to the configuration shown in FIGS. 29 and 30, the following is achieved. Namely, assume that (i) a load imposed on the scanning signal line drive circuit at a time when (i) one (1) scanning signal line is in the active state and (ii) another scanning signal line and a further scanning signal line are simultaneously activated and deactivated, respectively, is Lq. Similarly, assume that a load imposed on the scanning signal line drive circuit while one (1) scanning signal line and another scanning signal are in the active state is Lz. According to this configuration, it is possible to equalize (a) a load imposed on the scanning signal line drive circuit during each of the horizontal scanning periods and (b) a load imposed on the scanning signal line drive circuit during each of the dummy scanning periods and to align, for each of the scanning signal lines, each of (I) loads imposed on the scanning signal line drive circuit before scans of the each of the scanning signal lines and (II) loads imposed on the scanning signal line drive circuit during the scans of the each of the scanning signal lines (see FIG. 31). Accordingly, it is possible to of pixels connected with scanning signal lines to be horizontally scanned before and after reversal of a polarity of an electric potential and (A) a charging rate of the other pixels, and thus possible to further suppress unevenness in the form of the horizontal string in the vicinity of a border between blocks.

Figure 31:
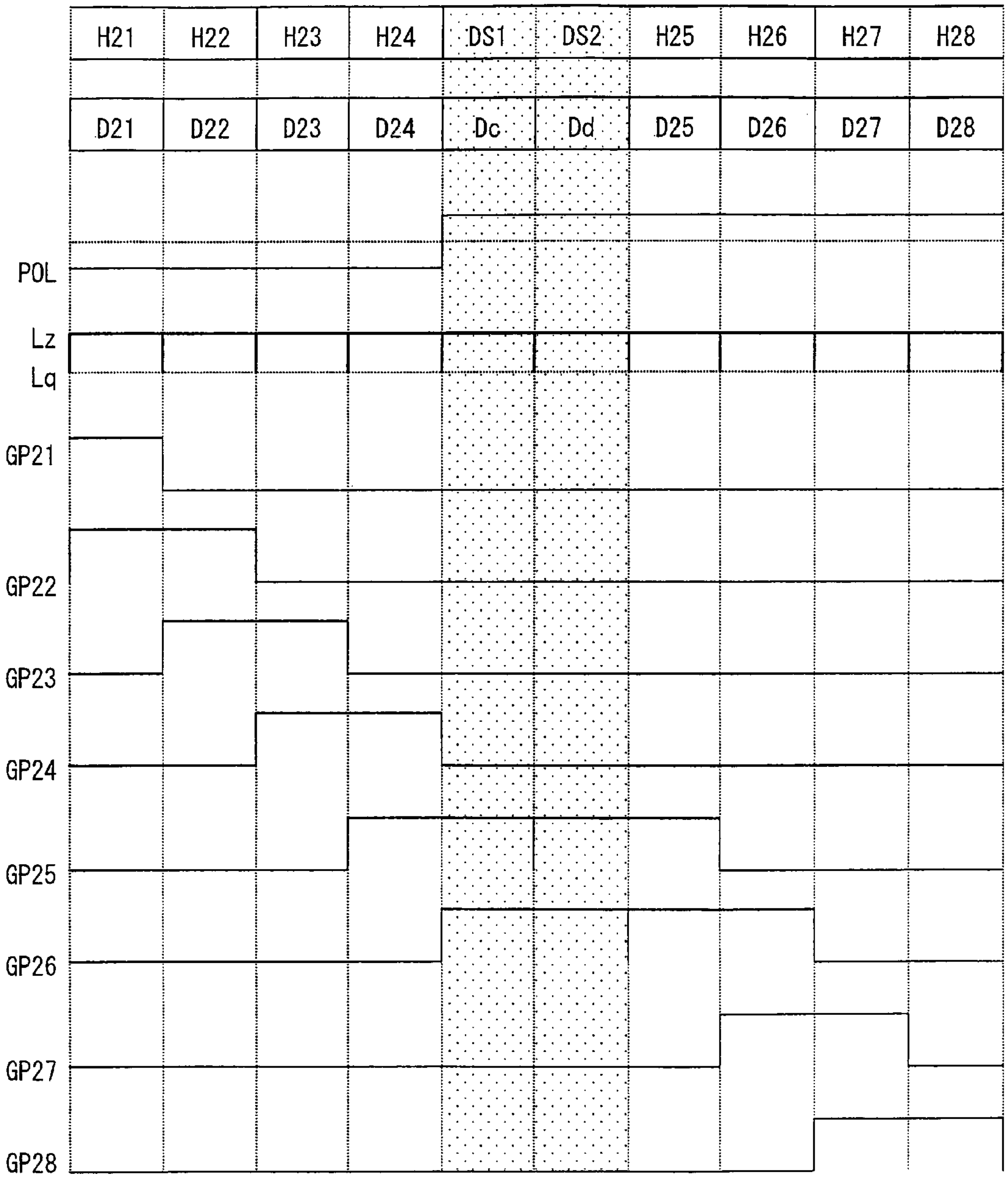
FIG. 31 is a timing chart illustrating how a load on the scanning signal line drive circuit varies in the example of FIG. 29.

Furthermore, according also to this configuration, a load on the scanning signal line drive circuit is almost always kept at Ly throughout a vertical scanning period. That is, the load itself on the scanning signal line drive circuit shows little change. This suppresses unevenness in the form of the horizontal string more effectively. Further, since the timing of the load becomes Lq is periodic as illustrated in FIG. 31, it is possible to more effectively suppress unevenness in the form of the horizontal string. Moreover, according to this configuration, each pixel is pre-charged for one (1) horizontal scanning period. This makes it possible to increase a charging rate of the each pixel. Note that, although each of the dummy scanning periods is equal to one (1) horizontal scanning period according to the configuration of FIGS. 29 and 30, each of the dummy scanning periods is not limited to this. Each of the dummy scanning periods can be shorter or longer than one (1) horizontal scanning period.

Figure 33:
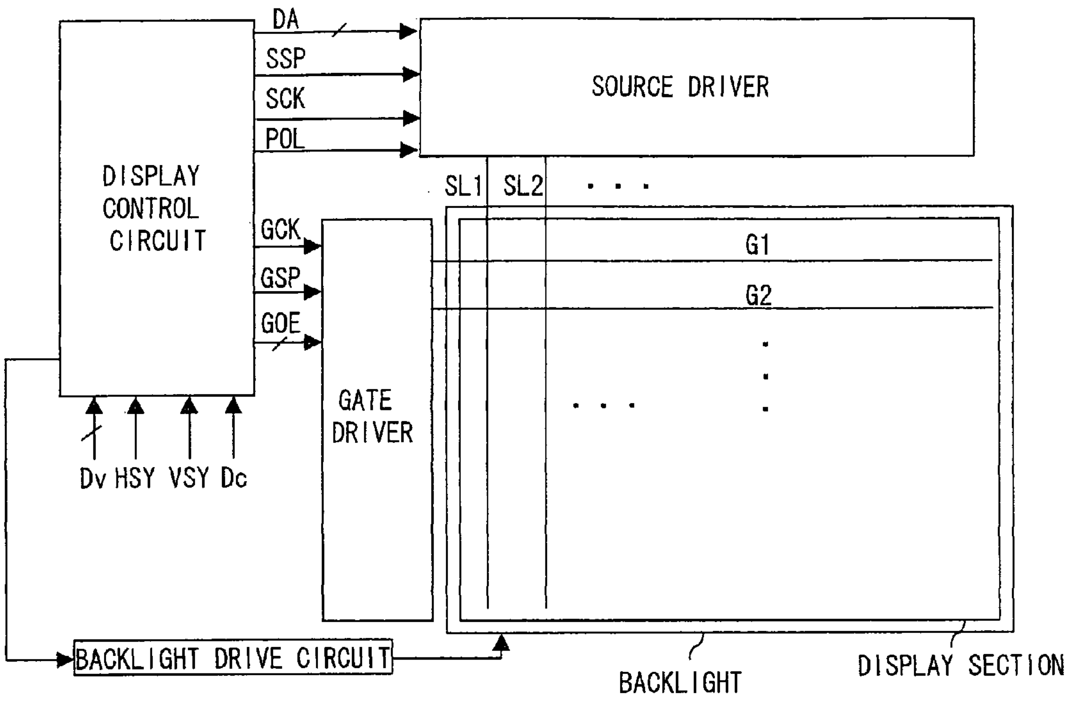
FIG. 33 is a block diagram illustrating how the entire liquid crystal display device is configured.

FIG. 33 is a block diagram illustrating how the liquid crystal display device of the present embodiment is configured. As illustrated in FIG. 33, the liquid crystal display device includes: a display section (liquid crystal panel); a source driver; a gate driver; a backlight; a backlight drive circuit; and a display control circuit. The source driver drives data signal lines. The gate driver drives scanning signal lines. The display control circuit controls the source driver, the gate driver, and the backlight drive circuit.

The display control circuit receives, from external signal sources (e.g., a tuner), (i) a digital video signal Dv indicative of an image to be displayed, (ii) a horizontal sync signal HSY and a vertical sync signal VSY, which correspond to the digital video signal Dv, and (iii) a control signal Dc for controlling a display operation. Further, in response to the signals Dv, HSY, VSY, and Dc, the display control circuit generates and outputs the following signals which cause the image, corresponding to the digital video signal Dv, to be displayed: a data start pulse signal SSP; a data clock signal SCK; a digital image signal DA (corresponding to the video signal Dv) indicative of the image to be displayed; a gate start pulse signal GSP; a gate clock signal GCK; a gate driver output control signal (a scanning signal output control signal) GOE, and (g) a polarity reverse signal POL for controlling a polarity of each of signal electric potentials to be supplied to the data signal lines.

More specifically, the display control circuit processes the video signal Dv by using its incorporated memory to adjust a timing or the like, if needed, so as to obtain the digital image signal DA. Then, the display control circuit outputs the digital image signal DA. Further, the display control circuit generates the data clock signal SCK, which serves as a signal having pulses corresponding to respective pixels of an image represented by the digital image signal DA. Based on the horizontal sync signal HSY, the display control circuit generates the data start pulse signal SSP, which is in a high-level (H level) state for only a predetermined period in every one (1) horizontal scanning period. Based on the vertical sync signal VSY, the display control circuit generates the gate start pulse signal GSP, which is in the H level state for only a predetermined period in every one (I) frame (one (1) vertical scanning period). Based on the horizontal sync signal HSY, the display control section generates the gate clock signal GCK. Based on the horizontal sync signal HSY and the control signal Dc, the display control circuit generates the gate driver output control signal GOE.

Out of the signals thus generated by the display control circuit, the digital image signal DA, the polarity reverse signal POL, the data start pulse signal SSP, and the data clock signal SCK are supplied to the source driver, whereas the gate start pulse signal GSP, the gate clock signal GCK, and the gate driver output control signal GOE are supplied to the gate driver.

The source driver sequentially generates, for every horizontal scanning period, analog electric potentials which are equivalent to pixel values corresponding to the respective horizontal scanning lines for an image corresponding to the digital image data DA. The analog electric potentials are data signals which are generated in response to the digital image signal DA, the data clock signal SCK, the data start pulse signal SSP, and the polarization reverse signal POL. The data signals are supplied to the data signal lines (SL1 and SL2).

The gate driver generates scanning signals in response to the gate start pulse signal GSP and the gate clock signal GCK, and the gate driver output control signal GOE. The gate driver then supplies the scanning signals to the respective scanning signal lines so as to selectively drive the scanning signal lines.

The data signal lines and the scanning signal lines in the display section (liquid crystal panel) are driven by the source driver and the gate driver, respectively, as above. This causes corresponding pixel electrodes to receive a signal electric potential from a corresponding one of the data signal lines via a corresponding TFT connected with a selected one of the scanning signal lines. As such, a voltage corresponding to the digital image signal DA is applied to a liquid crystal layer in each of the pixels. In response to the voltage applied, the amount of light of the backlight transmitting is controlled. This causes the image corresponding to the digital video signal Dv to be displayed on the pixels.

Figure 34:
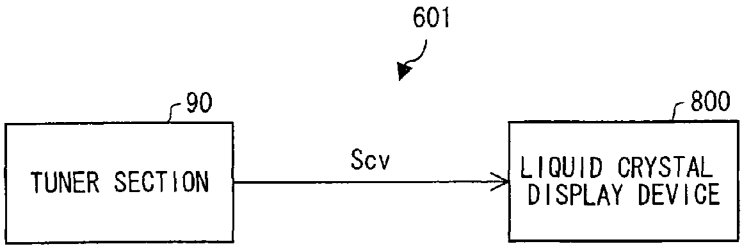
FIG. 34 is a block diagram illustrating a function of a television receiver.
Figure 35:
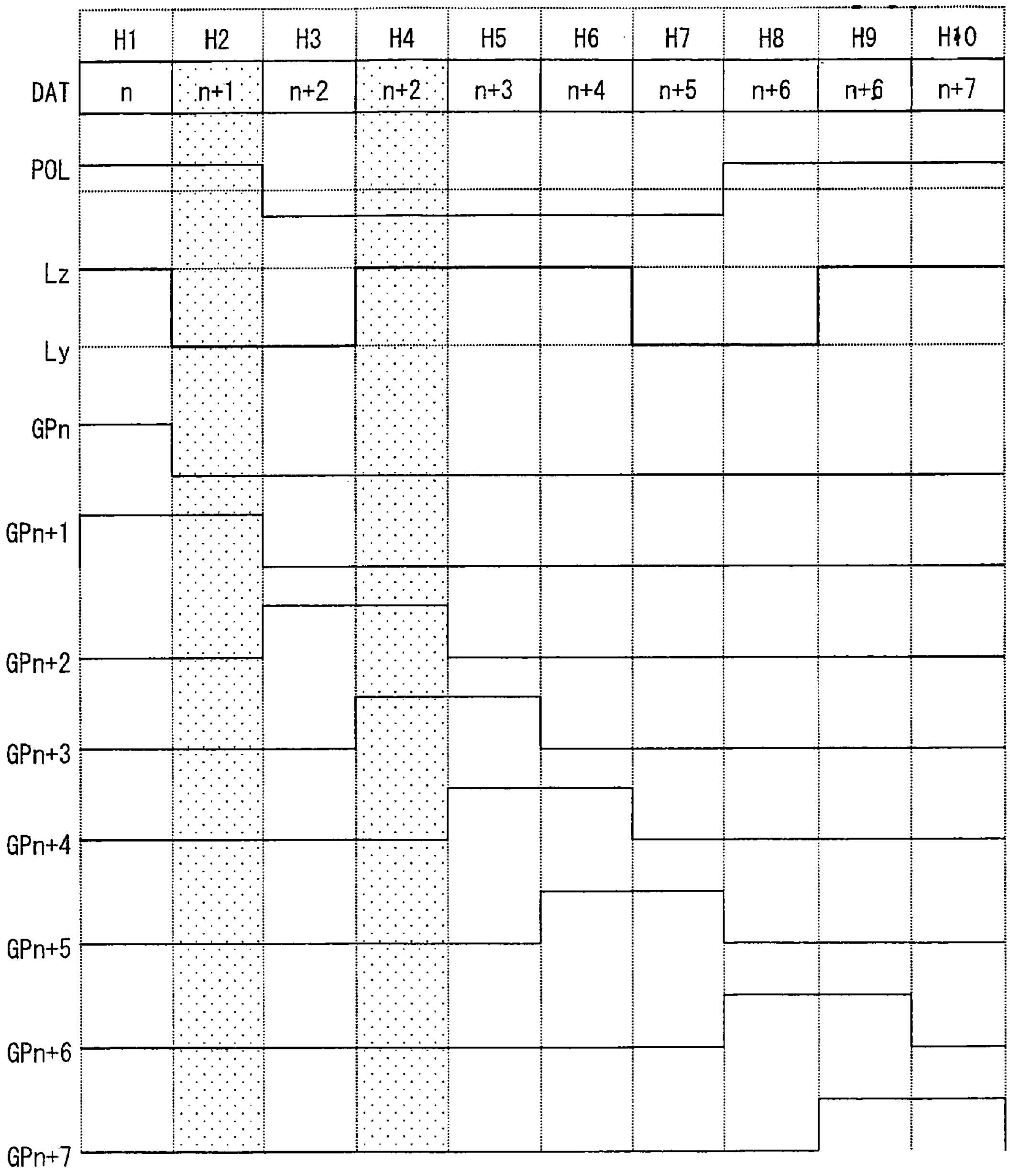
FIG. 35 is a timing chart illustrating one example of how a conventional liquid crystal display device is driven.

In a case where a liquid crystal display device 800 displays an image based on television broadcasting, the liquid crystal display device 800 is connected with a tuner section 90 (see FIG. 34). This makes a television receiver 601 of the present embodiment. The tuner section 90 extracts, from a wave (high-frequency signal) received via an antenna (not illustrated), a signal of a channel to be received. The tuner section 90 then converts the signal into an intermediate frequency signal. Then, the tuner section 90 detects the intermediate frequency signal so as to extract a composite color video signal Scv serving as a television signal. The composite color video signal Scv is supplied to the liquid crystal display device 800 as described earlier. The liquid crystal display device 800 then displays an image based on the composite color video signal Scv.

In this Description, a polarity of a potential is indicative of whether the potential is (i) higher than a reference potential or (ii) lower than the reference potential. A potential having a positive polarity means a potential higher than the reference potential, whereas a potential having a negative polarity means a potential lower than the reference potential. The reference potential can be Vcom (common potential), which is a potential of a common electrode (counter electrode). Alternatively, the reference potential can be any other potential.

The invention is not limited to the description of the embodiments above, but may be altered within the scope of the claims. An embodiment based on a proper combination of technical means disclosed in different embodiments is encompassed in the technical scope of the invention.

INDUSTRIAL APPLICABILITY

A liquid crystal display device in accordance with the present invention is suitably applicable to for example a liquid crystal television.

REFERENCE SIGNS LIST

G1 through G1080 Scanning signal line
Gr1 through Gr46 Group
B1 through G45 Block
P1 through P1080 Pixel
D1 through D1080 Video data
Da, Db, Dc, and Dd Dummy data
H1 through H1080 Horizontal scanning period
DS1 First dummy scanning period
DS2 Second dummy scanning period
SL1 and SL2 Data signal line
PL1 and PL2 Pixel array
601 Television receiver
800 Liquid crystal display device

The invention claimed is:

1. A liquid crystal display device, comprising:
a display section;
scanning signal lines in the display section; and
data signal lines,
the scanning signal lines being divided into groups each of which includes two or more of the scanning signal lines,
the groups being sequentially selected so that (i) two or more of the scanning signal lines included in a selected one of the groups are sequentially scanned horizontally while (ii) each of the data signal lines is sequentially supplied with signal electric potentials having an identical polarity,
the identical polarity of the signal electric potentials being reversed between sequentially selected ones of the groups,
two or more dummy scanning periods being inserted between (a) a horizontal scanning period corresponding to a last horizontal scan in a former one of the sequentially selected ones of the groups and (b) another horizontal scanning period corresponding to a first horizontal scan in a latter one of the sequentially selected ones of the groups,
at least one of the scanning signal lines, which is included in a group to be selected after the former one of the sequentially selected ones of the groups, being subjected to a dummy scan during the two or more dummy scanning periods so as to be in an active state for a predetermined period and then deactivated,
the number of scanning signal line(s) to be in the active state during each dummy scanning period is the same as the number of scanning signal line(s) to be in the active state during each horizontal scanning period,
each horizontal scanning period is equal in length to the dummy scanning period, and
during each of the two or more dummy scanning periods, either (i) a different one of the scanning signal lines is subjected to the dummy scan, or (ii) only a same one of the scanning signal lines is subjected to the dummy scan.

2. The liquid crystal display device according to claim 1, wherein, during the two or more dummy scanning periods, said each of the data signal lines is supplied with a dummy electric potential.

3. The liquid crystal display device according to claim 2, wherein the dummy electric potential has a polarity identical to a polarity of each of the signal electric potentials for the latter one of the sequentially selected ones of the groups.

4. The liquid crystal display device according to claim 2, wherein:
pieces of video data corresponding to horizontal scans of the respective scanning signal lines are arranged in order of the horizontal scans;
n piece of dummy data is inserted between (i) one of the pieces of video data, which corresponds to the last horizontal scan in the former one of the sequentially selected ones of the groups, and (ii) another one of the pieces of video data, which corresponds to the first horizontal scan in the latter one of the sequentially selected ones of the groups; and
the signal electric potentials correspond to the respective pieces of video data, whereas the dummy electric potential corresponds to the n piece of dummy data.

5. The liquid crystal display device according to claim 4, wherein the n piece of dummy data is identical to one of the pieces of video data, which corresponds to a first horizontal scan of said at least one of the scanning signal lines after the dummy scan of said at least one of the scanning signal lines.

6. The liquid crystal display device according to claim 4, wherein the n piece of dummy data is identical to one of the pieces of video data, which corresponds to a last horizontal scan of said at least one of the scanning signal lines before the dummy scan of said at least one of the scanning signal lines.

7. The liquid crystal display device according to claim 1, wherein:
a time between a start of each horizontal scanning period and a start of a corresponding horizontal scan is equal to a time between a start of each dummy scanning period and a start of a corresponding dummy scan; and
a time between an end of said horizontal scan and an end of each corresponding horizontal scanning period is equal to a time between an end of the dummy scan and an end of the corresponding dummy scanning period.

8. The liquid crystal display device according to claim 1, wherein said at least one of the scanning signal lines, which is subjected to the dummy scan, is included in the latter one of the sequentially selected ones of the groups.

9. The liquid crystal display device according to claim 1, wherein said as least one of the scanning signal lines, which is subjected to the dummy scan, includes one of the scanning signal lines, which is to be horizontally scanned first in the latter one of the sequentially selected ones of the groups.

10. The liquid crystal display device according to claim 1, wherein said at least one of the scanning signal lines, which is subjected to the dummy scan, includes one of the scanning signal lines, which is included in a group to be selected after the latter one of the sequentially selected ones of the groups.

11. The liquid crystal display device according to claim 1, wherein each of the scanning signal lines is (i) activated in synchronization with a start of a horizontal scan of said each of the scanning signal lines, and (ii) deactivated in synchronization with an end of the horizontal scan of said each of the scanning signal lines.

12. The liquid crystal display device according to claim 1, wherein each of the scanning signal lines is (i) activated in synchronization with a start of a horizontal scan or a dummy scan, which is carried out immediately before a horizontal scan of said each of the scanning signal lines, and (ii) deactivated in synchronization with an end of the horizontal scan of said each of the scanning signal lines.

13. The liquid crystal display device according to claim 1, wherein said at least one of the scanning signal lines, which is subjected to the dummy scan, is (i) activated in synchronization with a start of the dummy scan of said at least one of the scanning signal lines, and (ii) deactivated in synchronization with an end of the dummy scan of said at least one of the scanning signal lines.

14. The liquid crystal display device according to claim 1, wherein said at least one of the scanning signal lines, which is subjected to the dummy scan, is (i) activated in synchronization with a start of a horizontal scan or a dummy scan, which is carried out immediately before the dummy scan of said at least one of the scanning signal lines, and (ii) deactivated in synchronization with an end of the dummy scan of said at least one of the scanning signal lines.

15. The liquid crystal display device according to claim 11, wherein each of the scanning signal lines is activated by a gate pulse having a width equal to one (1) horizontal scanning period.

16. The liquid crystal display device according to claim 12, wherein each of the scanning signal lines is activated by a gate pulse having a width twice as long as one (1) horizontal scanning period.

17. The liquid crystal display device according to claim 1, wherein, in a case where the scanning signal lines are numbered beginning with one (1) and a certain one of the scanning signal lines in the display section is numbered as one (1), (i) either one of the sequentially selected ones of the groups includes only odd-numbered ones of the scanning signal lines and (ii) the other one of the sequentially selected ones of the groups includes only even-numbered ones of the scanning signal lines.

18. The liquid crystal display device according to claim 17, wherein, in a case where (i) a part of the display section, which extends from the certain one of the scanning signal lines, is divided into blocks defined by a plurality of borders parallel with the scanning signal lines and (ii) one of the blocks, which is at an end of the part and includes the certain one of the scanning signal lines, serves as a most upstream block and another one of the blocks, which is at the other end of the part, serves as a most downstream block, a first one of the groups, which is to be selected first, includes (a) odd-numbered scanning signal lines included in the most upstream block or (b) even-numbered scanning signal lines included in the most upstream block;

a last one of the groups, which is to be selected lastly, includes (I) odd-numbered scanning signal lines included in the most downstream block or (II) even-numbered scanning signal lines included in the most downstream block;

each of the other ones of the groups includes (A) even-numbered scanning signal lines included in adjacent two of the blocks or (B) odd-numbered scanning signal lines included in adjacent two of the blocks; and the groups are sequentially selected from upstream to downstream.

19. The liquid crystal display device according to claim 17, wherein, in a case where (i) a part of the display section, which extends from the certain one of the scanning signal lines, is divided into blocks defined by a plurality of borders parallel with the scanning signal lines and (ii) one of the blocks, which is at an end of the part and includes the certain one of the scanning signal lines, serves as a most upstream block and another one of the blocks, which is at the other end of the part, serves as a most downstream block, (a) odd-numbered scanning signal lines included in each of the blocks are grouped into a former group and even-numbered scanning signal lines included in said each of the blocks are grouped into a latter group or (b) the even-numbered scanning signal lines included in said each of the blocks are grouped into a former group and the odd-numbered scanning signal lines included in said each of the blocks are grouped into a latter group; and the groups are sequentially selected from the most upstream block to the most downstream block.

20. The liquid crystal display device according to claim 1, wherein, in a case where (i) a part of the display section, which extends from a certain one of the scanning signal lines, is divided into blocks defined by a plurality of borders parallel with the scanning signal lines and (ii) one of the blocks, which is at an end of the part and includes the certain one of the scanning signal lines, serves as a most upstream block and another one of the blocks, which is at the other end of the part serves as a most downstream block, the two or more of the scanning signal lines included in each of the blocks are grouped into a corresponding one of the groups; and the groups are sequentially selected from the most upstream block to the most downstream block.

21. A liquid crystal display device, comprising:

a plurality of scanning signal lines; and a plurality of data signal lines, each of the plurality of data signal lines being supplied with (i) signal electric potentials each having a first polarity during a first period that includes a first plurality of horizontal scanning periods and (ii) signal electric potentials each having a second polarity during a second period that includes a second plurality of successive horizontal scanning periods, the second period being subsequent to the first period, two or more dummy scanning periods being inserted between the first period and the second period, during each dummy scanning period a corresponding one of the plurality of scanning signal lines is in an active state and then deactivated, the number of a scanning signal line to be in the active state during each dummy scanning period is the same as the number of a scanning signal line to be in the active state during each horizontal scanning period, each horizontal scanning period is equal in length to each dummy scanning period, and during each of the two or more dummy scanning periods, either (i) a different one of the plurality of scanning signal lines is subjected to a dummy scan, or (ii) only a same one of the plurality of scanning signal lines is subjected to the dummy scan.

22. The liquid crystal display device according to claim 21, wherein the corresponding one of the plurality of scanning signal lines, which was in the active state during a dummy scanning period, is in the active state for a predetermined period and then deactivated during (i) the second period or (ii) a horizontal scanning period after the second period.

23. The liquid crystal display device according to claim 22, wherein the corresponding one of the plurality of scanning signal lines, which was in the active state during the dummy scanning period, is in the active state for a predetermined period and then deactivated during one of the second plurality of horizontal scanning periods of the second period, which one is other than a first one of the second plurality of horizontal scanning periods.

24. The liquid crystal display device according to claim 21, wherein, during each of the dummy scanning periods, the data signal line drive circuit supplies a dummy electric potential having the second polarity to said each of the plurality of data signal lines.

25. The liquid crystal display device according to claim 21, wherein the scanning signal line drive circuit carries out an interlacing scanning.

26. A method for driving a liquid crystal display device, the liquid crystal display device including:

a display section;

scanning signal lines in the display section; and data signal lines, said method, comprising the steps of:

dividing the scanning signal lines into groups each of which includes two or more of the scanning signal lines;

sequentially selecting the groups so that (i) two or more of the scanning signal lines included in a selected one of the groups are sequentially scanned horizontally while (ii) each of the data signal lines is sequentially supplied with signal electric potentials having an identical polarity, reversing the identical polarity of the signal electric potentials between sequentially selected ones of the groups, inserting two or more dummy scanning periods between (i) a horizontal scanning period corresponding to a last horizontal scan in a former one of the sequentially selected ones of the groups and (ii) another horizontal scanning period corresponding to a first horizontal scan in a latter one of the sequentially selected ones of the groups, and causing at least one of the scanning signal lines, which is included in a group to be selected after the former one of the sequentially selected ones of the groups, to be subjected to a dummy scan during the two or more dummy scanning periods so that said at least one of the scanning signal lines is in an active state for a predetermined period and then deactivated, wherein the number of scanning signal line(s) to be in the active state during each dummy scanning period is the same as the number of scanning signal line(s) to be in the active state during each horizontal scanning period, each horizontal scanning period is equal in length to each dummy scanning period, and during each of the two or more dummy scanning periods, either (i) a different one of the scanning signal lines is subjected to the dummy scan, or (ii) only a same one of the scanning signal lines is subjected to the dummy scan.

27. A television receiver, comprising:

a liquid crystal display device recited in claim 1; and a tuner section for receiving television broadcasting.

* * * * *